United States Patent [19]
Hirai et al.

[11] Patent Number: 5,915,133
[45] Date of Patent: Jun. 22, 1999

[54] CAMERA WITH A PHOTOGRAPHIC MODE AUTOMATIC SELECTING APPARATUS

[75] Inventors: Isamu Hirai, Tokyo; Hideaki Tsuji, Aichi-ken; Masahiro Nakata, Tokyo, all of Japan

[73] Assignee: Asahi Kogaku Kogyo Kabushiki Kaisha, Tokyo, Japan

[21] Appl. No.: 08/834,878

[22] Filed: Apr. 10, 1997

[30] Foreign Application Priority Data

Apr. 11, 1996 [JP] Japan ......................................... 8-89579
Dec. 5, 1996 [JP] Japan ....................................... 8-325714
Dec. 5, 1996 [JP] Japan ....................................... 8-325715

[51] Int. Cl.$^6$ .......................... G03B 7/097; G03B 13/36; G03B 17/18
[52] U.S. Cl. ............................... 396/48; 396/63; 396/67; 396/89; 396/147; 396/80; 396/239; 396/243; 396/153; 396/287
[58] Field of Search ................... 396/63, 65–70, 396/79–83, 88, 238, 239, 242, 243, 245, 153, 89, 147, 287

[56] References Cited

U.S. PATENT DOCUMENTS 4,593,987 6/1986 Takahashi et al. .................. 396/242 X
4,769,668 9/1988 Ishikawa et al. ......................... 396/63
4,912,495 3/1990 Ishikawa et al. ......................... 396/63

*Primary Examiner*—W. B. Perkey
*Attorney, Agent, or Firm*—Greenblum & Bernstein, P.L.C.

[57] ABSTRACT

A camera having a photographic mode automatic selecting apparatus. A photographic mode selecting device selects a photographic mode from a plurality of photographic modes. A photographic distance detecting device detects photographic distance data of a photographic lens. The photographic mode selecting device selects an appropriate photographic mode from the plurality of photographic modes based on the photographic distance data of the photographic lens.

29 Claims, 32 Drawing Sheets

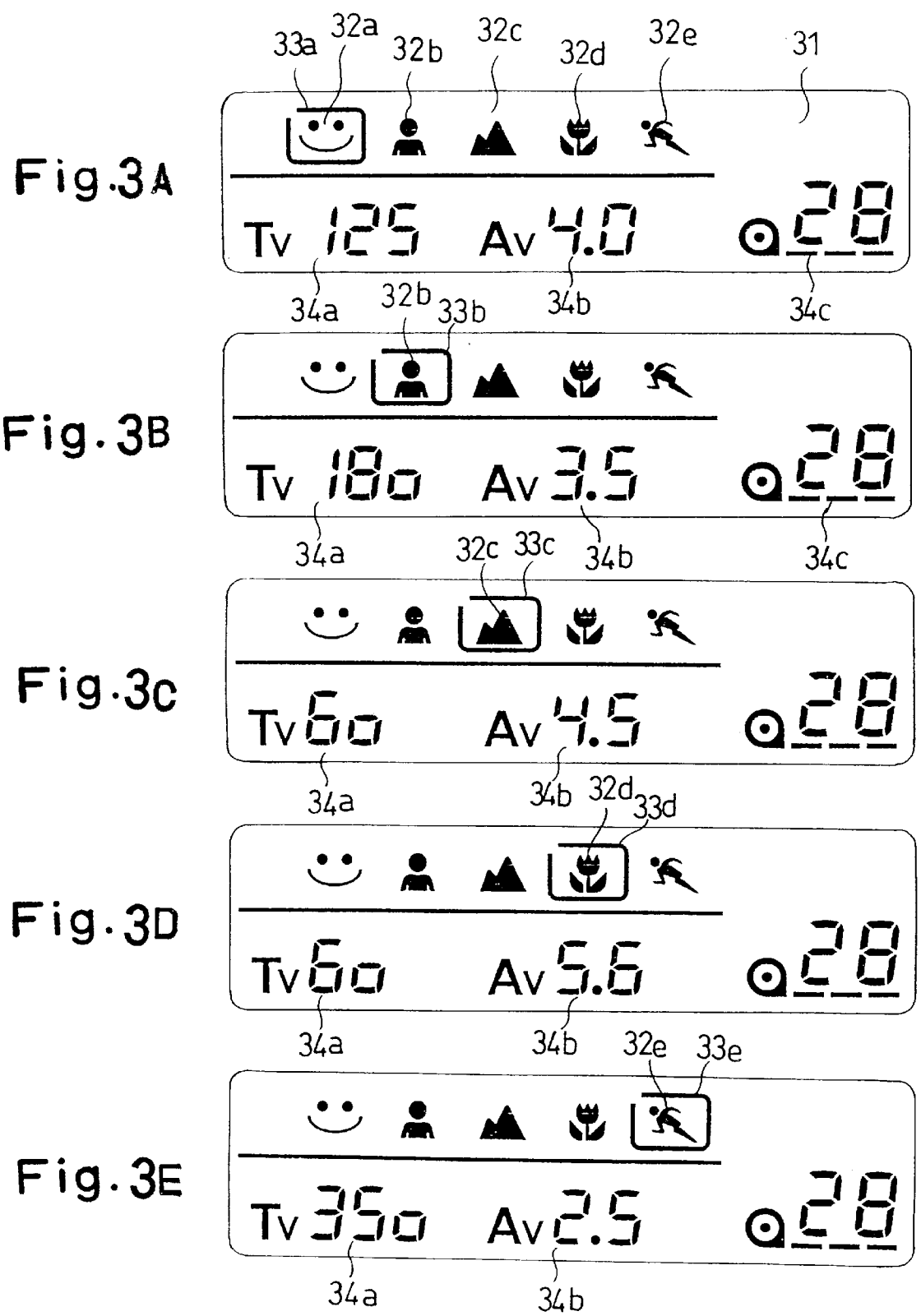

CAMERA WITH A PHOTOGRAPHIC MODE AUTOMATIC SELECTING APPARATUS

BACKGROUND OF THE INVENTION

1. Field of the Invention

The present invention relates to a camera that has a photographic mode automatic selecting apparatus which selects a photographic mode from a plurality of photographic modes.

2. Description of the Related Art

A camera, especially a single-lens reflex camera which is currently available, has a plurality of programmed exposure modes. In such a camera, a photographer has been required to select an exposure mode in which the appropriate shutter speed and aperture value are set according to the conditions of objects to be photographed. The selection can be made by push button or rotative switch.

In any selecting operation, until now, the conventional camera has required the photographer to perform such an operation by himself, and the photographer feels it is a nuisance to perform such an operation. In addition, when the selection is carried out, the re-performing of the selection is sometimes required due to a change in conditions of the object, etc. The re-performance of the operation is very troublesome, which further hinders the ability of the photographer to take photos quickly.

Also, although the photographer may ordinarily be satisfied with the mode being automatically selected by the photographic mode automatic selecting apparatus, he or she may prefer to select a photographic mode through a manual operation. If a photographic mode other than the one the photographer selected manually is automatically selected by the photographic mode automatic selecting apparatus, he or she may find their ability to take desired photographs hindered. The operation of a switch to change between a manual selection mode and an automatic selection mode may also prove troublesome and cost the photographer a photo opportunity.

In order to obtain the photographic conditions, photometric operations and automatic focusing operations must be executed. These operations are executed when the photographer depresses the shutter button halfway. Then, in order to confirm the selected photographic mode, the photographer is required to depress the shutter button halfway. However, he or she may accidentally fully depress the shutter button, resulting in an unexpected exposure.

SUMMARY OF THE INVENTION

It is an object of the present invention to provide a camera in which the most appropriate photographic mode is automatically selected according to the photographic conditions.

To achieve the object mentioned above, according to the present invention, there is provided a camera provided with a photographic mode automatic selecting apparatus, comprising a photographic mode selecting means which can select a photographic mode from a plurality of photographic modes, and a photographic distance detecting means which detects photographic distance data of a photographic lens in which the aforementioned photographic mode selecting means selects an appropriate photographic mode from several modes, based on photographic data.

The camera also comprises a focal length detecting means which detects a focal length of a photographic lens, in which case the selection of the photographic mode is based on photographic distance and length data.

The camera further comprises a photographic mode manual selecting means which selects a specified photographic mode from a plurality of photographic modes corresponding to a manual operation, in which a photographic mode automatic selection by the photographic mode automatic selecting means is inhibited when a photographic mode is manually selected by the photographic mode manual selecting means.

The camera further comprises a shutter button which actuates a controlling means to execute a photographic operation. The controlling means is provided with a photographic mode automatic selecting function which automatically selects an appropriate photographic mode from a plurality of photographic modes based on photographic conditions. An operating means aside from the shutter button is also provided, which actuates the controlling means to execute an operation by the photographic mode automatic selecting function.

The present disclosure relates to subject matter contained in Japanese Patent Application Nos. HEI 8-89579 (filed on Apr. 11, 1996), HEI 8-325714 and HEI 8-325715 (both filed on Dec. 5, 1996) which are expressly incorporated herein by reference in their entireties.

BRIEF DESCRIPTION OF THE DRAWINGS

The invention will be described below in detail with reference to the accompanying drawings, in which:

FIGS. 3A to 3E are schematic views of display modes of an external displaying means of a single-reflex camera according to the present invention;

DESCRIPTION OF THE PREFERRED EMBODIMENTS

The present invention will now be described specifically with reference to drawings attached hereto.

Figure 1:
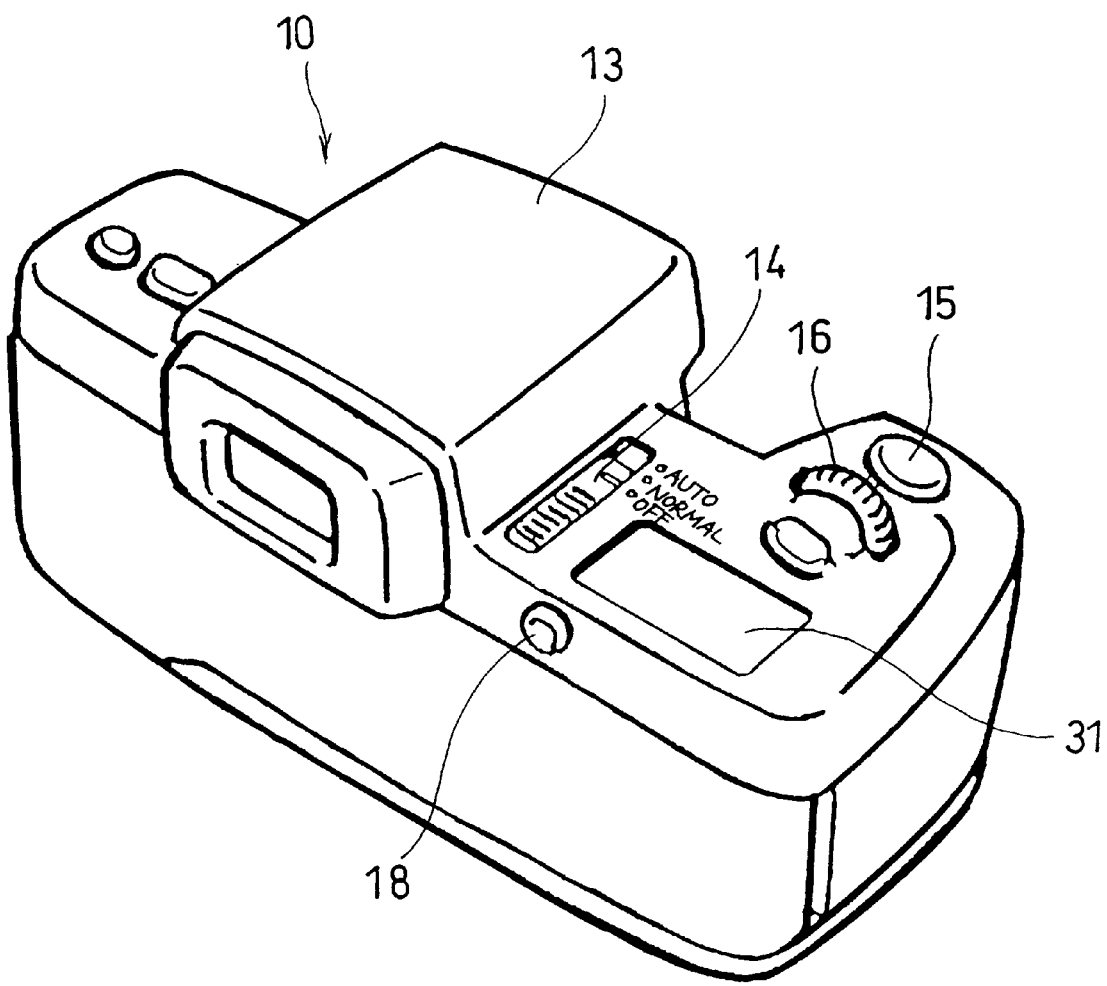
FIG. 1 is a schematic perspective view of a structure of an embodiment, as seen from a rear of a body of a single-lens reflex camera to which the present invention is applied.
Figure 2:
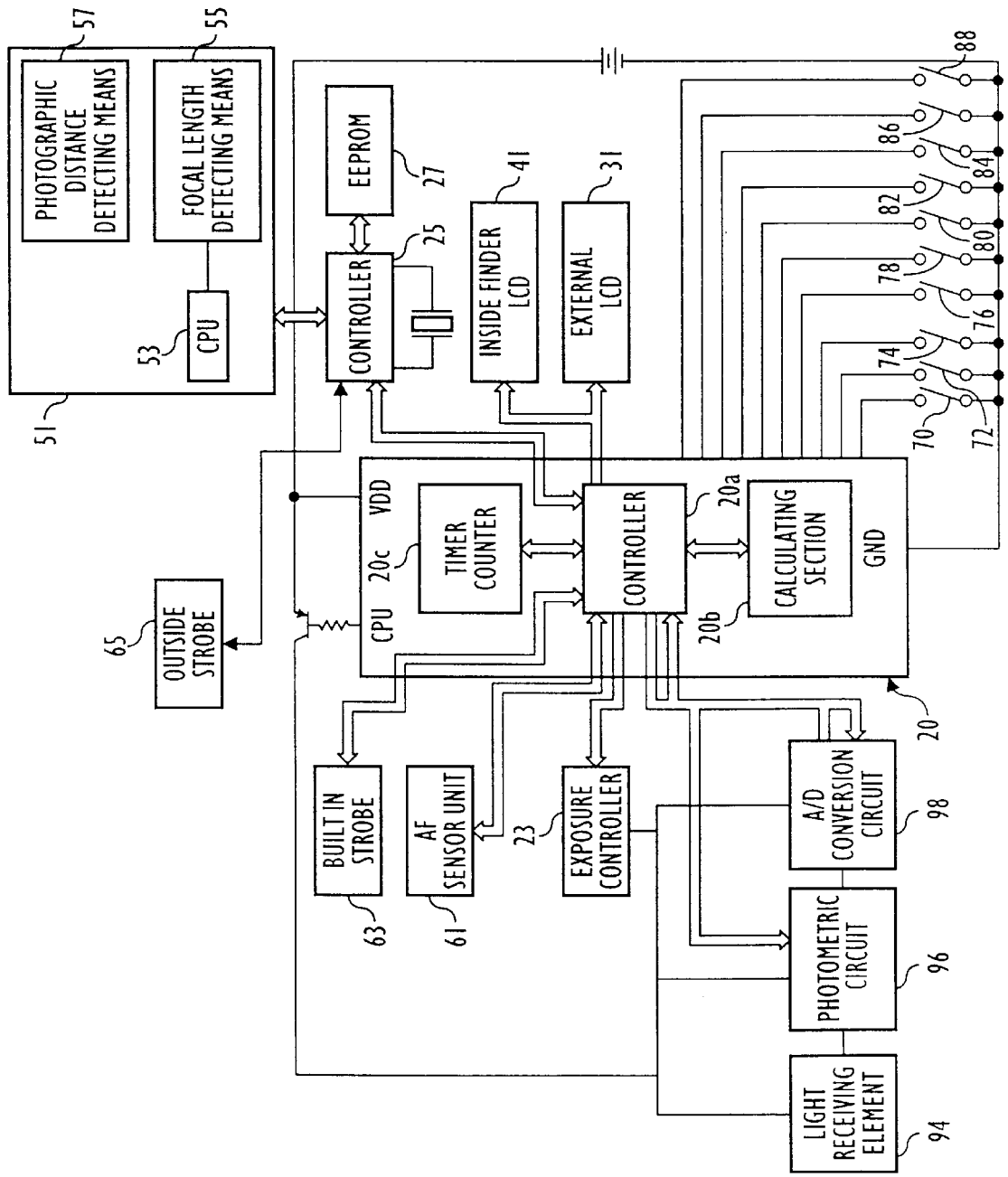
FIG. 2 is a block diagram of an embodiment of main elements of a control system of a single-lens reflex camera to which the present invention is applied.

FIG. 1 is a schematic perspective view of a structure of an embodiment as seen from the rear of the body of a single-lens reflex camera to which the present invention is applied, and FIG. 2 is a block diagram of the control system of such a camera.

A camera body 10 has a photographic lens 51 as one of several interchangeable lenses. The photographic lens 51 is a detachable lens, and is mounted to the camera body 10. Although the specifications of the photographic lens 51 will not be discussed in the present invention, the photographic lens 51 is, for example, a power zoom lens in which a focal length can be set freely from 28 mm up to 80 mm, by driving a mounted zoom motor (not shown). There is a penta-roof portion 13, formed as a bulge at the top of the camera body 10, inside which a penta prism and a built-in electronic flash are stored. The built-in electronic flash (not shown) is a pop-up type, which is retractable inside the penta-roof portion 13. A main switch lever 14 is mounted to the right side (in FIG. 1) of the penta roof portion 13, as a slide switch which moves in the forward and backward directions of the camera body 10. The main switch lever 14 has three positions: OFF, NORMAL, and AUTO. In the "OFF" position, both electric power and the photographic mode automatic selecting mode are OFF. In the "ON" position, the electric power is ON. In the "AUTO" position, both the electric power and the photographic mode automatic selecting mode are ON.

The photographic mode automatic selecting mode (PICTMODE) in the present embodiment has five programmed exposure modes: a normal mode which is suitable for beginning photographers; a portrait mode which is suitable for photographing a full-length or half-length portrait; a scenic mode which is suitable for photographing scenery in the distance; a close-up mode (macro mode) which is suitable for photographing an object in a close-up state; and an action mode which is suitable for photographing a moving object. The photographic mode automatic selecting mode (PICTMODE) automatically selects one of the modes discussed above, based on photographic distance information and a focal length of the photographic lens 51.

The grip portion is formed as a bulge in the right end portion of the camera body 10, and a shutter button 15 is provided at the front top end of the grip portion of the camera body 10. An UP/DOWN lever 16 is provided in the rear of the shutter button 15. The UP/DOWN lever 16 is used for UP or DOWN operation of the specified variable data, and is rotatively provided along an axis which is substantially parallel to the optical axis of the photographic lens 51 (namely, along an axis which is substantially elongated in the forward and backward directions of the camera body 10). An exposure compensation button 18 is further provided at the top of the rear surface of the camera body 10.

The camera body 10 further comprises an external LCD (liquid crystal display) 31 and an inside finder LCD 41 as a display means. The external LCD 31 displays the selected exposure mode, shutter speed (time value), aperture value Av, and number of photographings. The inside finder LCD 41 displays the selected exposure mode, shutter speed Tv, aperture value (F-number), and whether the camera is focused or defocused.

Various modes of displaying the external LCD 31 and the inside finder LCD 41 are described with reference to FIGS. 3 and 4. FIGS. 3A to 3E illustrate examples of displays by the external LCD 31. There are five pictures drawn in a lateral line on the upper portion of the external LCD 31, which respectively indicate five exposure modes. Namely, a picture 32a (smiling face) which indicates the normal mode (green mode), a picture 32b (person) which indicates the portrait mode, a picture 32c (mountain) which indicates the scenic mode, a picture 32d (flower) which indicates the close-up mode, and a picture 32e (running person) which indicates the action mode, in this order from the left. These pictures 32a through 32e in the present embodiment are drawn by printing, not by liquid crystal display. There are frames 33a through 33e formed by liquid crystal segments in order to enclose the corresponding pictures 32a through 32e. Thus the selected mode is distinctively indicated. The selected mode is indicated by the emergence of any frame among the frames 33a through 33e, which encloses the corresponding picture among the pictures 32a through 32e. In the drawings of FIG. 3, FIG. 3A is the state in which the green mode (normal mode) is selected, FIG. 3B is the state in which the portrait mode is selected, FIG. 3C is the state in which the scenic mode is selected, FIG. 3D is the state in which the close-up mode is selected, and FIG. 3E is the state in which the action mode is selected.

The lower portion of the pictures 32a through 32e are displays formed by liquid crystal segments, namely, a shutter speed (time value) Tv display 34a, an aperture value Av display 34b, and a photographing number display 34c.

Figure 4E:
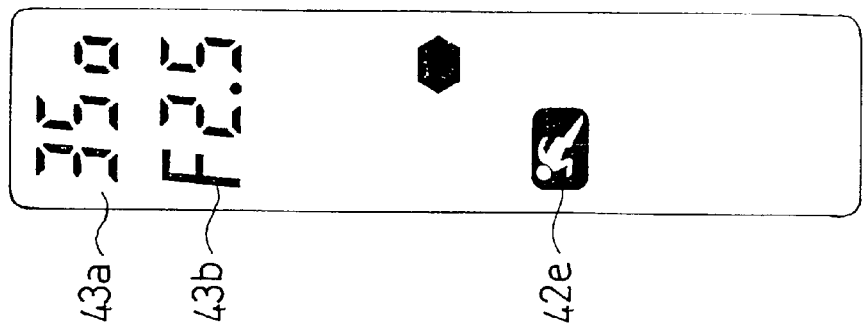
FIGS. 4A to 4E are schematic views of display modes of an inside finder displaying means of a single-lens reflex camera according to the present invention.
Figure 4D:
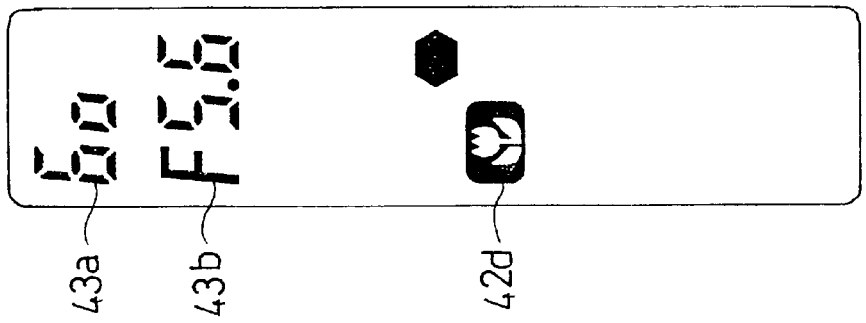
Figure 4C:
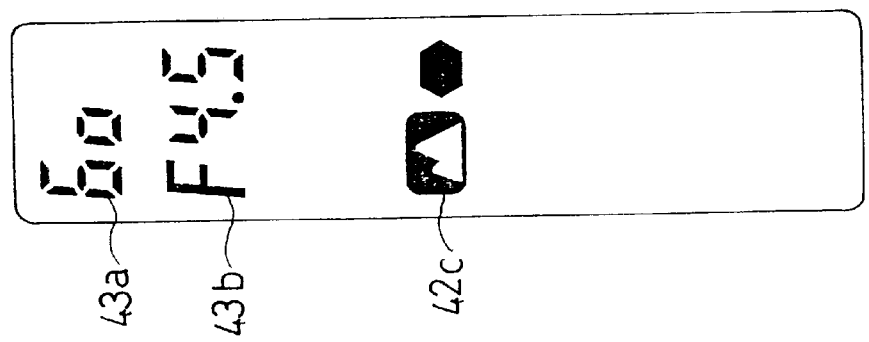
Figure 4B:
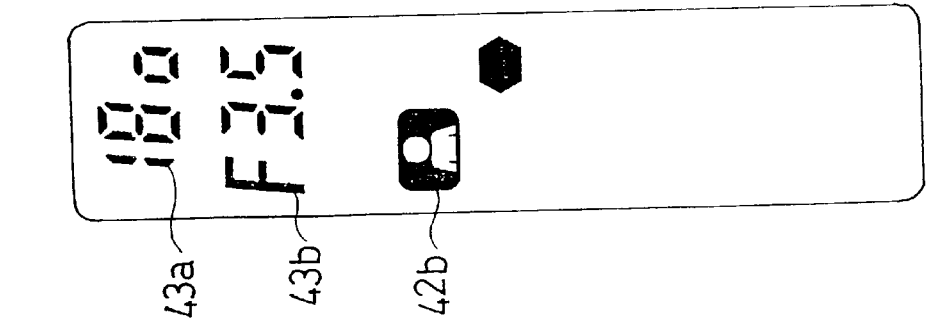
Figure 4A:
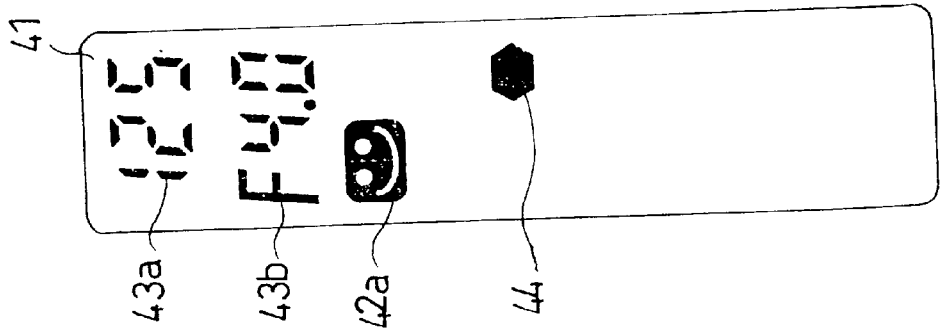

FIGS. 4A to 4E illustrate an embodiment of the inside finder LCD 41. The inside finder LCD 41 displays the substantially simplified contents of the external LCD 31. The inside finder LCD 41 is positioned so that the photographer may observe the display outside the visual field along the short side of the finder. There is a shutter speed display 43a at the top, and provided below the shutter speed display 43a is an aperture value (F-number) display 43b. There are further displays below the aperture value display 43b, namely, a picture 42a (smiling face) which indicates the normal mode (green mode), a picture 42b (person) which indicates the portrait mode, a picture 42c (mountain) which indicates the scenic mode, a picture 42d (flower) which indicates the close-up mode, and a picture 42e (running person) which indicates the action mode, in this order from the highest position (below the aperture value display 43b) of FIG. 4. These pictures 32a through 32e are formed by liquid crystal segments, so that the selected picture among them emerges. In the drawings of FIG. 4, FIG. 4A is the state in which the green mode (normal mode) is selected, FIG. 4B is the state in which the portrait mode is selected, FIG. 4C is the state in which the scenic mode is selected, FIG. 4D is the state in which the close-up mode is selected, and FIG. 4E is the state in which the action mode is selected. A focalize display 44 formed as a hexagonal element is provided adjacent to the picture 42c (display of the scenic mode), which indicates whether the focusing state is focused, front focus or rear focus.

Figure 19:
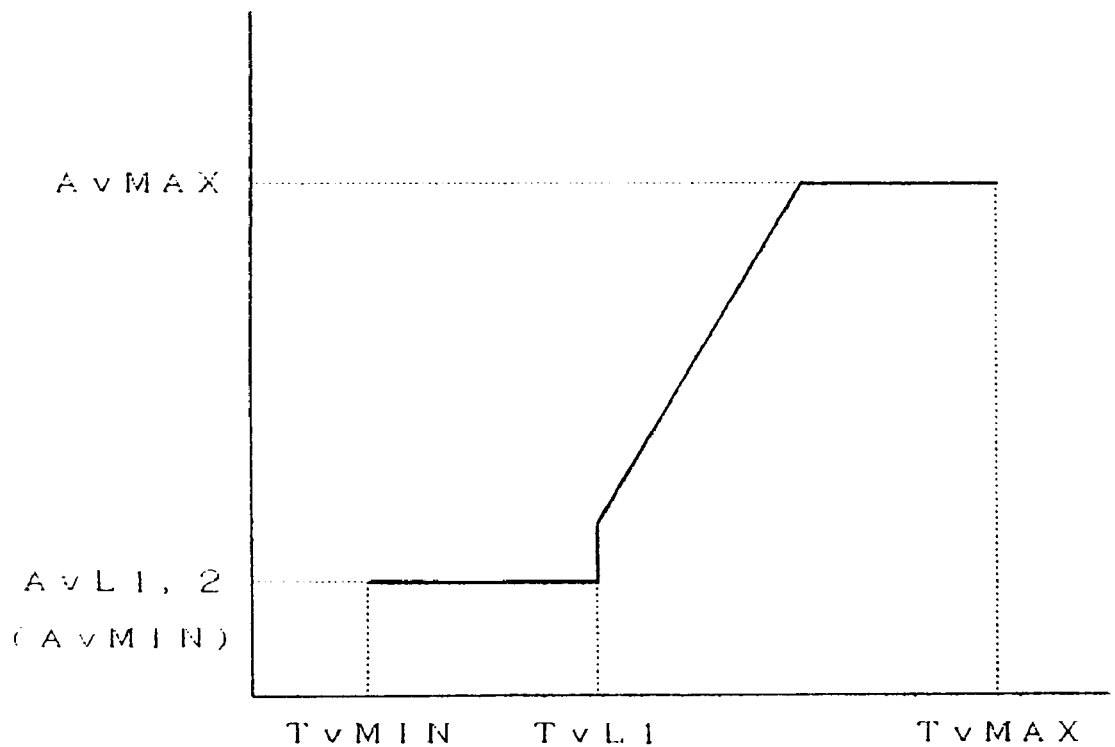
FIG. 19 is a graphic chart of an example of a programmed diagram in a normal mode.
Figure 20:
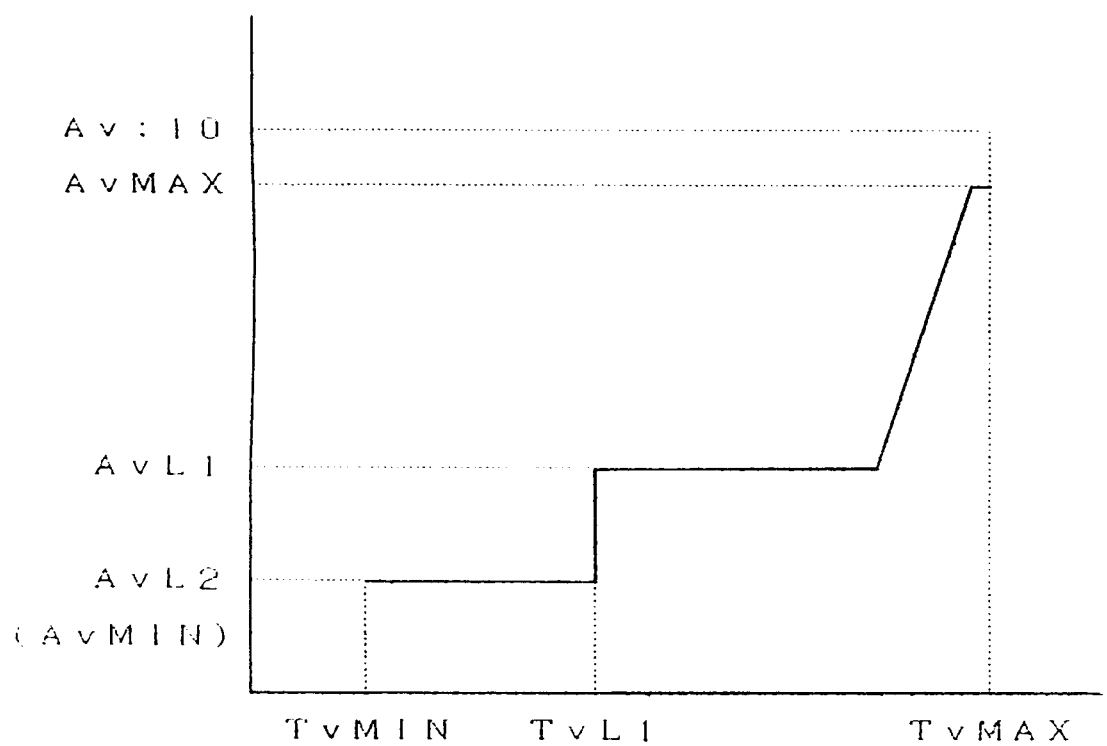
FIG. 20 is a graphic chart of an example of a programmed diagram in a portrait mode.
Figure 21:
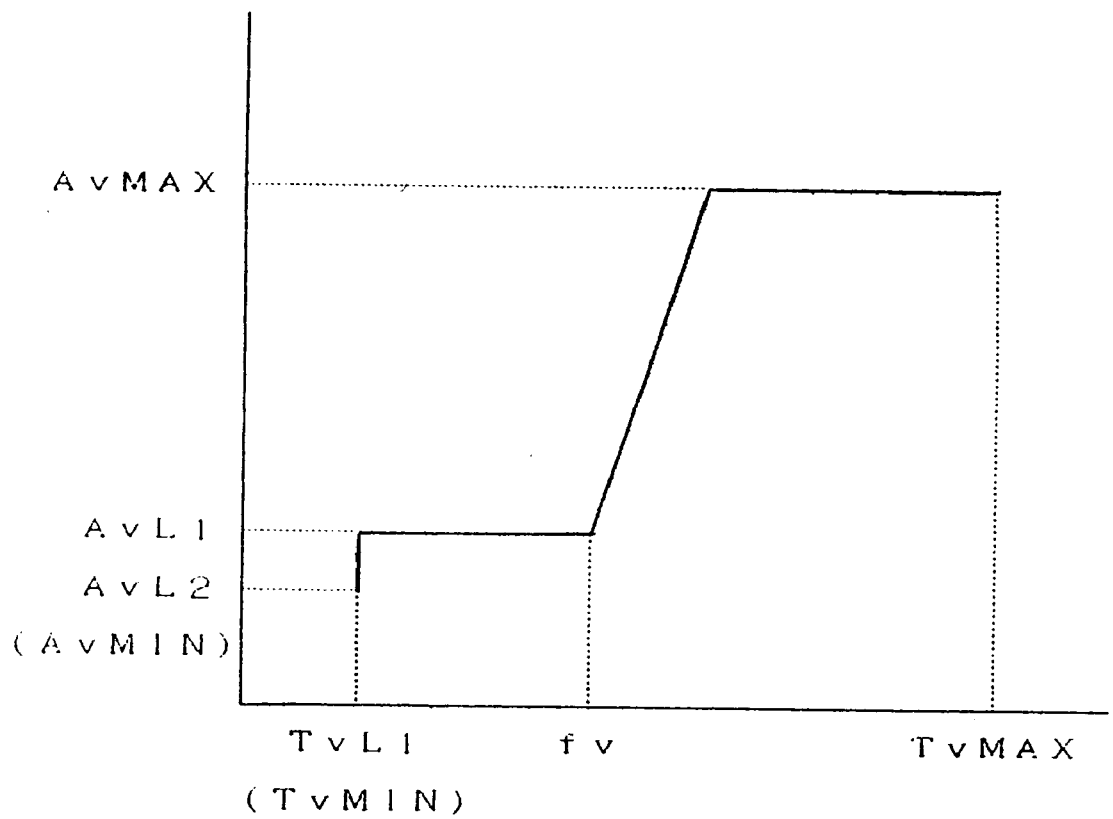
FIG. 21 is a graphic chart of an example of a programmed diagram in a scenic mode.
Figure 22:
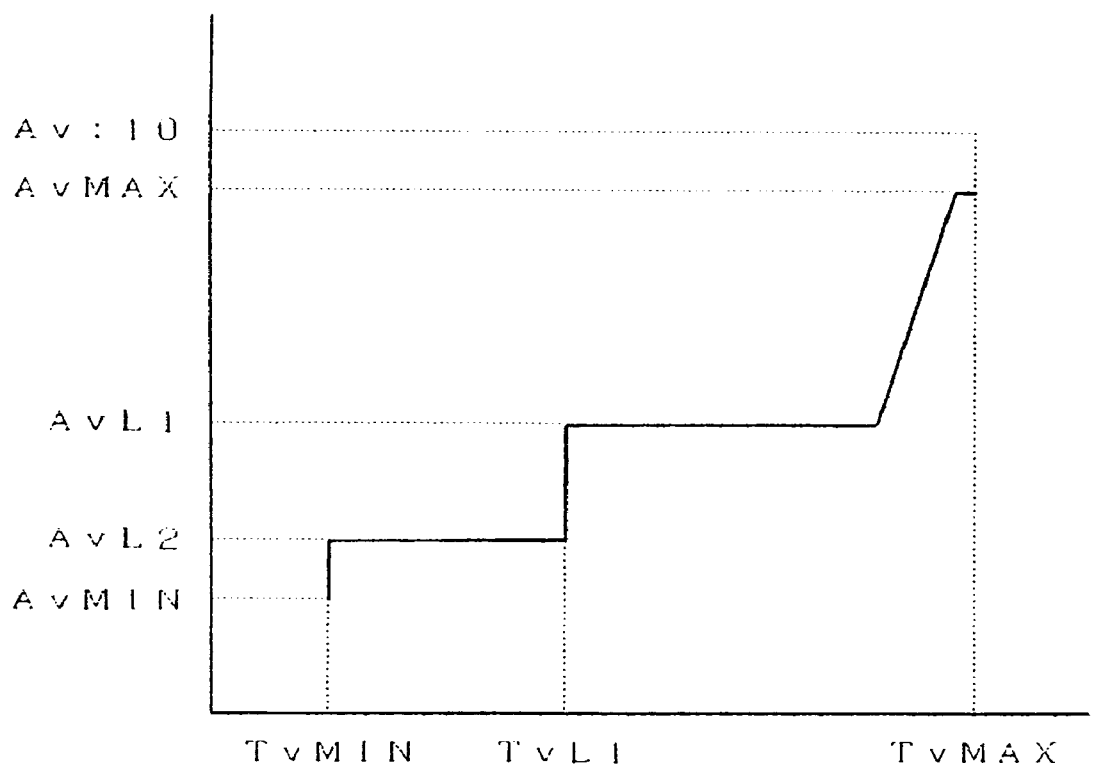
FIG. 22 is a graphic chart of an example of a programmed diagram in a close-up mode.
Figure 23:
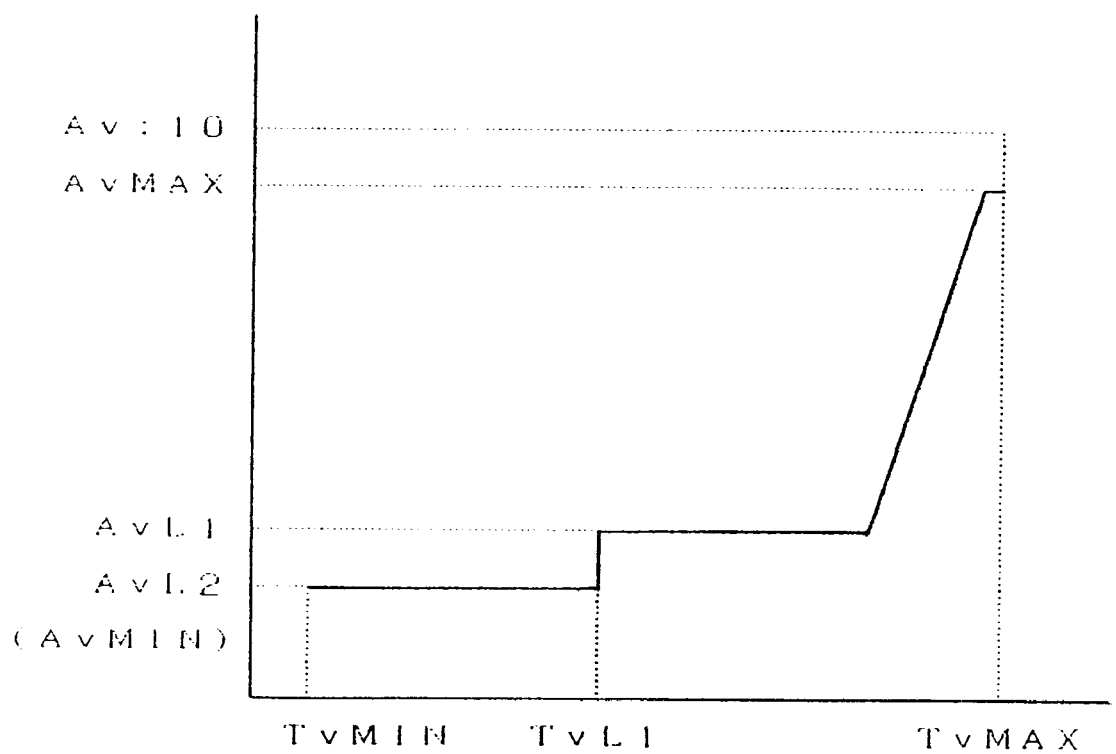
FIG. 23 is a graphic chart of an example of a programmed diagram in an action mode.

Programmed diagrams of the programmed exposure modes in the present embodiment are shown in FIGS. 19 through 23. FIG. 19 is the normal mode, FIG. 20 is the portrait mode, FIG. 21 is the scenic mode, FIG. 22 is the close-up mode, and FIG. 23 is the action mode. In these diagrams, fv represents an apex conversion value of the focal length, Tvf represents a shutter speed limit allowing camera shake according to focal length, Avf represents a most appropriate Av value (aperture value), and Avf shift represents a compensation value, which are respectively defined in the following formulae:

fv=$\log_2$(focal length)

Tvf=(3/4)*fv+2

Avf=AvMIN+1+Avf shift

Avf shift=(5/4)*(6.5−fv)

(Provided: 0≦Avf shift≦2)

in the diagrams, TVMIN represents the minimum shutter speed, and TVMAX represent the maximum shutter speed, which can be controlled respectively by the camera body 10, and which are both stored in an EEPROM 27. AvMIN represents the minimum aperture value of the photographic lens 51, and AvMAX represents the maximum aperture value of the photographic lens 51, which are both stored in a ROM of a CPU 53 on the side of the lens. TvL1 represents the first Tv limit value, AvL1 represents the first Av limit value, and AvL2 represents the second Av limit value.

"The Autofocus Single-lens Reflex Camera Control System"

The structure of the control system in regard to an AF (auto-focus) single-lens reflex camera is described with reference to FIG. 2, although the specified illustration is omitted in the present embodiment.

Light from the object goes inside the camera body 10 through a zoom optical system of the photographic lens 51, and is mostly reflected by a main mirror into a penta mirror (not shown) which constructs a finder optical system. Part of the reflected light is incident upon a light receiving element 94 of a photometric IC (Integrated Circuit). Part of the light inside the camera body 10 which is incident upon a half mirror portion (not shown) of the main mirror, is reflected and incident upon an AF sensor unit 61. The AF sensor unit 61 is, for example, a phase difference type of sensor unit comprising a CCD line sensor which is known per se. A CPU 20 is provided on the side of the camera body 10, which calculates the defocus amount based on an image data input from the AF sensor unit 61. The AF sensor unit 61 actuates an AF motor (not shown) so that a focusing lens of the photographic lens 51 is moved to position in which the defocus amount becomes 0 or the minimum amount possible.

The photometric IC is provided with a light receiving element 94 which receives light from an object, and the light receiving element 94 generates an electrical signal corresponding to the amount of receiving light. The generated electrical signal is logarithmically compressed in a photometric circuit 96, and is A/D converted in an A/D conversion circuit 98, then is finally output as a photometric signal to the CPU 20 on the camera body side. The CPU 20 on the camera body side performs the predetermined calculation based on the photometric signal and film speed information, so that an appropriate shutter speed and aperture value for exposure are obtained. Consequently, an exposure controller 23 is actuated based on the obtained shutter speed and aperture value. Although the structure of the exposure controller 23 is not specifically discussed, the exposure controller 23 is provided with a focal-plane shutter, and with a diaphragm driver which actuates the diaphragm of the photographic lens 51. Additionally, when the shutter is released, the CPU 20 on the camera body side actuates a mirror motor (not shown) for UP/DOWN operation of the main mirror via a motor driving circuit (not shown), and when the exposure is completed, the CPU 20 actuates a winding motor (not shown) in order to wind the film. The camera body 10 is provided with a built-in strobe (built-in electronic flash circuit) 63, and an outside strobe (outside electronic flash) 65 can be attached thereto. The CPU 20 on the camera body side communicates with the outside strobe 65 so that the CPU 20 may store the flash data like guide numbers, etc., (flash communication), thus the controls of charge, flash and flash stop of the strobes 63 and 65 are operated by the CPU 20.

The CPU 20 on the camera body side is further provided with a series of connecting terminals at the lens mounting portion (not shown). The connecting terminals are in contact with corresponding connecting terminals of the photographic lens 51 provided at the mounting portion thereof, thus the communications like data, command, and others, are carried out between the CPU 20 on the camera body side and the CPU 53 on the lens side.

The CPU 20 on the camera body side is provided with a controlling section 20a which includes a ROM and a RAM. The ROM stores the program for overall camera control, and the RAM stores the predetermined data. The CPU 20 is also provided with a calculation section 20b and a timer counter 20c. The calculation section 20b performs, the condition calculation in order to select the exposure mode, the AF (autofocus) calculation, and the AE (automatic exposure) calculation, among others. An EEPROM 27, as an outside memory means, is connected with the controlling section 20a via a controller 25. The EEPROM 27 stores not only various type of constants specified for the camera body 10, but also various types of functions and constants used for the condition calculation, AF calculation, AE calculation, and the like.

The CPU 20 on the camera body side is connected with a main switch 70 and a mode switch (exposure mode automatic selecting switch) 71 which are turned ON or OFF corresponding to the slide position of the main switch lever 14, a photometric switch 74 which is turned ON when the shutter button 15 is depressed halfway (half step), a release switch 76 which is turned ON when the shutter button 15 is fully depressed (full step), an exposure compensation switch 78 which is turned ON or OFF in synchronization with the depression of the exposure compensation button 17, an UP switch 80 and a DOWN switch 82 which are turned ON or OFF in synchronization with the UP/DOWN lever 16, and a drive switch 84 which is turned ON or OFF in synchronization with a drive switch (not shown).

"The Photographic Lens"

One of the features in the embodiment of the present invention is the automatic selection of the programmed exposure mode, corresponding to the conditions based on the focal length of the photographic lens 51 and the photographic distance, and to the focusing state. The selection (the picture automatic selection) is automatically performed among photographic modes, namely, the normal, portrait, scenic, close-up and action modes. Consequently, a focal length detecting means 55 which detects the present focal length, and a photographic distance detecting means 57 which detects the photographic distance, are provided in the photographic lens 51. The respective detecting means 55 and 57 are connected with the CPU 53 on the lens side. The focal length and the photographic distance are detected by the respective detecting means 55 and 57, and are transmitted to the camera body 10 via the lens-body communication, and the predetermined process is carried out by the CPU 20 on the camera body side.

The photographic lens 51 is provided with a variable power lens group and a focusing lens group (not shown) which are known per se. The variable power lens group is moved, either by the zoom motor mounted on the photographic lens 51, or by a manual operation by the photographer, and the focusing lens group is moved by an AF motor mounted on the camera body 10. Thus the focusing is carried out. The focal length f is detected, as the position of the variable power lens group, by a focal length detecting code plate of the focal length detecting means 55.

In the embodiment of the present invention, the focal length is detected by focal length code which corresponds to the position of the focusing lens group. The focal length code is converted by apex conversion to the focal length fv with reference to the table data stored in a lens ROM. The relation of the focal length (mm) and the focal length fv obtained by the apex conversion is shown in the following table:

TABLE 1

| Focal Length (mm) | 1 | 2 | 4 | 8 | 16 | 32 | 64 | 128 | 256 | 512 | 1024 |
|---|---|---|---|---|---|---|---|---|---|---|---|
| fv | 0 | 1 | 2 | 3 | 4 | 5 | 6 | 7 | 8 | 9 | 10 | in which, in the case of the single focal length, such a focal length fv is stored in the lens ROM.

In the embodiment of the present invention, the position of the focusing lens group is detected by setting the shortest photographic distance as the reference, in steps (eight steps total) of the photographic distance Dv obtained apex conversion. The correspondence of the photographic distance (m) and the apex distance Dv is shown in the following table:

TABLE 2

| Photo.Dist.(m) | 1 | 1.4 | 2 | 2.8 | 4 | 5.6 | 8 | 11 | 16 | 22 | 32 |
|---|---|---|---|---|---|---|---|---|---|---|---|
| Dv | 0 | 1 | 2 | 3 | 4 | 5 | 6 | 7 | 8 | 9 | 10 |

The distance in which the object is focused, namely the photographic distance, is firstly detected, as the lens position of the variable power lens group, by a distance code plate (not shown) of the photographic distance detecting means 57. The detected lens position is then converted to the photographic distance. In the embodiment of the present invention, the photographic distance is obtained as the remainder from the shortest photographic distance. Namely, provided that the shortest photographic distance is Dv near, and the detected position of the focusing lens group is $\Delta Dv$, which represents the distance data corresponding to the remainder from the shortest photographic distance. Thus, the photographic distance Dv is obtained by a formula:

Dv=Dv near+$\Delta$DV

Table 3 shows the relationship between the photographic distance code and the distance data $\Delta$DV:

TABLE 3

| Photographic Distance Code | 7 | 6 | 4 | 5 | 1 | 0 | 2 | 3 |
|---|---|---|---|---|---|---|---|---|
| $\Delta$Dv | 0 | 1 | 2 | 3 | 4 | 5 | 6 | 7 |

The shortest photographic distance Dv, the remainder $\Delta$Dv from the shortest photographic distance, and the focal length fv are transmitted from the CPU 53 on the lens side to the CPU 20 on the camera body side. In the embodiment of the present invention, the shortest photographic distance Dv near and the remainder $\Delta$Dv from the shortest photographic distance are transmitted to the CPU 20 of the camera body 10 as 8-bit photographic distance data.

The CPU 20 of the camera body 10 calculates photographic magnification Mv, based on the shortest photographic distance Dv, the remainder $\Delta$Dv from the shortest photographic distance, and the focal point data fv, in accordance with the following formula:

Mv=(Dv+2O)/2−Fv

The relationship between the photographic magnification Mv and the actual photographic magnification is shown in the following table:

TABLE 4

| 1/Photo.Mgn.(X) | 1 | 1.4 | 2 | 2.8 | 4 | 5.6 | 8 | 11 | 16 | 22 | 32 |
|---|---|---|---|---|---|---|---|---|---|---|---|
| Mv | 0 | 1 | 2 | 3 | 4 | 5 | 6 | 7 | 8 | 9 | 10 |

In the embodiment of the present invention, the above mentioned photographic distance and the photographic magnification are used as the conditions for mode selection.

"Camera Control Operation"

The camera control operation in the embodiment of the present invention will be described below with reference to the flow charts shown in FIGS. 5 through 18. These operations are performed by the CPU 20 on the camera body side according to the program stored in an internal ROM of the CPU 20.

Figure 5:
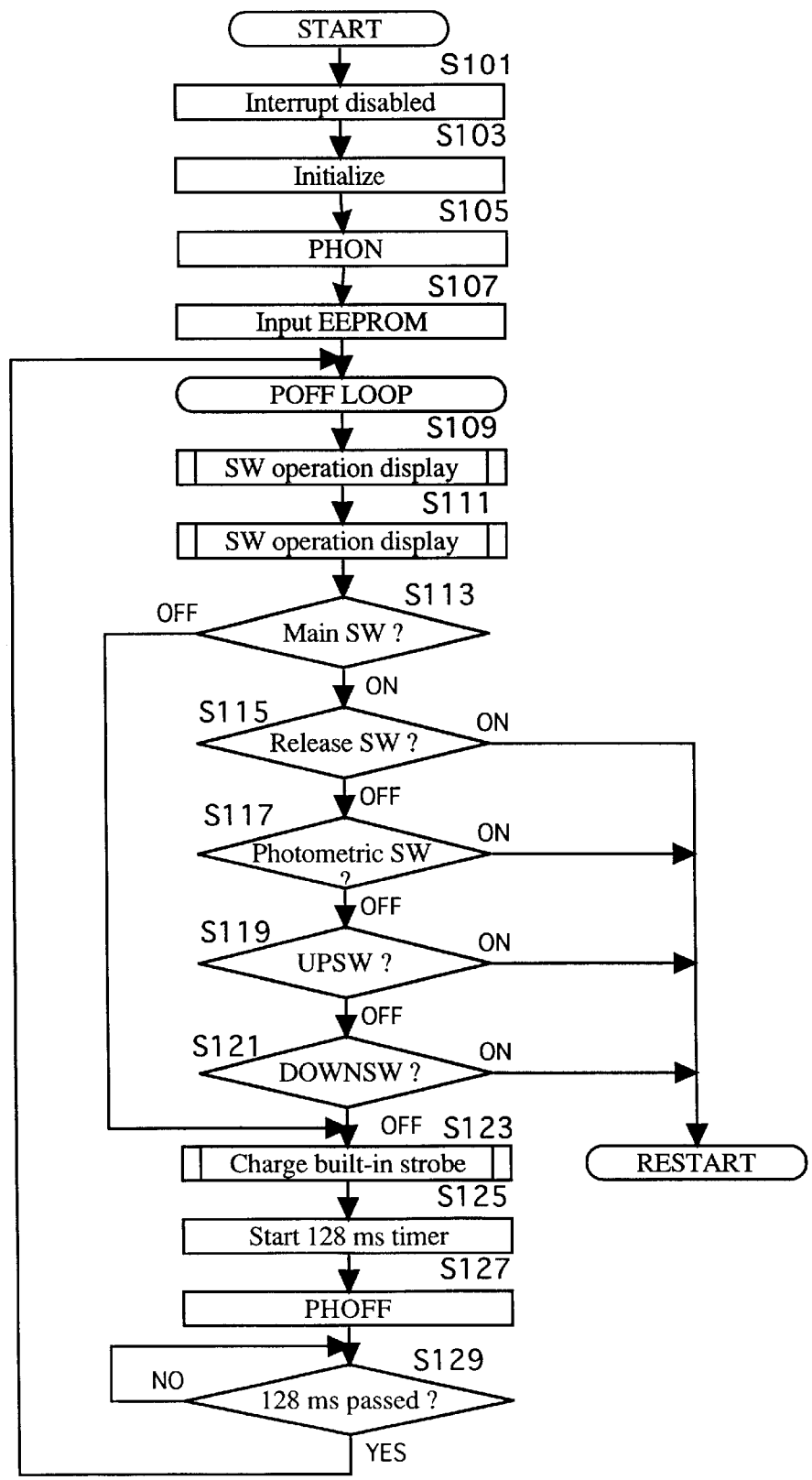
FIG. 5 is a flow chart of an operation in a main routine (START operation) of a single-lens reflex camera according to the present invention.

FIG. 5 shows the flow chart of the START operation as a main routine of the camera control operation. This operation is actuated when the battery is loaded. The electric power of the battery is continuously supplied to the CPU 20. Firstly, the interrupt disabled operation is executed at step S101, the RAM, registers, and flags are initialized at step S103, and a PHON (Power Hold ON) operation is executed at step S105, at which the electric power of the battery is supplied to the peripheral circuits. The data memorized in the EEPROM 27 is stored in the RAM of the CPU 20 on the camera body side (step S107). When the above operations are completed, control proceeds to a POFF loop operation, which is repeated when the main switch 70 is turned OFF.

"POFF Loop Operation"

The POFF loop operation corresponds to a stand-by operation, which checks the states of switches, and which proceeds to various operations according to the states of switches which are turned ON.

When control enters the POFF loop operation, a SW operation display operation is called twice (steps S109 and S111). Operations according to the ON/OFF states of the main switch 70, the exposure mode automatic selection switch 71, the release switch 76, the photometric switch 74, the UP switch 80 and the DOWN switch 82, are executed at steps S109 and S111. The displays of the external LCD 36 and the inside finder LCD 41 are controlled according to the above operations. The SW operation display operation is executed twice (steps S109 and S111) in order to coincide with the number of callings of the PON loop operation which will be described hereinafter.

Figure 11:
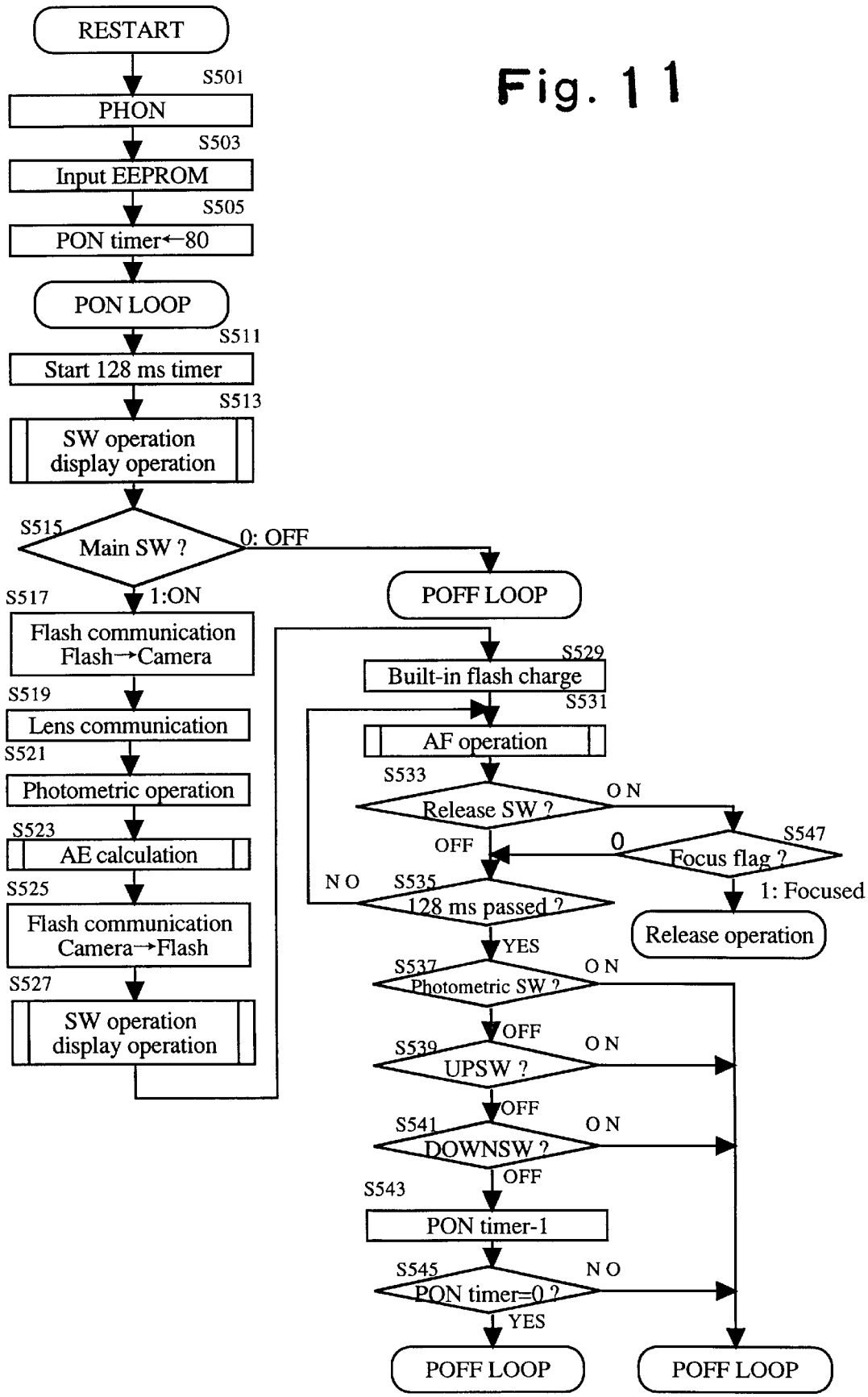
FIG. 11 is a flow chart of a RESTART operation of a single-lens reflex camera according to the present invention.

When the main switch 70 is turned ON, further, when any of the following switches are turned ON: the mode switch (exposure mode automatic selection switch) 72; the release switch 76; the photometric switch 74; the UP switch 80; and the DOWN switch 82, the RESTART operation shown in FIG. 11 is executed (steps S113, S115, S117, S119, S121).

When the main switch 70 is turned OFF, control skips the steps S115 through S121, then control calls the built-in strobe charge operation at step S123, and starts the 128 ms timer at step S125. The PHOFF operation is executed at step S127 which cuts off the electrical power supply to the peripheral circuits, and control waits for the time set on the 128 ms timer to expire. When the time expires at step S129, the control is returned to step S109, and the operation is repeated from step S109 to step 129.

"SW Operation Display Operation"

Figure 6:
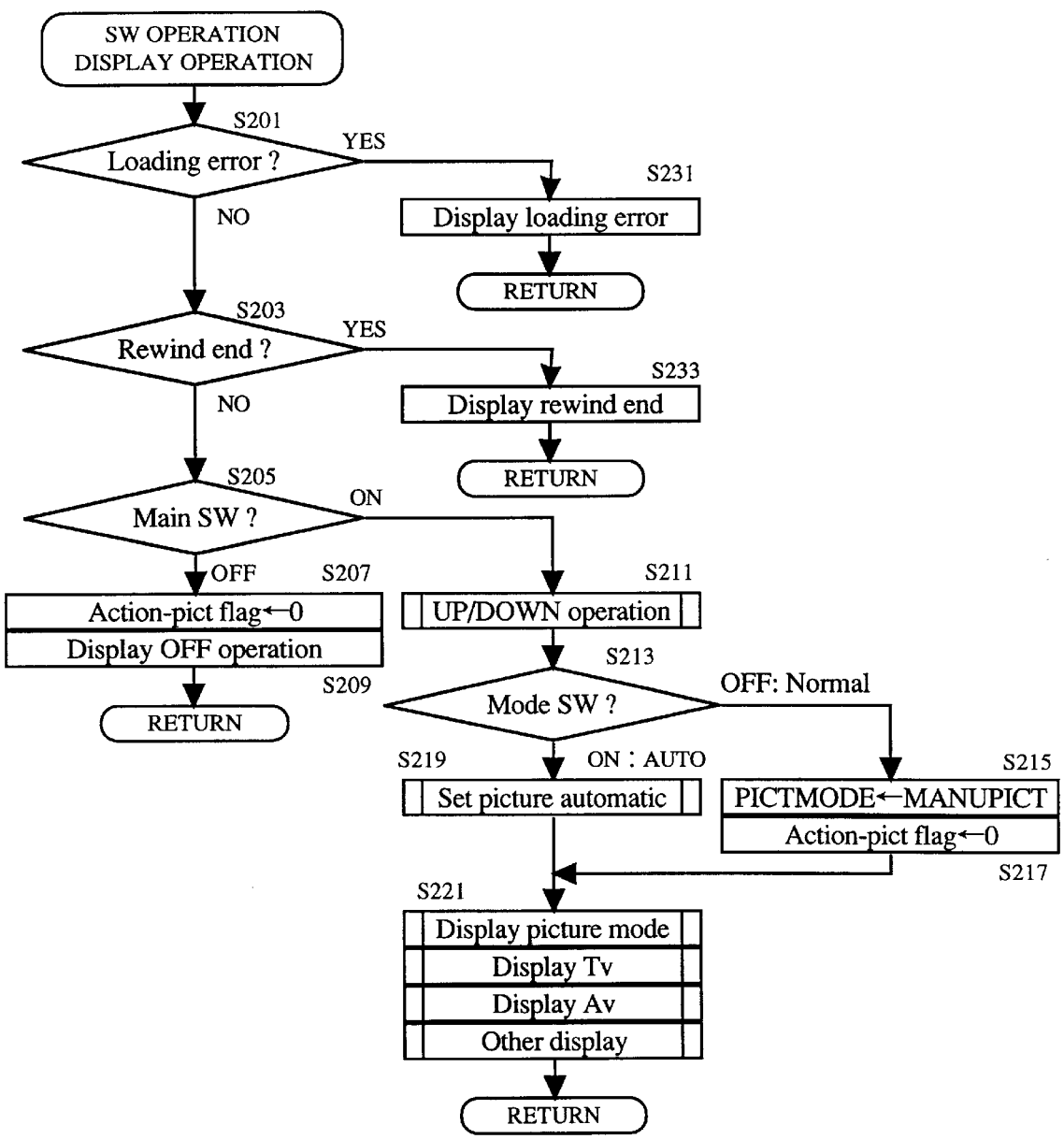
FIG. 6 is a flow chart of a displaying operation of a single-lens reflex camera according to the present invention.

The SW operation display operation, which is executed twice at steps S109 and S111, is described below in detail with reference to the flow chart shown in FIG. 6. The SW operation display operation checks the state of the camera, and displays any indication according to the state of the camera at that time.

When control enters the SW operation display operation, whether the loading error of film is checked, and in the case of loading error, the loading error display is executed, and control is returned (steps S201, S231). If the film is loaded without error, whether the rewind end is checked, namely, whether the film has been rewound is checked, and in the case of rewind end, the rewind end display is executed, and control is returned (steps S203, 233).

When neither the loading error nor the rewind end occurs, the following operations are executed.

When the main switch 70 is turned OFF, an action-pict flag is set to "0", the displays of the external LCD 36 and the inside finder LCD 41 are turned OFF, and control is returned (steps S205, S207, S209). The action-pict flag identifies whether the object is in action (moving), and if the object is judged to be in action, the flag is set to "1".

When the main switch 70 is turned ON, the UP/DOWN operation is executed (steps S205, S211). In the UP/DOWN operation, when the UP switch 80 or the DOWN switch 82 is turned ON, the corresponding operation is executed. Then, the state of the mode switch 72 is checked, namely, whether the picture automatic set mode (the exposure mode automatic selection mode) is set to the normal mode is checked (step S213). When the mode switch 72 is turned OFF, since the normal mode is presently selected, the term "MAN-UPICT" is input to the PICTMODE, and the action-pict flag is set to "0" (steps S215, S217). Then, the picture mode, the shutter speed Tv, the aperture value Av, and other indications like the photographing number are displayed, and control is returned (step S221). When the mode switch 72 is turned ON, namely, when the mode is the picture automatic set mode, the picture automatic set operation is executed. Then, the display operations at step S221 are executed and control is returned (steps S213, S219, S221).

PICTMODE is an identifier which identifies whether the PICTMODE (programmed exposure mode) is engaged. In regard to the PICTMODE of the embodiment of the present invention, the normal mode is identified by numeral "0", similarly, the portrait mode by "1", the scenic mode by "2", the close-up mode by "3", and the action mode by "4". When the mode switch 72 is in the NORMAL position, the normal mode is selected as the initial mode. The initial mode can be selected among the other modes afterwards, by a manual operation.

"Picture Automatic Set Operation"

Figure 7:
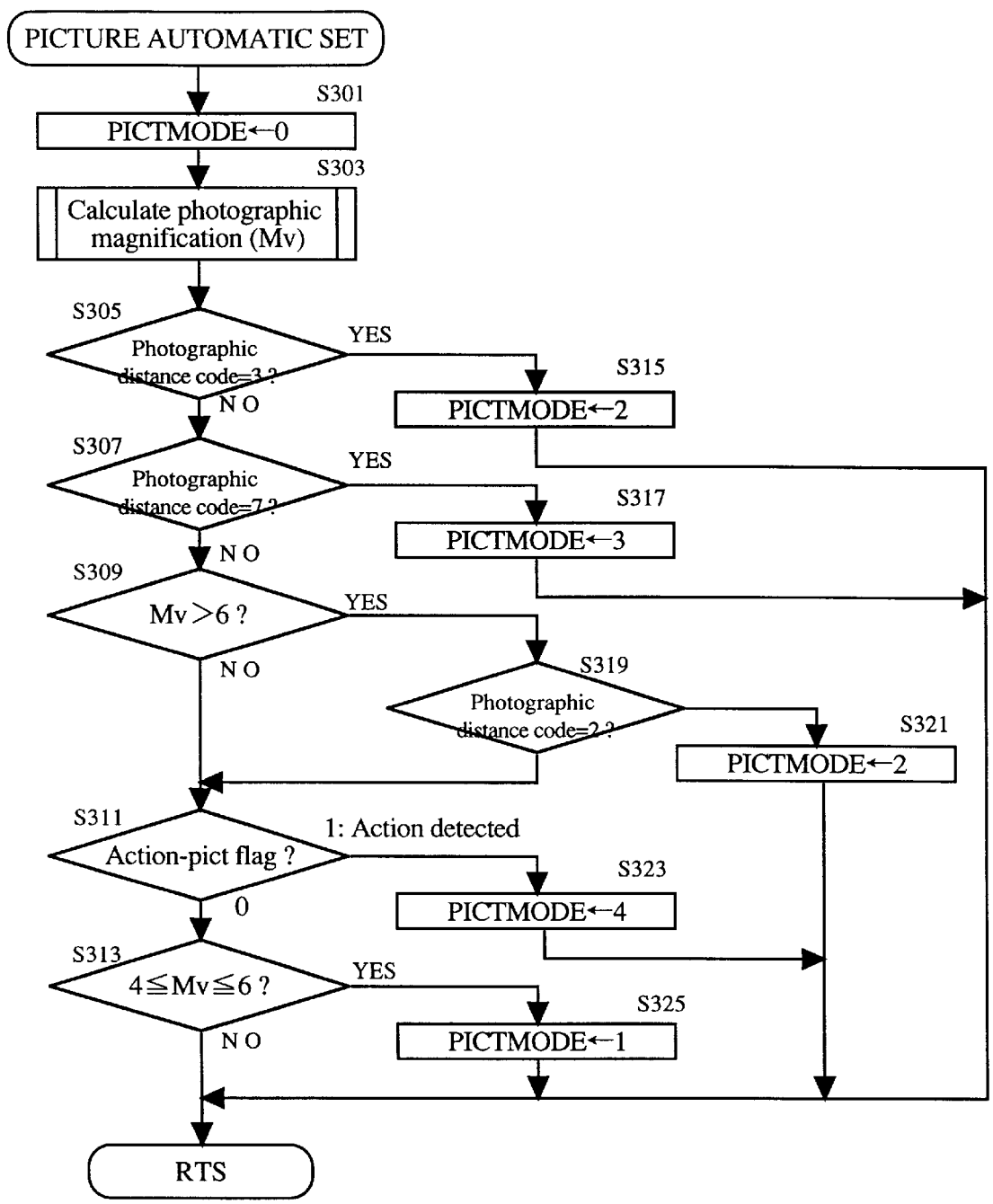
FIG. 7 is a flow chart of a picture automatic set operation of a single-lens reflex camera according to the present invention.

A picture automatic set operation, which is one of the features of the present invention, is described below with reference to the flow chart in FIG. 7. The picture automatic set operation selects the most appropriate programmed exposure mode, according to the photographic distance, photographic magnification, and whether the object is moving.

When control enters the picture automatic set operation, the PICTMODE is set to "0" at step S301. Then, the photographic magnification Mv is obtained at step S303, based on the focal length fv of the photographic lens 51 and the photographic distance Dv, in accordance with the following formula:

$Mv = (Dv + 2O)/2 - Fv$

Then, the photographic distance code, which is input from the photographic lens 51, is checked. Firstly, the photographic distance code is checked. If the photographic distance code is "3", meaning the photographic distance is infinity, the PICTMODE is set to "2" (the scenic mode is selected) and control is returned (steps S305, S315). If the photographic distance code is "7", the PICTMODE is set to "3" (the close-up mode is selected) and control is returned (steps S305, S307, S317).

When the photographic distance code is neither "3" nor "7", namely, the photographic distance is neither maximum nor minimum, the following operations are executed:

When the photographic magnification Mv is not less than 6, the photographic distance code is checked. If the photographic distance code is "2", since the object is positioned far away, there is a high possibility of photographing of scenery. Thus the PICTMODE is set to "2" (the scenic mode is selected) and control is returned (steps S309, S319, S321). If the photographic code is not "2", control proceeds to step S311 and the action-pict flag is checked (steps S309, S319). When the photographic magnification Mv is not more than "6", the action-pict flag is checked (steps S309, S313).

When the action-pict flag is "0", the photographic magnification Mv is checked to confirm whether it is within tolerance (in the range not less than "4" and not more than "6"). The range of the photographic magnification Mv, not less than "4" and not more than "6", is suitable for photographing of portraits. Thus, the PICTMODE is set to "1" (the portrait mode is selected) and control is returned. If the photographic magnification is out of this range, the PICTMODE remains "0" (the normal mode) and control is returned (step S313). The range of the photographic magnification Mv for selecting the portrait mode is not limited to the above case, and the range can also be set, within the limits of "3" or "3.5" to "6.5" or "7".

After completion of selection of the PICTMODE in the above operations, the indications corresponding to the selected PICTMODE is displayed on the external LCD 31 and the inside finder LCD 41 (see FIGS. 3 and 4). When the PICTMODE is "0", since the present mode is the normal mode, the indications of FIG. 3A and FIG. 4A are displayed. Similarly, when the PICTMODE is "1", since the present mode is the portrait mode, the indications of FIG. 3B and FIG. 4B are displayed. When the PICTMODE is "2", since the present mode is the scenic mode, the indications of FIG. 3C and FIG. 4C are displayed. When the PICTMODE is "3", since the present mode is the close-up mode, the indications of FIG. 3D and FIG. 4D are displayed. When the PICTMODE is "4", since the present mode is the action mode, the indications of FIG. 3E and FIG. 4E are displayed. With such indications, the photographer may easily recognize which programmed mode is selected.

"UP/DOWN operation"

The UP/DOWN operation at step S211 is described in detail with reference to the flow chart in FIG. 8. In the UP/DOWN operation, when the UP switch 80 is turned ON, the data UP operations of the selective data, like exposure compensation value, are executed, and when the DOWN switch 82 is turned ON, the data DOWN operations of the selective data are executed. In the embodiment of the present invention, every time the UP switch 80 or the DOWN switch 82 is turned ON, the data go up or down one step.

When control enters the UP/DOWN operation, the state of the UP switch 80 is checked. If the UP switch 80 is turned OFF, the UP flag is set to "0" and control proceeds to step S409. If the UP switch 80 is turned ON, then the UP flag is checked. If the UP flag is set to "0", the data UP operation is executed, and then the UP flag is set to "1", and control proceeds to step S409 (step S408). If the UP flag is set to "1", since the data UP operation has been executed, control skips step S407 and proceeds to step S409.

The state of the DOWN switch 82 is checked at step S409. If the DOWN switch 82 is turned OFF, the DOWN flag is set to "0" and control is returned (step S411). If the DOWN switch 82 is turned ON, then the DOWN flag is checked. If the DOWN flag is set to "0", the data DOWN operation is executed, and then the DOWN flag is set to "1" and control is returned (steps S413, S415, S416). If the DOWN flag is set to "1", since the data DOWN operation has been executed, control is returned.

"Data UP Operation and Data DOWN Operation"

Figure 9:
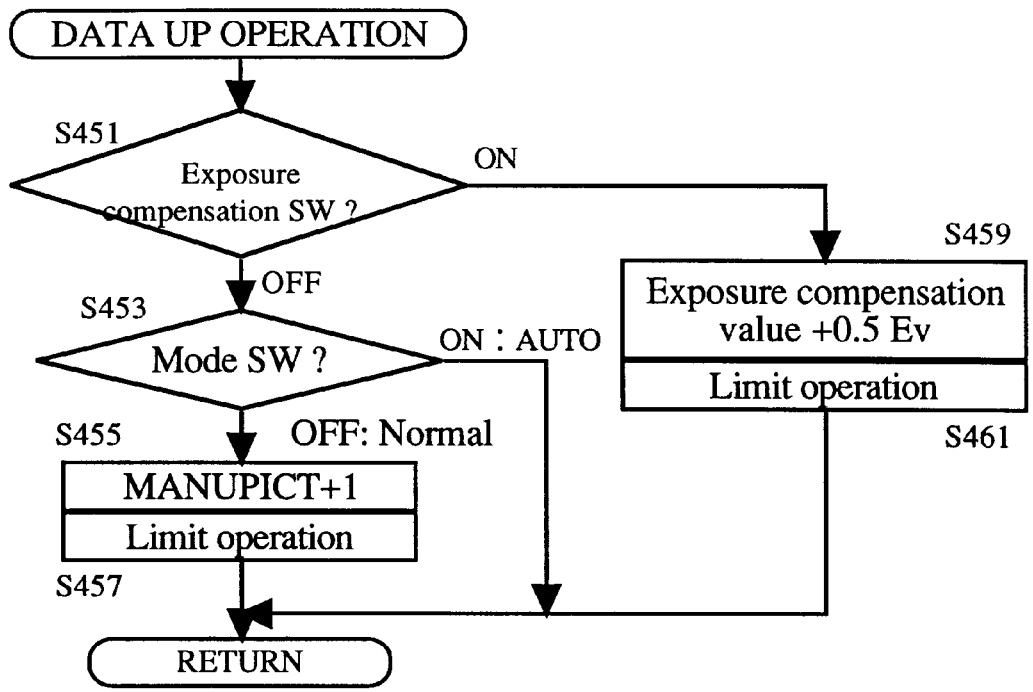
FIG. 9 is a flow chart of a data UP operation of a single-lens reflex camera according to the present invention.
Figure 10:
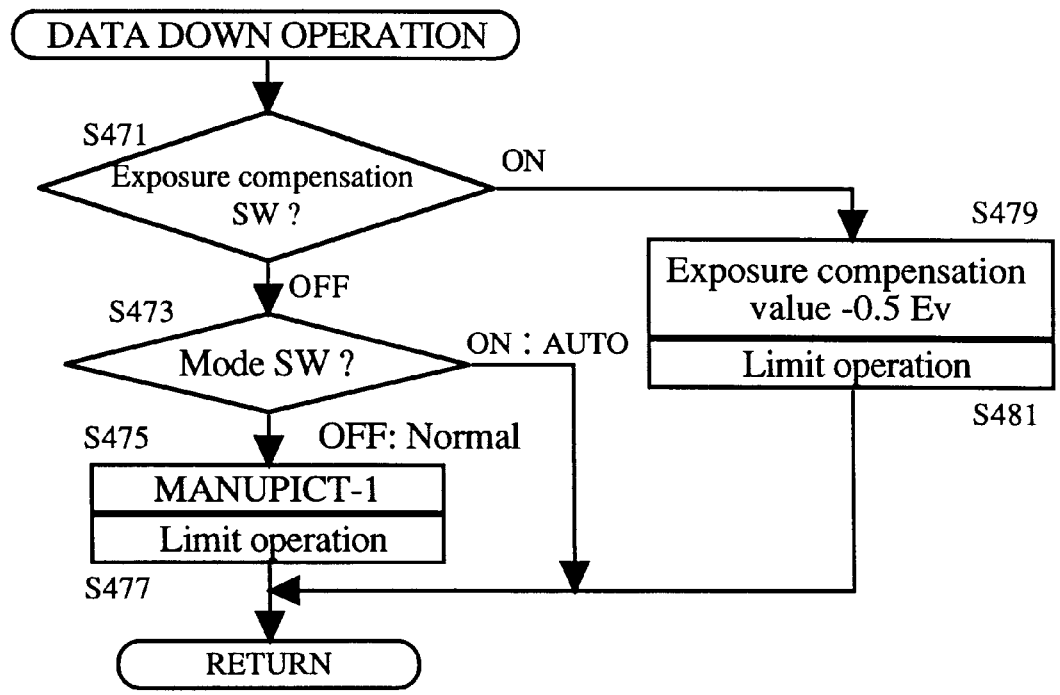
FIG. 10 is a flow chart of a data DOWN operation of a single-lens reflex camera according to the present invention.

The data UP operation at step S407, and the data DOWN operation at step S415, are described with reference to the flow charts in FIGS. 9 and 10. In the embodiment of the present invention, the data UP/DOWN operation in regard to the exposure compensation value and the PICTMODE can be executed. The exposure compensation value is compensated through operation of the UP/DOWN lever 16 during the state in which the exposure compensation button 18 is pressed (namely, when the exposure compensation switch 78 is turned ON). The PICTMODE is changed through operation of the UP/DOWN lever 16 during the state in which the main switch lever 14 is AUTO position (namely, when the mode switch 72 is turned ON).

When control enters the data UP operation, the state of the exposure compensation switch 78 is checked (step S451). If the exposure compensation switch 78 is not turned ON, then the state of the mode switch 72 is checked (step S453). If the mode switch 72 is turned ON, since the present mode is the picture automatic selection mode, control is returned. If the exposure compensation switch 78 is turned ON, the exposure compensation value is in 0.5 Ev increments, the limit operation is executed, and control is returned (steps S459, S461). In the limit operation of the exposure compensation value, when the exposure compensation value reaches the limit value (for example, +2.0 Ev), the value more than the limit value is not set.

When the mode switch 72 is turned OFF, the MANUPICT is incremented by 1, the limit operation is executed, and control is returned (steps S453, S455, S457). With such operations, the PICTMODE is changed step by step, from the normal mode "0" to the action mode "4". In the limit operation of the PICTMODE, when the value of the PICTMODE becomes "4", the value more than such a value is not input.

Similarly, when control enters the data DOWN operation, the state of the exposure compensation switch 78 is checked (step S471). If the exposure compensation switch 78 is not turned ON, then whether the mode switch 72 is turned ON is checked (step S473). If the mode switch 72 is turned ON, since the present mode is the picture automatic selection mode, control is returned. If the exposure compensation switch 78 is turned ON, the exposure compensation value is decremented by the unit of 0.5 Ev, the limit operation is executed, and control is returned (steps S479, S481). In the limit operation of the exposure compensation value, when the exposure compensation value reaches the limit value (for example, −0.2 Ev), the value less than the limit value is not set.

When the mode switch 72 is turned OFF, the MANUPICT is decremented by 1, the limit operation is executed, and control is returned (steps S473, S475, S477). With such operations, the PICTMODE is changed step by step, from the action mode "4" to the normal mode "0". In the limit operation of the PICTMODE, when the value of the PICTMODE becomes "0", the value less than such a value is not input.

"RESTART Operation"

A RESTART operation will now be described with reference to the flow chart shown in FIG. 11. In the START operation, when the mode switch (exposure mode automatic selection switch) 72, the release switch 76, the photometric switch 74, the UP switch 80, or the DOWN switch 82 i turned ON control proceeds to the RESTART operation.

When control enters the RESTART operation, the power hold is turned ON (PHON) at step S501 and electric power is supplied to all the hardware of the camera. The data of the EEPROM 27 is read again, and is then stored in the RAM (step S503). The number of repeats of the PON loop operation (in the present case, "80"), which is executed afterwards, is set to the counter of the PON timer. Thereafter, control proceeds to a PON loop operation.

"PON Loop Operation"

The PON loop operation executes, for example, the AE operation which calculates the Tv value and Av value, according to a communication among the camera body 10, the photographic lens 51 and the outside strobe 65, and according to the photometric operation and the result thereof. The PON operation further controls the release operation.

Firstly, the 128 ms timer starts in order to define the cycle of the PON loop (step S511). Then, the displays of the external LCD 36 and the inside finder LCD 41 are controlled through the SW operation display operation (step S513). When the main switch 70 is turned ON (step S515: Main SW=ON), the flash communication (data communication) from the outside strobe 65 to the camera body 10, and the lens communications between the camera body and the photographic lens 51, are carried out (steps S517, S519). Then, the photometric operation is executed at step S521, and based on the obtained photometric data, the AE operation is executed at step S523. The predetermined flash data based on the obtained AE operation is transmitted from the camera body 10 to the outside strobe 65 (step S525), and the SW operation display operation including the result of the AE operation is executed (step S527). In the case of flashing, the built-in strobe 63 is charged, and the AF operation is executed (steps S529, S531).

When the shutter button 15 is fully depressed, and the release switch 76 is turned ON (step S533: Release SW=ON), the release operation is executed on the condition that the focus flag is set to "1" (focused, step S547: focus flag=1). When the release switch 76 is turned OFF (step s533: Release SW=OFF), or even if the release switch 76 is turned ON, in the case of defocus (steps S533: Release SW=ON, S547: focus flag=0), the AF operation is repeated by checking the state of the release switch 76 until the 128 ms timer expires (steps S531 through S535, or steps S531, S533, S547, S535).

After 128 ms passes, if the photometric switch 74, the UP switch 80, the DOWN switch 82 are all turned OFF, the PON timer is decremented by 1, then the PON loop operation is repeated (steps S511 through S545: PON timer≠0) . The PON loop operation is repeated as set at step S505, and control is returned to the POFF loop operation (steps S511 through S545: PON timer=0).

When the release switch 76 is turned ON during the PON loop operation, control proceeds to the release operation (steps S533: Release SW=ON, S547: focus flag=1).

"AE Operation"

Figure 12:
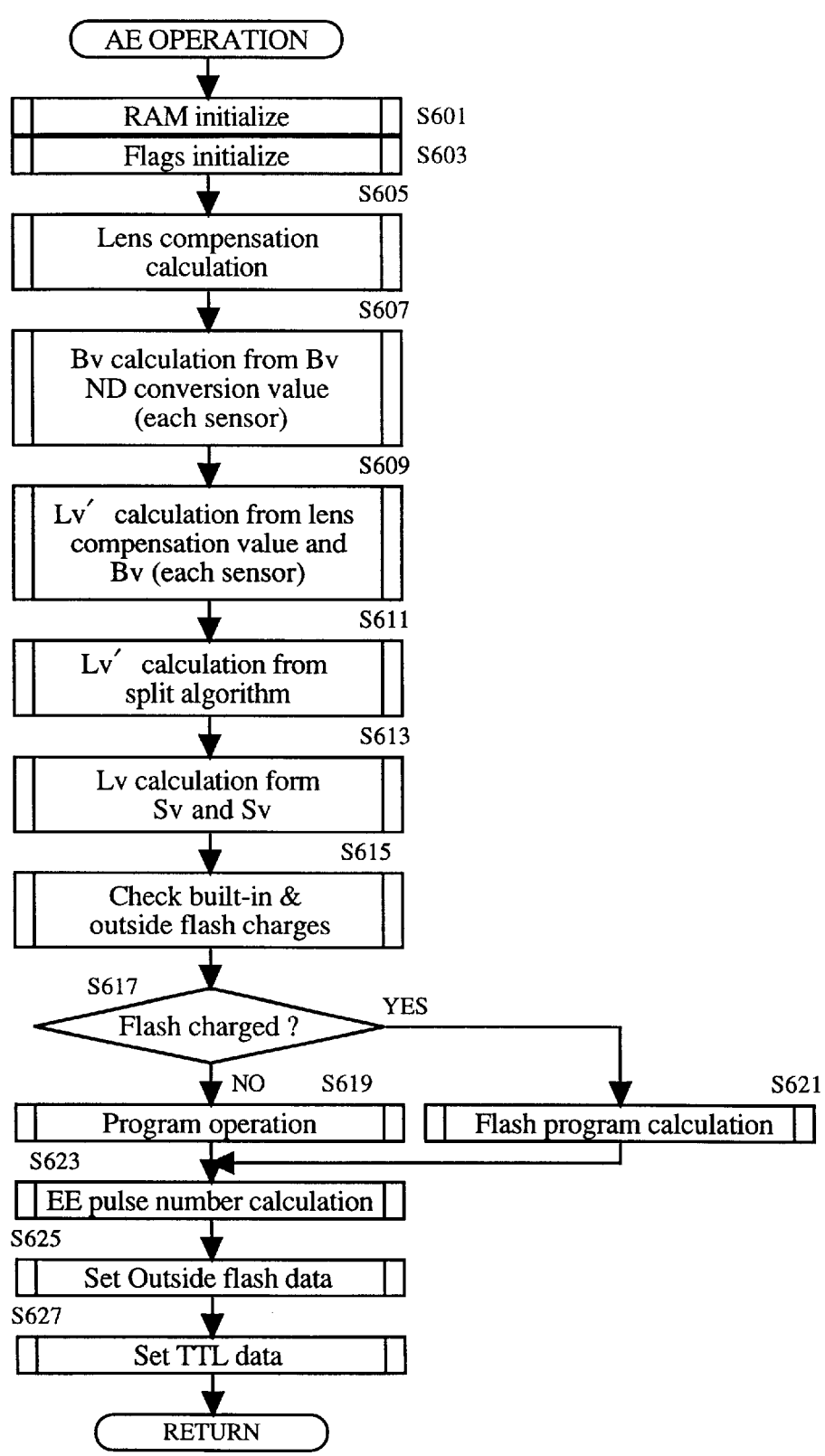
FIG. 12 is a flow chart of an AE operation of a single-lens reflex camera according to the present invention.

An AE operation is described with reference to the flow chart in FIG. 12. When control enters the AE operation, the RAM of the CPU 20 on the camera body side and various types of flags in regard to photometry and other functions, are first initialized, and the lens compensation calculation is executed (steps S601, S603, S605). The lens compensation calculation operation is executed in the lens communication operation (step S519) of the RESTART operation, based on the various types of lens data, which are input from the CPU 53 on the lens side, corresponding to the type of photographic lens.

The object brightness data from each split photometric sensor (the light receiving element 94), are output from the A/D conversion circuit 98. The output object brightness data are respectively converted to the calculating object brightness Bv which are suitable for calculating operation. Then, the light quantity value per sensor Lv is obtained from the calculating object brightness Bv and the lens compensation value which has been calculated at step S605. Consequently, the light quantity value of one unit Lv is obtained from the light quantity value per sensor Lv based on the split photometric algorithm (steps S607 through S611).

A calculating film speed Sv and a calculating exposure compensation value Xv are provided, which have previously been converted to be suitable for the calculating operation. The light quantity value Lv is obtained based on the calculating film speed Sv and the calculating exposure compensation value Xv (step S613). Then, the charge states of the built-in strobe 63 and the outside strobe 65 are input (step S615). If the strobes 63 and 65 are not completely charged, the program operation is executed (steps S617: NO, S619). If the strobes 63 and 65 are fully charged, the flash program calculation is executed (steps S617: YES, S621).

When the program operation is completed, the EE pulse number calculation is executed, the outside flash data is set, the TTL data is set, and control is returned (steps S623, S625, S627). The EE pulse number is the number of pulses which are output from the diaphragm system during diaphragm operation. The diaphragm system operates the aperture of the photographic lens 51, and the EE pulse is used to stop the diaphragm operation corresponding to the controlling aperture value Av. The outside flash data include the data in regard to the quantity of flashing light, front curtain flashsync, and rear curtain flashsync. The TTL data include the integral value data of the TTL direct photometric element which stops the flashing of strobe.

"Program Operation"

Figure 13:
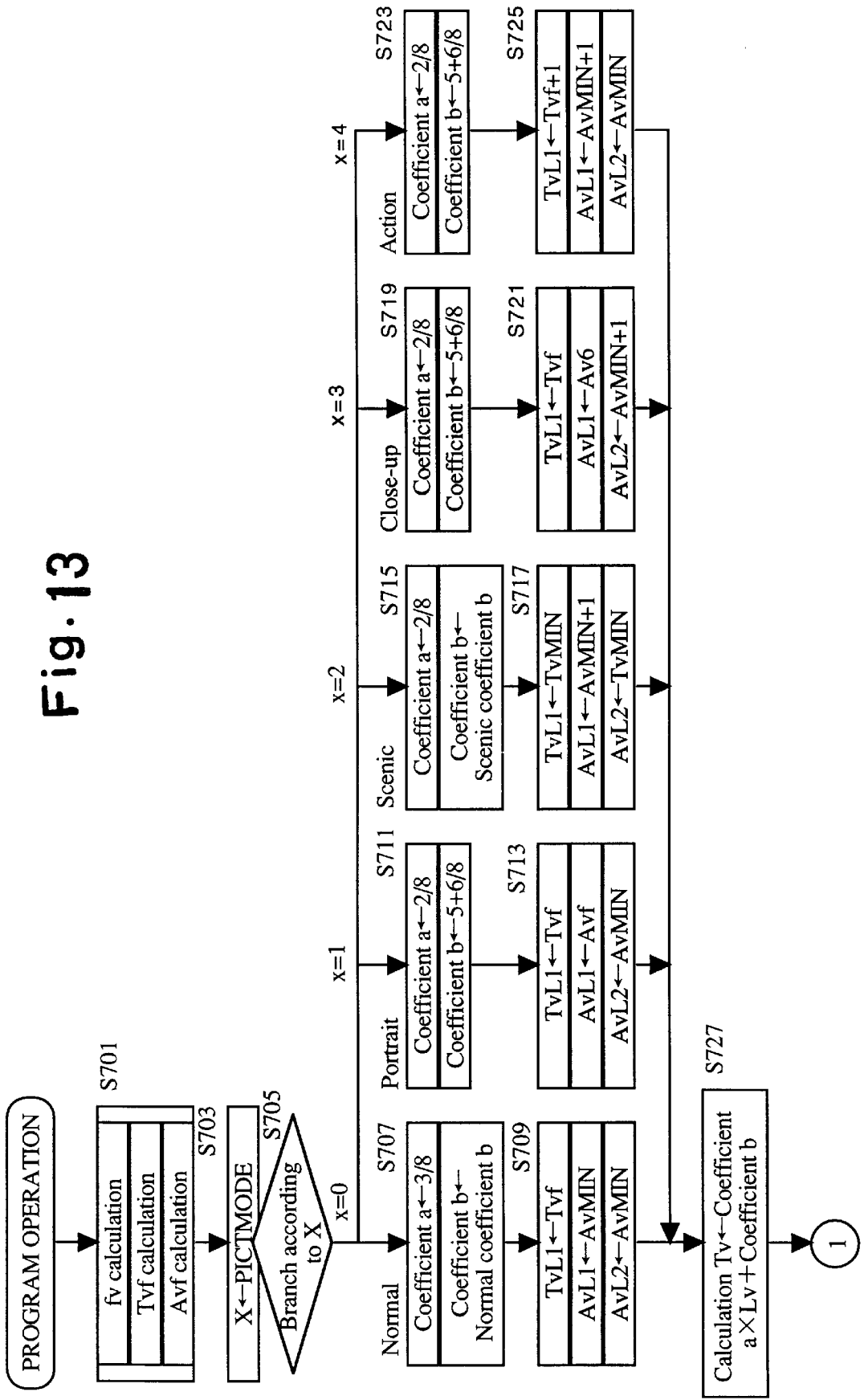
FIG. 13 is a partial flow chart of a program operation of a single-lens reflex camera according to the present invention.
Figure 14:
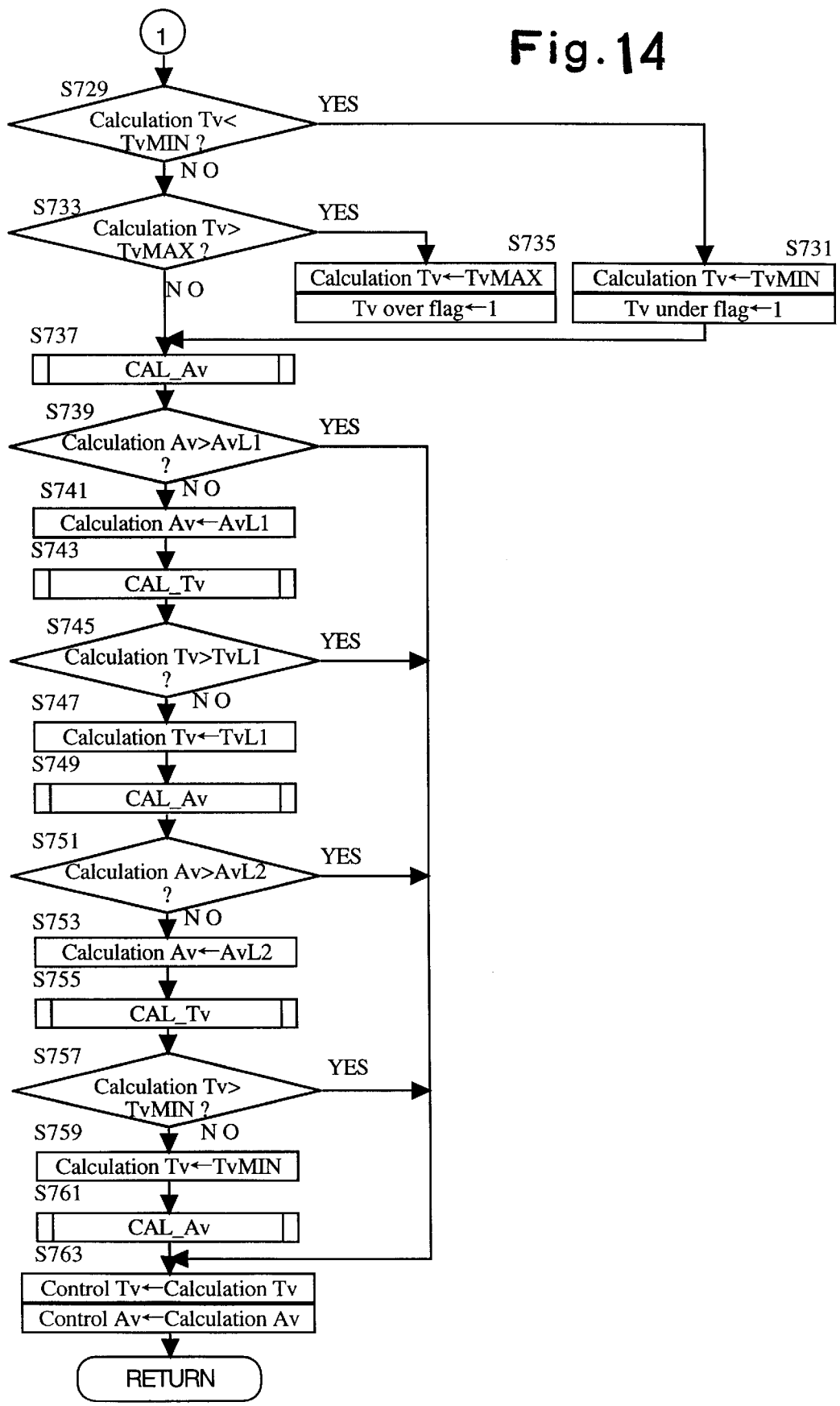
FIG. 14 is a partial flow chart of a program operation of a single-lens reflex camera according to the present invention.

The program operation which is executed at step S619 is described with reference to the flow chart shown in FIGS. 13 and 14.

When control enters the program operation, the fv calculation (fv=log$_2$ (focal length f)/Log$_2$) is executed in order to obtain the apex conversion value fv of the focal length f. Then, the shutter speed limit allowing camera shake Tvf and the aperture value Avf are obtained based on the focal length (step S701). The shutter speed limit allowing camera shake is obtained by a formula, such as:

Tvf=(¾)*fv+2.

Then, the value corresponding to the present picture mode (the number of PICTMODE) is substituted for a letter X, and the calculation corresponding to the letter X is executed (steps S703, S705). In the embodiment of the present invention, the shutter speed Tv is obtained by the following formula:

Tv=a*Lv+b in which letters a and b are coefficients, and Lv represents the light quantity value based on the calculating film speed Sv and the calculating exposure compensation value Xv, which are converted to be suitable for calculation operation.

When X=0, since the present mode is the normal mode, the value ⅜ is substituted for the coefficient a, and the value corresponding to the normal mode is substituted for the coefficient b (step S707). Then, the shutter speed limit allowing camera shake Tvf is substituted for the shutter speed lower limit TvL1, and the minimum aperture value AvMIN is substituted for both the first Av limit AvL1 and the second Av limit AvL2. Then control proceeds to step S727 (step S709).

When X=1, since the present mode is the portrait mode, the value ⅔ is substituted for the coefficient a, and the value 5+⅝ is substituted for the coefficient b (step S711). Then, the shutter speed limit allowing camera shake Tvf is substituted for the first Tv limit TvL1, the photographing most appropriate aperture value Avf is substituted for the first Av limit AvL1, and the minimum aperture value AvMIN is substituted for the second Av limit AvL2. Then, control proceeds to step S727 (step S713).

When X=2, since the present mode is the scenic mode, the value ⅔ is substituted for the coefficient a, and the scenic coefficient b, namely the value corresponding to the scenic mode, is substituted for the coefficient b (step S715). The scenic coefficient b is obtained by the following formula:

(⅝)*Tvf−(⅔)*(AvMIN+1)

Then, the minimum shutter speed limit TvMIN is substituted for the first Tv limit TvL1, the value of the minimum aperture value AvMIN+1 is substituted for the first Av limit AvL1, and the minimum aperture value AvMIN is substituted for the second Av limit AvL2. Then, control proceeds to step S727 (step S717).

When X=3, since the present mode is the close-up mode, the value ⅔ is substituted for the coefficient a, and the value 5+⅝ is substituted for the coefficient b (step S719). Then, the shutter speed limit allowing camera shake Tvf is substituted for the first Tv limit TvL1, the aperture value Av 6 (F=8) is substituted for the first Av limit AvL1, and the value of the minimum aperture value AvMIN+1 is substituted for the second Av limit AvL2. Then, control proceeds to step S727 (step S721).

When X=4, since the present mode is the action mode, the value ⅔ is substituted for the coefficient a, and the value 5+⅝ is substituted for the coefficient b (step S723). Then, the value of the shutter speed limit allowing camera shake Tvf+1 is substituted for the first Tv limit TvL1, the value of the minimum aperture value AvMIN+1 is substituted for the first Av limit AvL1, and the minimum aperture value AvMIN is substituted for the second Av limit AvL2. Then control proceeds to step S727 (step S725).

At step S727, the calculating shutter speed Tv is obtained by the following formula:

Tv=a*Lv+b

Then, the limit operation is executed. The limit operation compares the calculating shutter speed Tv (calculation Tv) with the minimum shutter speed TvMIN and the maximum shutter speed TvMAX, respectively, which are proper to the camera (steps S729, S731). If the calculation Tv is less than the minimum shutter speed TVMIN, the minimum shutter speed TvMIN is substituted for the calculation Tv. In such a case, although the slower shutter speed is actually required, this minimum shutter speed TvMIN is selected. Thus, in order to identify such a selection, Tv under flag is set to "1", and control proceeds to step 737 (steps S729: YES, S731). If the calculation Tv is more than the maximum shutter speed TvMAX, the maximum shutter speed TvMAX is substituted for the operation Tv. In such a case, although the faster shutter speed is actually required, this maximum shutter speed TVMAX is selected. Thus, in order to identify such a selection, Tv over flag is set to "1", and control proceeds to step 737 (steps S729: NO, S733: YES, S735).

When the calculation Tv is within the range, not less than the minimum shutter speed TvMIN, and not more than the maximum shutter speed TvMAX, control proceeds to step S737 (steps S729: NO, S733: NO). A CAL_Av operation (Av operation) is executed at step S737, and the suitable calculation Av is obtained corresponding to the calculation Tv based on the calculation Tv, and control proceeds to step S739.

The calculation Av is set in the CAL_Tv operation, and then whether the value of the calculation Av is more than AvL1 is checked. The value AvL1 is the first Av limit calculated under the selected mode. If the calculation Av is more than the first Av limit AvL1, control jumps to step S763, converts the calculation Tv to the controlling Tv, and converts the calculation Av to the controlling Av.

If the calculation Av is not more than the first Av limit AvL1, control proceeds to step S745, and the first Av limit AvL1 is substituted for the calculation Av. Consequently, the Av value is determined, then the CAL_Tv operation is executed, and the Tv value corresponding to the calculation Av is obtained, then control proceeds to step S745 (steps S739: NO, S741).

The calculation Tv obtained at step S743 is compared with the first Tv limit TvL1 at step S745. With this comparison, if the calculation Tv is more than the first Tv limit TvL1, control jumps to step S763. If the calculation Tv is not more than the first Tv limit TvL1, control proceeds to step S747, and the value of the first Tv limit TvL1 is substituted for the calculation Tv. Consequently, the Tv value is determined, and control proceeds to step S749 in order to execute the CAL_Av operation, so that the calculation Av corresponding to the calculation Tv is obtained.

Whether the calculation Av value is more than the second Av limit AvL2 is checked at step S751. If the calculation Av is more than the second Av limit AvL2, control jumps to step S763. If the calculation Av is not more than the second Av limit AvL2, control proceeds to step S753, and the value of the second Av limit AvL2 is substituted for the calculation Av. Consequently, the Av value is determined, and control proceeds to step S755 in order to execute the CAL_Tv operation, so that the calculation Tv corresponding to the calculation Av is obtained. Then, the obtained calculation Tv is compared with the minimum shutter speed TVMIN, and if the calculation Tv is more than the minimum shutter speed TvMIN, control jumps to step S763 (step S757: YES). If the calculation Tv is not more than the minimum shutter speed TvMIN, the value of the minimum shutter speed TvMIN is substituted for the calculation Tv. Consequently, the Tv value is determined, and the CAL_Av subroutine operation is executed (step S761), so that the calculation Av corresponding to the calculation Tv is obtained, and control proceeds to step S763.

The calculation Tv is set as the control Tv at step S763, which is actually used for control. Similarly, the calculation Av is set as the control Av at step S763 which is actually used for control. Then, control is returned.

The flash program, although not shown, considers the photographic distance and focal length, and designs the algorithm in order to obtain the program which is suitable for flash photographing in each PICTMODE.

"CAL Tv"

Figure 15:
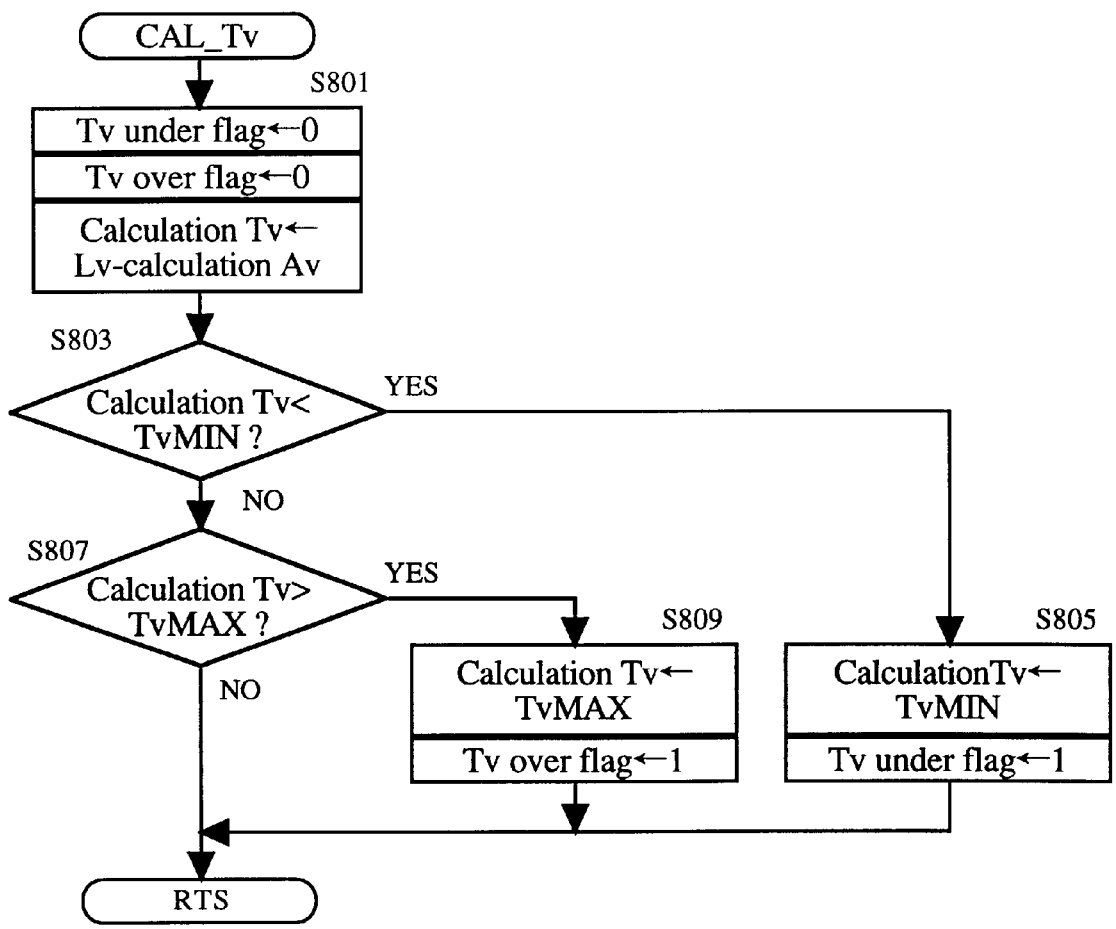
FIG. 15 is a flow chart of a CAL_Tv (shutter speed setting) operation of a single-lens reflex camera according to the present invention.

The CAL_Tv operation (Tv operation) is described with reference to the flow chart in FIG. 15. The setting of the appropriate Tv value and the limitation of the Tv value within the controllable range are executed through the CAL_Tv operation.

When control enters the CAL_Tv operation, the Tv under flag and the Tv over flag are set to "0", and the calculation Tv is obtained by the following formula (step S801):

Calculation Tv=Light quantity value Lv-Calculation Av.

The obtained calculation Tv is compared with the minimum shutter speed TvMIN and the maximum shutter speed TvMAX, respectively, which are proper to the camera (steps S803, S807). In such checks, if the calculation Tv is less than the minimum shutter speed TvMIN (step S803: YES), the minimum shutter speed TvMIN is substituted for the calculation Tv. In such a case, although the slower shutter speed is actually required, this minimum shutter speed TvMIN is selected. Thus, in order to identify such a selection, the Tv under flag is set to "1" (step S805), and control is returned. If the calculation Tv is more than the maximum shutter speed TvMAX (steps S803: NO, S807: YES), the maximum shutter speed TvMAX is substituted for the operation Tv. In such a case, although the faster shutter speed is actually required, this maximum shutter speed TvMAX is selected. Thus in order to identify such a selection, the Tv over flag is set to "1" (Step S809), and control is returned.

When the calculation Tv is within the range, not less than the minimum shutter speed TVMIN, and not more than the maximum shutter speed TvMAX (steps S803: NO, S807: NO), control is returned. Consequently, the shutter speed set by the program operation is limited within the controllable range through the CAL_Tv subroutine.

"CAL Av"

Figure 16:
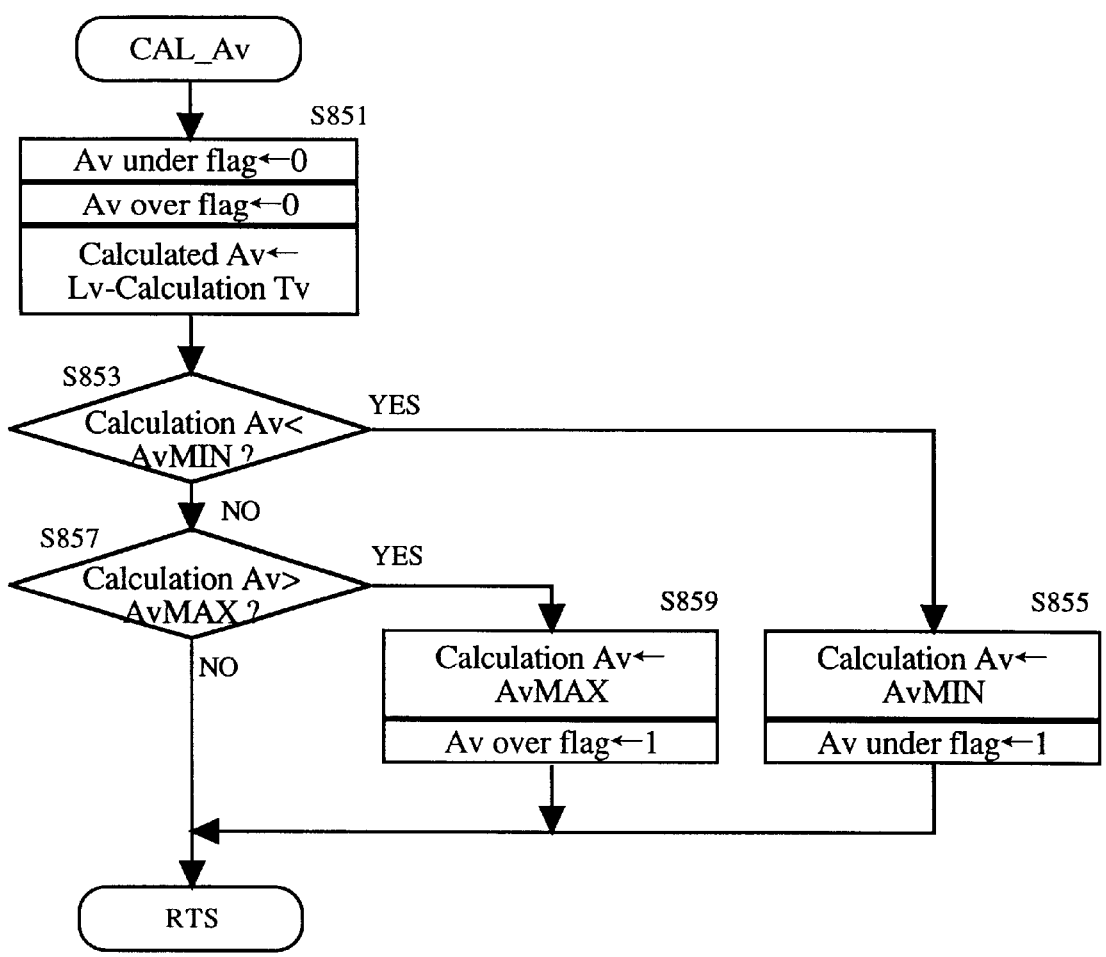
FIG. 16 is a flow chart of a CAL_Av (aperture value setting) operation of a single-lens reflex camera according to the present invention.

The CAL_Av operation (Av operation) is described with reference to the flow chart in FIG. 16. The setting of the appropriate Av value and the limitation of the Av value within the controllable range are executed through the CAL_Av operation.

When control enters the CAL_Av operation, the Av under flag and the Av over flag are set to "0", and the calculation Av is obtained by the following formula (step S851):

Calculation Av=Light quantity value Lv-Calculation Tv.

The obtained calculation Av is compared with the minimum F-number AvMIN and the maximum aperture value AvMAX respectively (steps S853, S857). In such checks, if the calculation Av is less than the minimum aperture value AvMIN (step S853: YES), the minimum aperture value AvMIN is substituted for the calculation Av. In such a case, although the smaller aperture is actually required, this minimum aperture value AvMIN is selected. Thus, in order to identify such a selection, the Av under flag is set to "1" (step S855), and control is returned. If the calculation Av is more than the maximum aperture value AvMAX (steps S853: NO, S857: YES), the maximum aperture value is substituted for the operation AV. In such a case, although the wider aperture is actually required, this maximum aperture value AvMAX is selected. Thus, in order to identify such a selection, the Av over flag is set to "1" (Step S859), and control is returned.

When the calculation Av is within the range, not less than the minimum aperture value AvMIN, and not more than the maximum aperture value AvMAX (steps S853: NO, S857: NO), control is returned. Consequently, the aperture value set by the program operation is limited to be within the controllable range through the CAL_Av subroutine.

The AF operation will now be described with reference to the flow chart shown in FIG. 17, according to the following conditions:

"When the Photometric Switch 74 Is Turned OFF"

Figure 17:
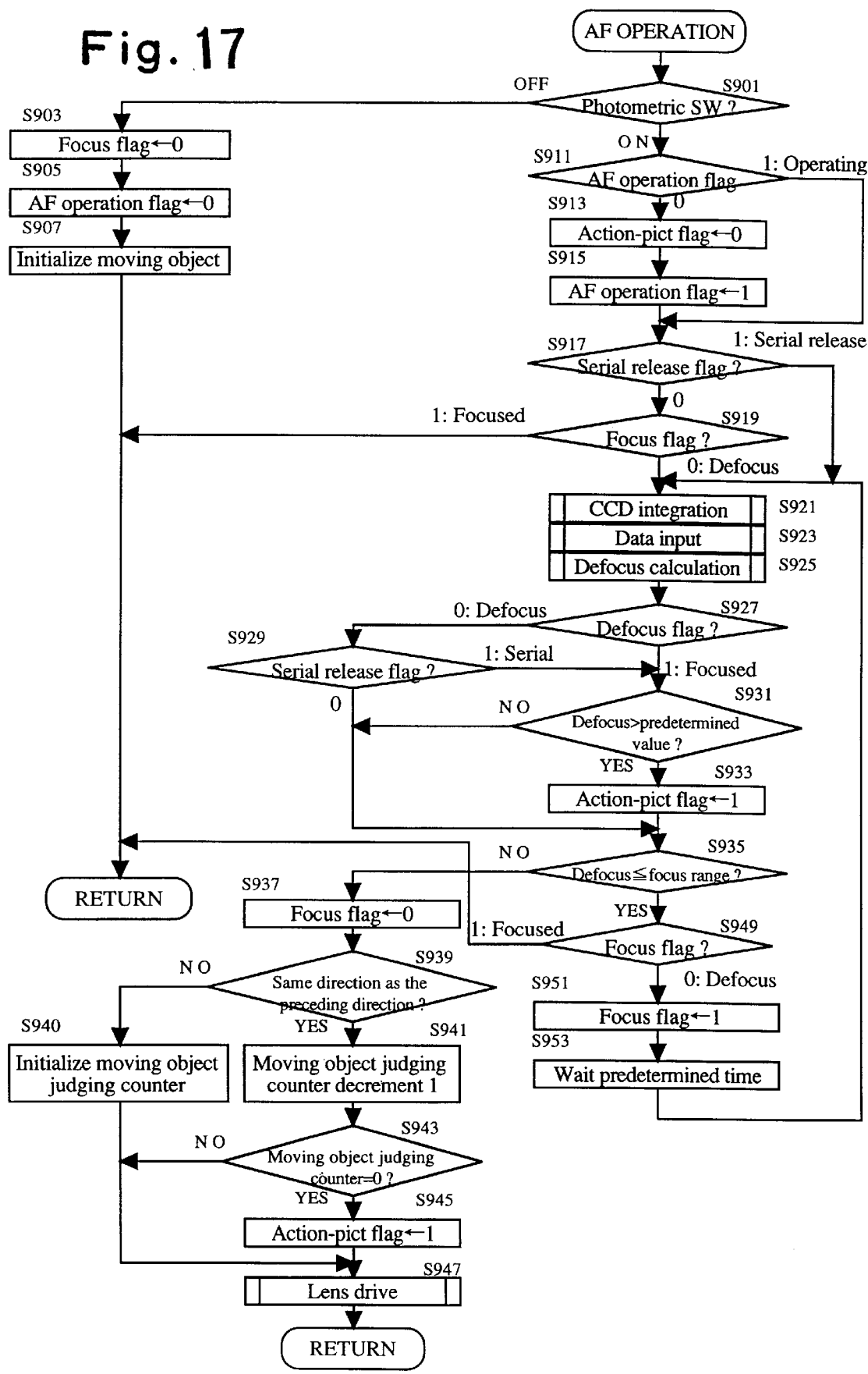
FIG. 17 is a flow chart of an AF (automatic focusing) operation of a single-lens reflex camera according to the present invention.

When control enters the operation as shown in the flow chart of FIG. 17, the state of the photometric switch 74 is first checked. If the photometric switch 74 is not turned ON, the focus flag is set to "0", the AF operation flag is set to "0", a moving object judging counter is initialized, and control is returned (steps S901: Photometric SW OFF, S903, S905, S907). The focus flag identifies whether the camera is focused, and if focused, the focus flag is set to "1". The AF operation flag identifies whether the AF operation has started, and if the AF operation starts, the AF operation flag is set to "1". The moving object judging counter counts in order to identify that the object is in action (moving). When the focusing is not carried out after the AF lens driving a predetermined number of times, for example, three times, the object is judged to be in action.

"When the Photometric Switch 74 Is Turned ON, and the Serial Release Is Not Performed"

There is a case when the photometric switch 74 is turned ON, and the serial release is not performed, namely, a mode in which only one exposure is performed when the release switch 76 is turned ON. The exposure mode in such a case will be described. The serial release is a photographic mode in which a series of photographings are performed while the release switch 76 is turned ON. When a drive switch (not shown) is turned ON, control enters the serial photographic mode.

When the photometric switch 74 is turned ON, the AF operation flag is checked. Since the AF operation flag is initially cleared, the action-pict flag is set to "0", and the AF operation flag is set to "1" (steps S901: photometric SW ON, S911: AF operation SW=0, S913. S915). Then, the serial release flag is checked, and if the serial release flag is set to "0", since the present mode is not the serial release mode, the focus check is executed (steps S917: serial release flag=0, S919). If the serial release flag is set to "1", since the present mode is the serial release mode, the focus check is skipped (steps S917: serial release flag=1, S921).

At the focus check (step S919), if the focus flag is set to "0" (the initial state is "0"), the AF sensor unit executes the CCD integration, inputs the integral data, and executes the defocus calculation (steps S921, S923, S925). Then, the focus flag is checked again, and if the focus flag is still set to "0" (the first check is cleared), the serial release flag check is executed (steps S927: focus flag=0, S929). If the serial release flag is set to "0", whether the quantity of defocus (the absolute value of the defocus amount) is less than the focus range is checked (namely, whether within the range, which can be deemed to be focused, is checked). When the defocus is more than the focus range, the focus flag is set to "0" (steps S935: NO, S937). Then, the moving direction of the focusing lens is checked, regarding whether movement is in the same direction as the preceding direction. In the case of the same direction, the action counter is decremented by 1, and if the value of the action counter is not 0, the AF motor is actuated based on the defocus amount obtained at step S925, and control is returned (steps S939: YES, S941, S943: NO, S947).

In the AF operation from the second time, the check operations at steps S901, S917, S919, the AF operations at steps S921 through S925, the check operations at steps S927 and S929 are executed, and control proceeds to the defocus check operation at step S935. In the defocus check operation, if the defocus is less than the predetermined value, the focus flag is checked. In the focus check operation, since the focus flag is initially set to "0", the focus flag is set to "1", then control waits a predetermined amount of time, and control is returned to the CCD integration (steps S935: YES, S951, S953, S921). Consequently, the CCD integration, the data input and the defocus calculation are executed, the focus flag is checked, and whether the defocus is more than the predetermined value is checked (steps S921, S923, S925, S927: focus flag=1, S931: YES). When the defocus is more than the predetermined value, the action-pict flag is set to "1" (step S933). Once the focusing is completed, after a predetermined time has passed, if there is any change of defocus (focal point) during a predetermined time, the action mode is selected. This is the defocus check at this step, in which the change of defocus is deemed to be the action of the object.

When the defocus is within the focus range, the focus check is executed. Since the focus flag is set to "1", control is returned (steps S935: YES, S949: focus flag=1). When control enters the AF operation next time, control proceeds to steps S901, S911, S917, and is returned from step S919.

"When the Action Mode Is Selected"

When the action mode is selected, in the first operation, the photometric switch 74 is turned ON, control proceeds to steps S901 and S911 through S919. Then, the CCD integration, the integral data input, the defocus calculation are executed (steps S921 through S925). When the defocus is more than the focus range (step S935: NO), the focus flag is set to "0", and since the lens is not actuated at the preceding time, control jumps to step S947, the lens is actuated, and control is returned (steps S937, S939: NO, S947). The AF operation after the second time, control proceeds to steps S901, S911, S917 through S935, and S937 at which the focus flag is set to "0". If the moving direction of the lens is the same as the preceding direction (step S939: YES), the action counter is decremented by 1. If the value of the action counter is not 0, the control is returned after the lens drive operation (steps S943: NO, S947). Afterwards, the above operations after the second time are repeated, and when the value of the action counter becomes 0, the action-pict flag is set to "1" (steps S943: YES, S945). Thus, the action mode is selected. In the operations after the second time, if there is a change in the moving direction of the lens, the initial value is set to the action counter (steps S939: NO, S940).

"When the Photometric Switch 74 Is Turned ON, and the Serial Release Is Performed"

When the drive switch 84 is turned ON, and at the same time, when the first release is completed, the serial release flag is set to "1". When the serial release flag is set to "1", control skips the focus flag check at step S919, and invariably calls the defocus check operation at step S931. It is natural in the serial photographing that there is movement of an object or a gradual change in composition, and hence, the operations for obtaining defocus (steps S921 through S925) are continuously executed by skipping the focus flag check at step S919. In these operations, regardless of the case of defocus, whether the defocus is more than the predetermined value is checked without fail. When there is a change by a large value, the action-pict flag is set to "1", and the action mode is selected (steps S931: YES, S933).

"Release Operation"

Figure 18:
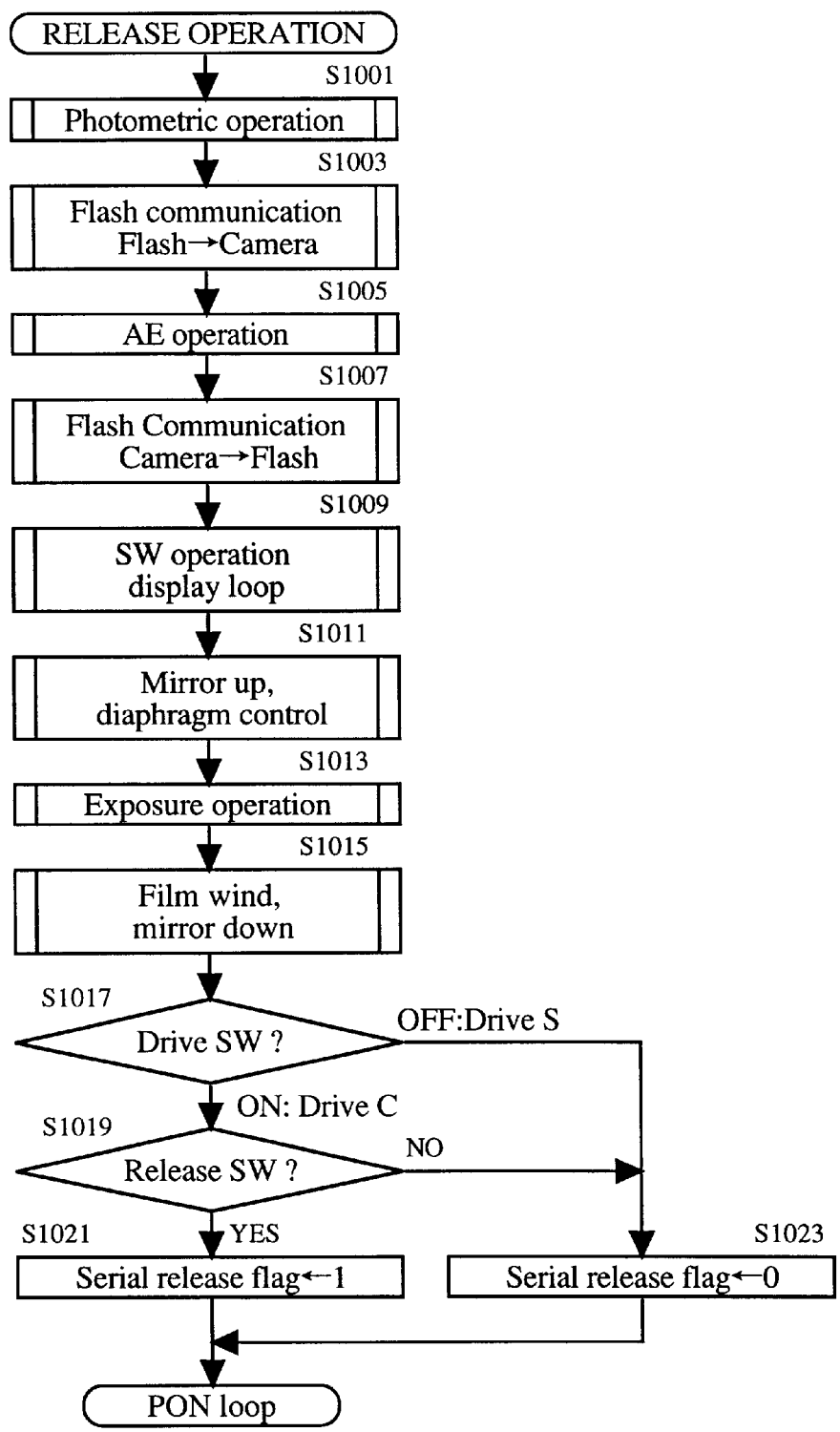
FIG. 18 is a flow chart of a release operation of a single-lens reflex camera according to the present invention.

FIG. 18 shows the flow chart of the release operation. In the release operation, control proceeds to the photometric operation at step S1001, the data communication from the strobe to the camera body (flash communication) at step S1003, the AE operation at step S1005, the data communication from the camera body to the strobe based on the result of the AE operation (flash communication) at step S1007, and the switch operation display operation (loop) at step S1009. Then, a series of exposure controls, namely the mirror up and the diaphragm (aperture value) control at step S1011, the exposure operation at step S1013, the film wind and the mirror down at step S1015, are performed. Then, whether the serial drive has been executed is checked (step S1017), and if the serial drive is executed, on condition that the release switch 76 is turned ON, the serial release flag is set to "1", and control is returned to the PON loop operation (steps S1019, S1021). If the release switch 76 is not turned ON, or if the serial drive is not executed, the serial release flag is set to "0", and control is returned to the PON loop operation (steps S1019, S1023).

As described above, according to the embodiment of the present invention, there are the normal (green), portrait, scenic, close-up and action modes (programmed exposure modes) provided for the camera, and the camera automatically selects the most suitable programmed exposure mode corresponding to the focal length, photographic distance and the state of action of the object. Consequently, the photographer is not required to select the most suitable programmed exposure mode by considering the photographic conditions.

In the above-mentioned embodiment, the picture (icon) corresponding to the automatically selected exposure mode is displayed. Thus, the photographer can easily and correctly understand the automatically selected exposure mode.

Although there are five selective programmed exposure modes in the above-mentioned embodiment, it is clear that the present invention is not limited to such programmed exposure modes, and the programmed diagrams are not limited to those shown in FIGS. 19 through 23.

As may be understood from the foregoing, according to the present invention, the most suitable programmed exposure mode is automatically selected based on the focal length and photographic conditions, thus the photographer is not bothered with the selection of an exposure mode, which provides the photographer with easy photo taking at the shutter speed and aperture value which are suitable for the photographic conditions.

In the second embodiment of the present invention, there are five picture modes (programmed exposure modes), namely, a normal mode, a portrait mode, a scenic mode, a close-up mode, and an action mode, which can be set either by the picture automatic set operation or by the manual operation.

The picture automatic set operation selects the most appropriate programmed exposure mode based on the photographic distance, the photographic magnification, and whether an object is in action (moving). There is an identifier "PICTMODE" which identifies the picture mode. The normal mode is identified by a picture number "0", and similarly, the portrait mode by "1", the scenic mode by "2", the close-up mode by "3", and the action mode by "4".

The second embodiment of the present invention will now be described in detail. The main feature of the second embodiment of the present invention is that, during the picture automatic set operation, when the photographer manually selects any photographic mode, the picture automatic set operation is inhibited.

In the second embodiment, when the main switch lever 14 is slid to the AUTO position, the picture automatic set operation is selected. At that time, the normal mode is selected as the initial mode.

The manual setting of the picture mode (the picture manual set) is carried out by operation of the UP/DOWN lever 16 when the main switch lever 14 is in the AUTO position. When control enters the picture manual set operation, the auto-pict inhibition flag is set to "1" so that the picture automatic set operation is inhibited.

The cancel operation of inhibition of the picture automatic set operation is executed by any of the following conditions—the operation of the select button 17 (the select switch 86 is turned ON), the completion of photographing, or a PON timer expiring.

The second embodiment of the present invention is fundamentally carried out with reference to the flow charts shown in FIGS. 5 through 18. The flow charts of the UP/DOWN operation in FIG. 8, the RESTART operation in FIG. 11, the AE operation in FIG. 12, the AF operation in FIG. 17 and the release operation in FIG. 18 can be utilized without any modification in the second embodiment. There are several steps in the flow charts which should be modified, namely, in the flow chart of the START operation in FIG. 5, the SW operation display operation in FIG. 6, the picture automatic set operation in FIG. 7, the data UP operation in FIG. 9, the data DOWN operation in FIG. 10 and the release operation in FIG. 18. Therefore, the second embodiment of the present invention will be described in regard to the flow charts proper to the second embodiment, namely the START operation-2, the SW operation display operation-2, the picture automatic set operation-2 and the release operation-2, with reference to the flow charts shown in FIGS. 24 through 29.

Figure 24:
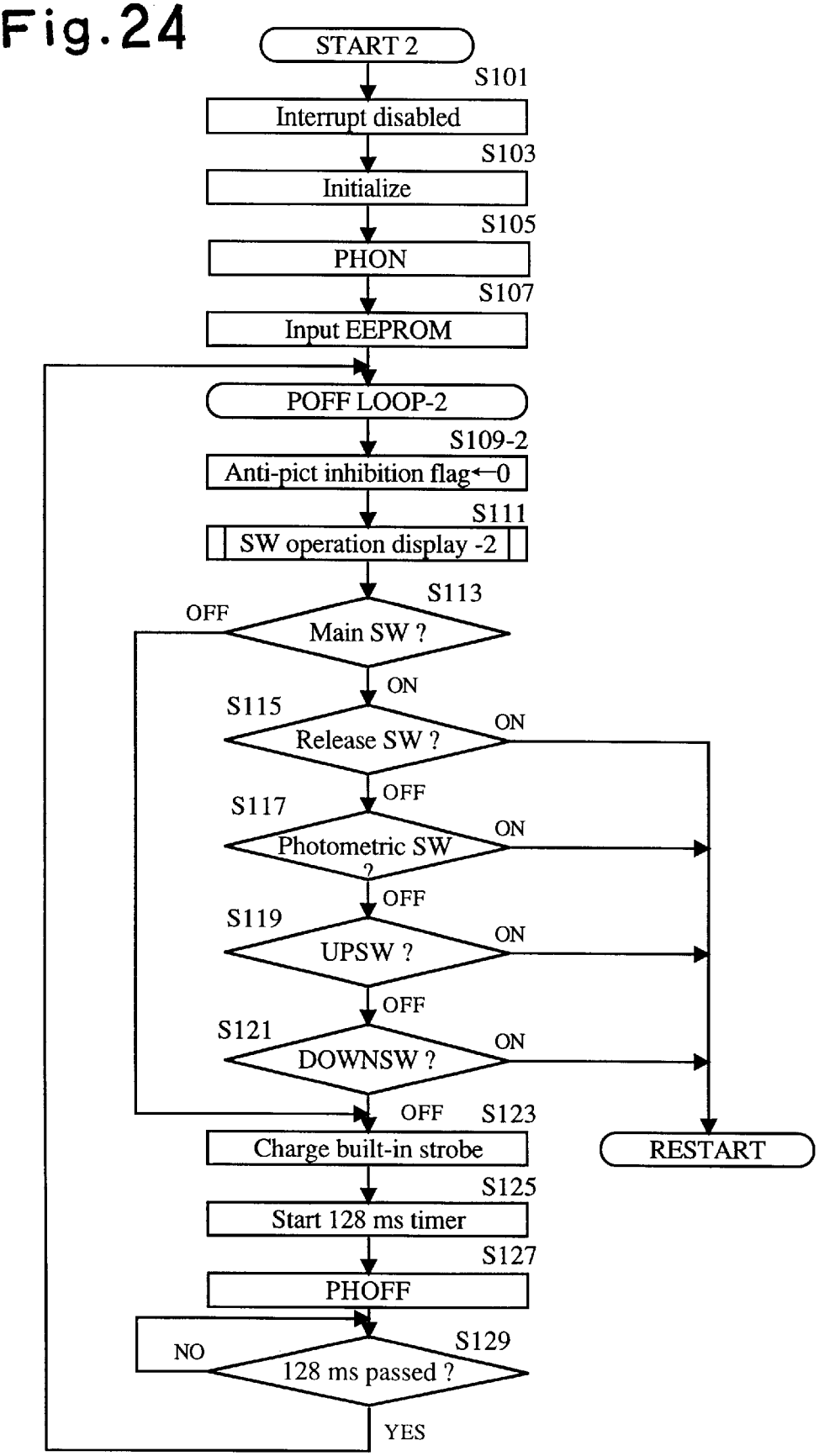
FIG. 24 is a flow chart of operation in a main routine (START operation-2) of a single-lens reflex camera according to a second embodiment of the present invention.

FIG. 24 shows the flow chart of the START operation-2 as a main routine of the second embodiment of the present invention. The START operation-2 can be carried out by replacement of the SW operation display operation at step S109 of the START operation shown in FIG. 5, to the operation in which the auto-pict inhibition flag is set to "0". The second embodiment can be realized by partial modification of the flow charts shown in FIGS. 5 through 18, and hence, the common step numerals are used for these common steps, and descriptions thereof are omitted.

"POFF Loop Operation-2"

When control enters the POFF loop operation-2, firstly the auto-pict inhibition flag is set to "0" (step S109-2). The auto-pict inhibition flag sets the inhibition state of the automatic set where "0" means automatic set can be executed, and "1" means automatic set is inhibited. Then the SW operation display operation-2 is executed. Operation of steps S113 through S129 are the same as the operation shown in FIG. 5.

"SW Operation Display Operation-2"

Figure 25:
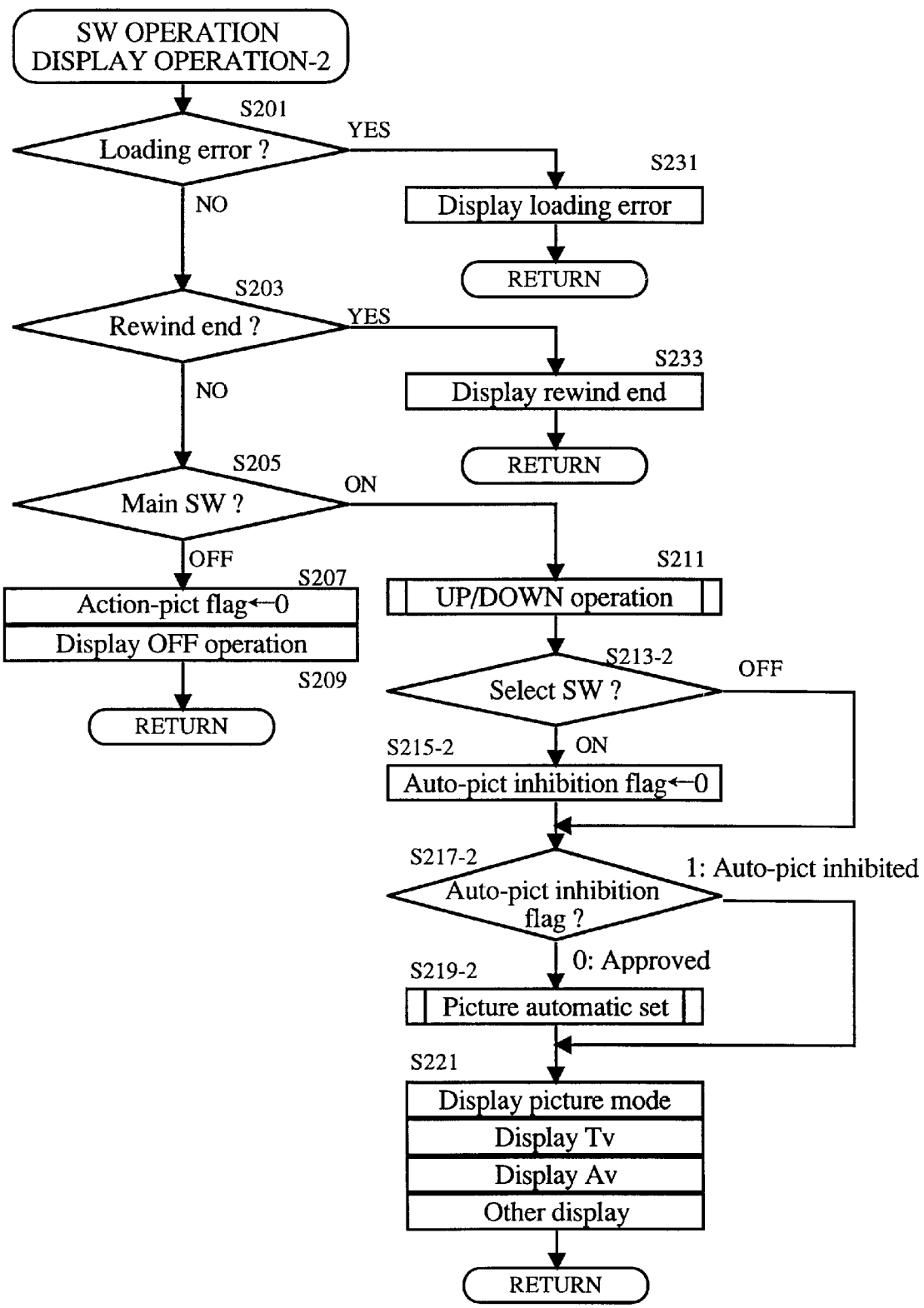
FIG. 25 is a flow chart of an SW operation display operation-2 of a single-lens reflex camera according to the second embodiment of the present invention.

The SW operation display operation-2, which is executed at step S111, is described below in detail with reference to the flow chart shown in FIG. 25. The SW operation display operation-2 checks the state of the switches of the camera, and displays any indication according to the state at that time. The operations at steps S201 through S209, S221, S231 and S233 in the SW operation display operation-2 are the same as those at steps S201 through S209, S221, S231 and S233 in the SW operation display operation. There are different operations after step S211, namely steps S213-2 through S219-2.

When neither the loading error nor the rewind end occurs, the following operations are executed.

When the main switch 70 is turned OFF, the action-pict flag is set to "0", the displays of the external LCD 36 and the inside finder LCD 41 are turned OFF, and control is returned (steps S205: main SW OFF, S207, S209). The action-pict flag identifies whether or not the object is in action (moving), and if the object is judged to be in action, the flag is set to "1".

When the main switch 70 is turned ON, the UP/DOWN operation is executed. In the UP/DOWN operation, when the UP switch 80 or the DOWN switch 82 is turned ON, the corresponding operation is executed (steps S205: main SW ON, S211).

Then, the state of the select switch 86 is checked, namely, the state of the inhibition of picture automatic set is checked (step S213-2). When the select switch 86 is turned ON, the auto-pict inhibition flag is set to "0" in order to enable the picture automatic set. Then control proceeds to step S217-2 (steps S213-2: select SW ON, S215-2).

When the select switch 86 is turned OFF, control skips step S215-2 and proceeds to step S217-2 (steps S213-2: select SW OFF). Namely, when the auto-pict inhibition flag is set to "1", control maintains the present state and proceeds to step S217-2. The state of the auto-pict inhibition flag is checked at step S217-2, and when the auto-pict inhibition flag is set to "0", the picture automatic set operation is executed. Then, control proceeds to step S221 (steps S217-2: auto-pict inhibition flag=0, S219-2, S221). When the auto-pict inhibition flag is set to "1", since the picture automatic set is inhibited, control skips step S219-2 and proceeds to step S221 (steps S217-2: auto-pict inhibition flag=1, S221).

The display of the picture automatic set mode is executed at step S221. Further, the shutter speed Tv, the aperture value Av, or other indications like the photographing number, are also displayed at step S221.

Figure 27:
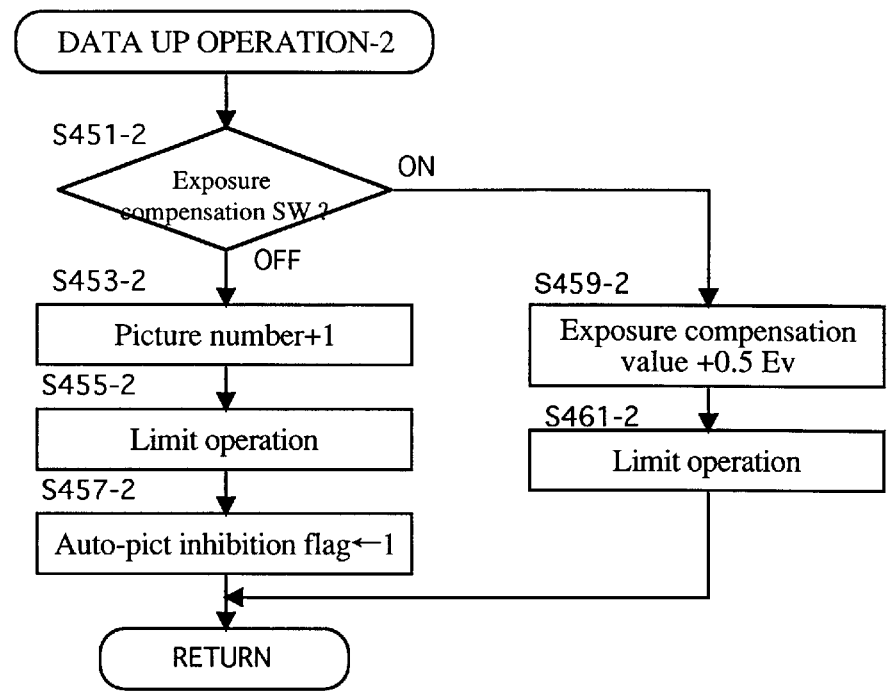
FIG. 27 is a flow chart of a data UP operation-2 of a single-lens reflex camera according to the second embodiment of the present invention.
Figure 28:
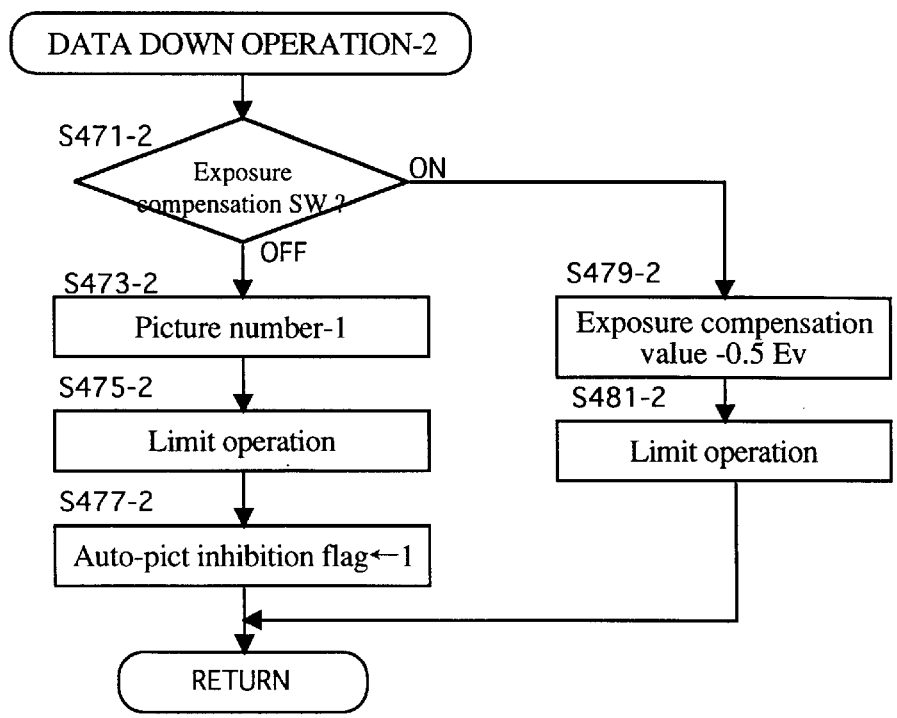
FIG. 28 is a flow chart of a data DOWN operation-2 of a single-lens reflex camera according to the second embodiment of the present invention.

If the auto-pict inhibition flag has once been set at data UP operation-2 and the data DOWN operation-2 shown in FIGS. 27 and 28, when the auto-pict inhibition flag is cleared through the clear operation of the auto-pict inhibition flag at steps S213-2 and S215-2 in the SW operation display operation-2, the picture automatic set can be executed.

"Picture Automatic Set Operation-2"

Figure 26:
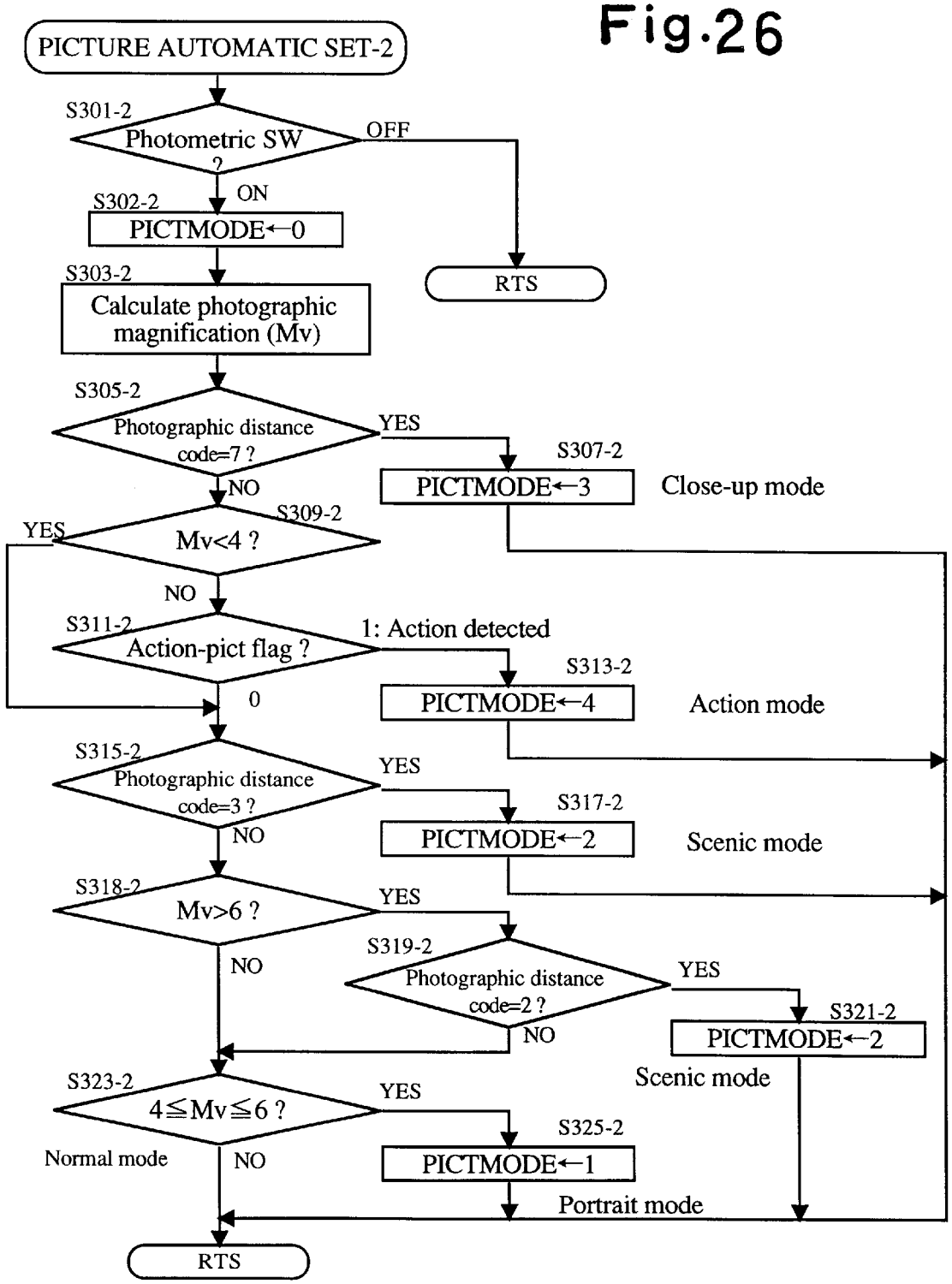
FIG. 26 is a flow chart of a picture automatic set operation-2 of a single-lens reflex camera according to the second embodiment of the present invention.

The picture automatic set operation-2 at step S219-2 is described below in detail with reference to the flow chart in FIG. 26. In the second embodiment of the present invention, the picture automatic set operation, or the picture manual set operation, can set any programmed exposure mode—the normal mode, the portrait mode, the scenic mode, the close-up mode and the action mode.

In the second embodiment, when the main switch lever 14 is slid to the AUTO position, the picture automatic set operation is selected. At that time, the normal mode is selected as the initial mode.

The manual setting of the picture mode (the picture manual set) is carried out by operation of the UP/DOWN lever 16 when the main switch lever 14 is at the AUTO position. When control enters the picture manual set operation, the auto-pict inhibition flag is set to "1" so that the picture automatic set operation is inhibited.

When control enters the picture automatic set operation-b 2,the state of the photometric switch 74 is first checked. When the photometric switch 74 is turned OFF, control is returned. When it is turned ON, control proceeds from step S301-2 to S302-2. The PICTMODE is set to "0" at step S302-2 in order to select the normal mode.

Then, the photographic magnification Mv is obtained at step S303-2, based on the focal length fv of the photographic lens 51 and the photographic distance Dv, in accordance with the following formula:

Mv=(Dv+2O)/2−fv.

Then, the photographic distance code, which is input from the photographic lens 51, is checked. Firstly, the photographic distance code is checked. If the photographic distance code is "7", namely the photographic distance is the shortest, the PICTMODE is set to "3" (the close-up mode is selected) and control is returned (steps S305-2: YES, S307-2).

When the photographic distance code is not "7", the photographic magnification Mv is checked. If the photographic magnification Mv is not less than "4", the action-pict flag is checked. If the action-pict flag is set to "1", the object is in action. Consequently, the photographic magnification Mv is checked. If the action-pict flag is set to "0", regardless of whether the photographic magnification Mv is less than "4", whether the photographic distance code is checked (steps S309-2: YES, S315-2, or steps S309-2: NO, S311-2: action-pict flag=0, S315-2). When the photographic distance code is "3", (an object in the distance), the PICTMODE is set to "2" (the scenic mode is selected) , and control is returned (steps S315-2: YES, S317-2).

When the photographic distance code is not "3", the photographic magnification Mv is checked (steps S315-2: NO, S317-2). If the photographic magnification Mv is more than "6", the photographic distance code is checked. When the photographic distance code is "2" (infinity), the PICTMODE is set to "2" (the scenic mode is selected), and control is returned (steps S318-2: YES, S319-2: YES, S321-2).

When the photographic distance code is not "2" although the photographic magnification Mv is more than "6", or when the photographic magnification Mv is not more than "6", the photographic magnification Mv is checked (steps S318-2: YES, S319-2: NO, S323-2, or steps S318-2: YES, S323-2). If the photographic magnification Mv is within the range between "4" and "6", the PICTMODE is set to "1" (the portrait mode is selected), and control is returned (steps S323-2: YES, S325-2). If the photographic magnification Mv is not within the range between "4" and "6", control is returned (step S323-2: NO), and in such a case, the normal mode set at step S302-2 (PICTMODE=0) has been selected.

After completion of selection of the PICTMODE in the above operations, the indications corresponding to the selected PICTMODE are displayed on the external LCD 31 and the inside finder LCD 41 (see FIGS. 3 and 4). When the PICTMODE is "0", since the present mode is the normal mode, the indications of FIG. 3 (A) and FIG. 4 (A) are displayed. Similarly, when the PICTMODE is "1", since the present mode is the portrait mode, the indications of FIG. 3 (B) and FIG. 4 (B) are displayed. When the PICTMODE is "2", since the present mode is the scenic mode, the indications of FIG. 3 (C) and FIG. 4 (C) are displayed. When the PICTMODE is "3", since the present mode is the close-up mode, the indications of FIG. 3 (D) and FIG. 4 (D) are displayed. When the PICTMODE is "4", since the present mode is the action mode, the indications of FIG. 3 (E) and FIG. 4 (E) are displayed. With such indications, the photographer can easily recognize which programmed mode is selected.

"Data UP Operation-2 and Data DOWN Operation-2"

Figure 8:
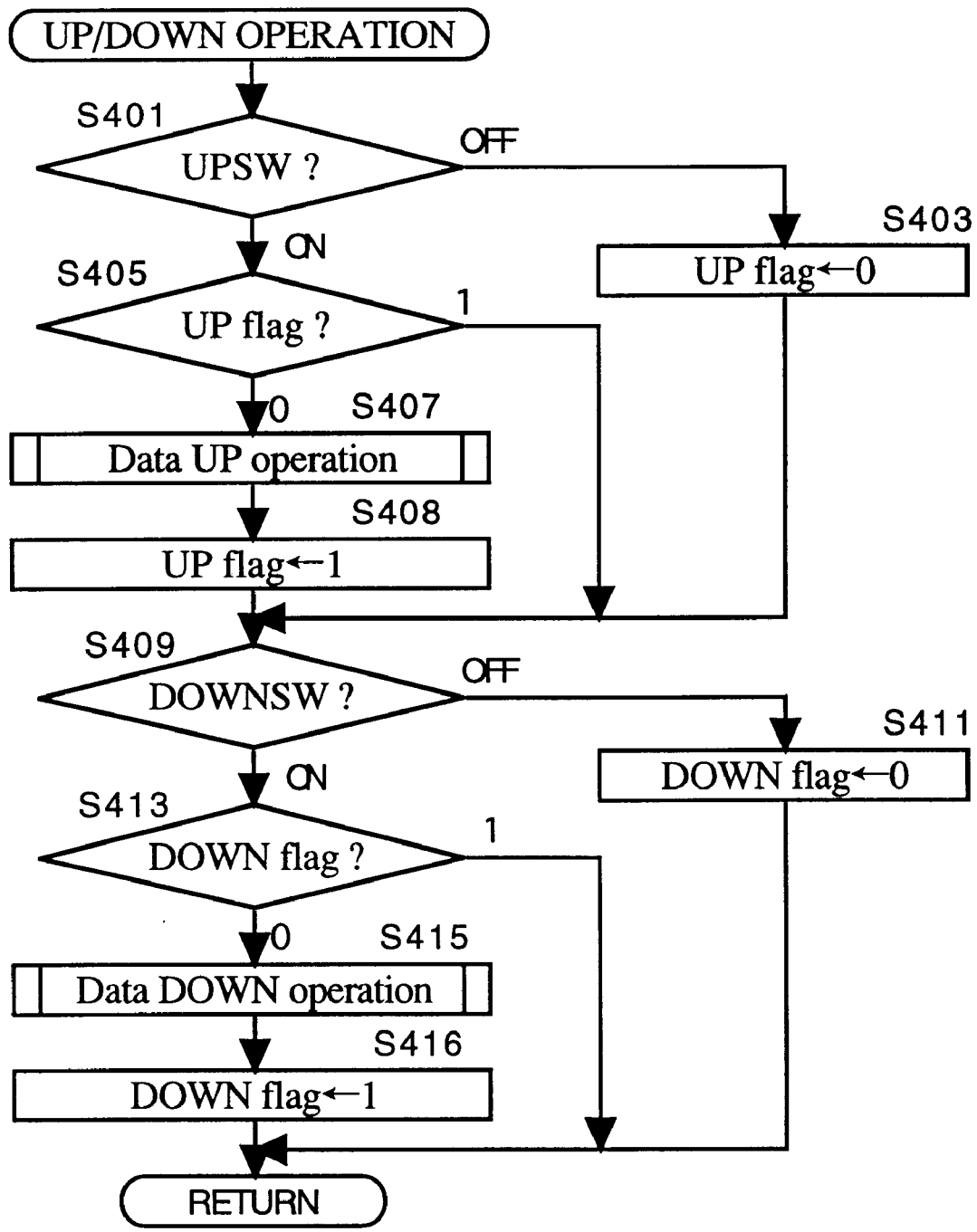
FIG. 8 is a flow chart of an UP/DOWN operation of a single-lens reflex camera according to the present invention.

The data UP operation-2 at step S407, and the data DOWN operation-2 at step S415, both shown in FIG. 8, are described with reference to the flow charts in FIGS. 27 and 28. In the second embodiment of the present invention, the manual selection of the picture mode and the compensation of the exposure compensation value can be executed. The exposure compensation value is compensated through operation of the UP/DOWN lever 16 during the state in which the exposure compensation button 18 is depressed (namely, when the exposure compensation switch 78 is turned ON). The manual set of the picture mode is carried out through operation of the UP/DOWN lever 16 during the state in which the main switch lever 14 is in the AUTO position.

When control enters the data UP operation-2, the state of the exposure compensation switch 78 is checked (step S451-2). If the exposure compensation switch 78 is not turned ON, the picture number is incremented by 1, the limit operation is executed, and the auto-pict inhibition flag is set to "1". Then control is returned (steps S451-2: OFF, S453-2, S455-2, S457-2). Consequently, when the auto-pict inhibition flag is set to "1" through the picture manual set operation, the picture automatic set is inhibited.

If the exposure compensation switch 78 is turned ON, the exposure compensation value is incremented by 0.5 Ev, the limit operations in regard to the picture number and the exposure compensation value are executed, and control is returned (steps S459-2, S461-2). In the limit operation of the picture number, when the picture number becomes "4", the number more than "4" is not set. In the limit operation of the exposure compensation value, when the exposure compensation value reaches the limit value (for example, +2.0 Ev), the value more than the limit value is not set.

Similarly, when control enters the data DOWN operation-2, the state of the exposure compensation switch 78 is checked (step S471-2). If the exposure compensation switch 78 is not turned ON, the picture number is decremented by 1, the limit operation is executed, and the auto-pict inhibition flag is set to "1", then control is returned (steps S471-2: OFF, S473-2, S475-2, S477-2). Since the auto-pict inhibition flag is set to "1", the picture automatic set is inhibited.

If the exposure compensation switch 78 is turned ON, the exposure compensation value is decremented by 0.5 Ev, the limit operations in regard to the picture number and the exposure compensation value are executed, and control is returned (steps S479-2, S481-2). In the limit operation of the picture number, when the picture number becomes "0", the number less than "0" is not set. In the limit operation of the exposure compensation value, when the exposure compensation value reaches the limit value (for example, −2.0 Ev), the value less than the limit value is not set.

"Release Operation-2"

Figure 29:
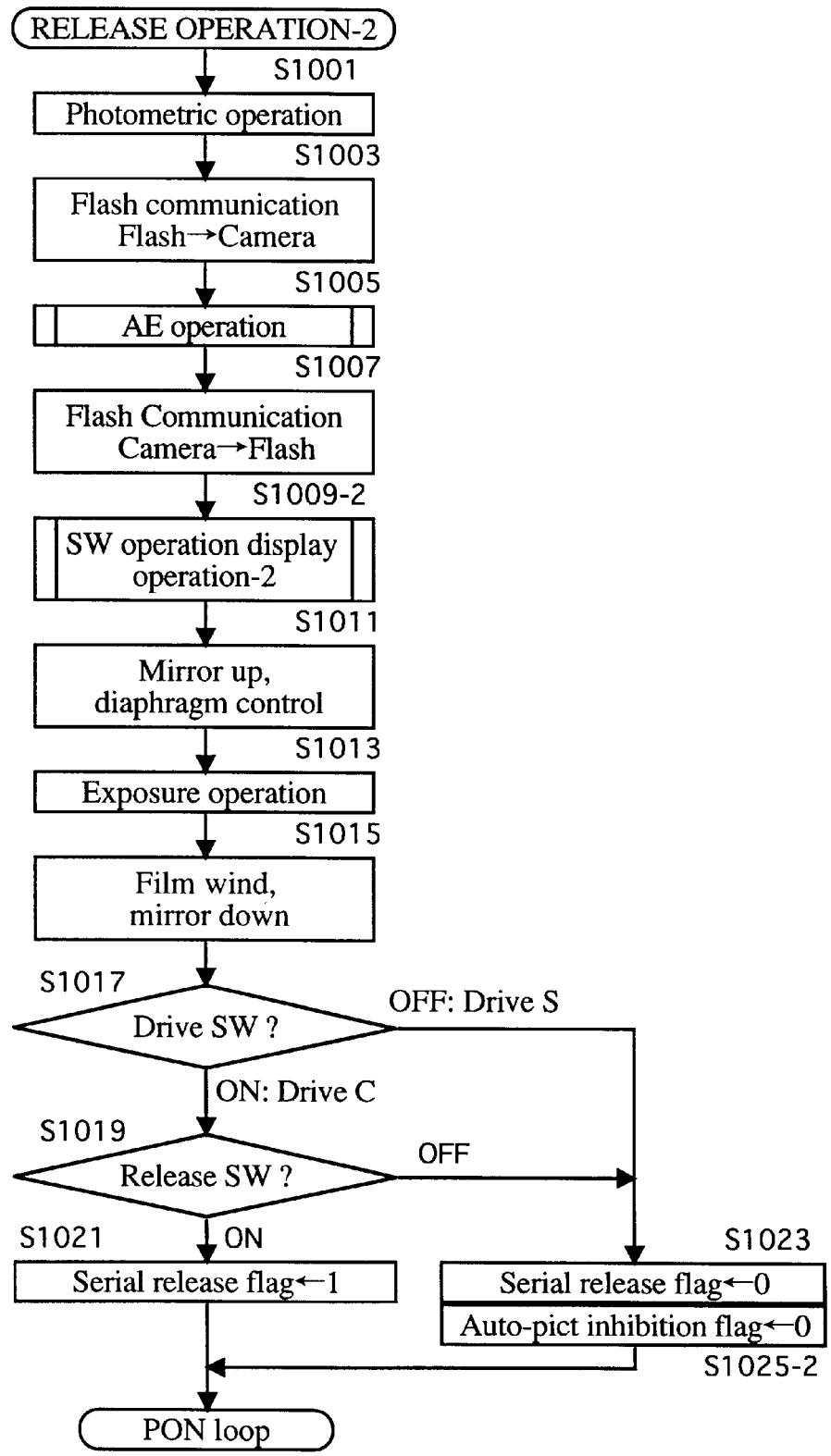
FIG. 29 is a flow chart of a release operation-2 of a single-lens reflex camera according to the second embodiment of the present invention.

FIG. 29 shows the flow chart of the release operation-2 in the second embodiment of the present invention. There is an additional step in the release operation-2 in FIG. 29 that is not in the release operation in FIG. 17, namely, after the release switch is turned OFF, the auto-pict flag is cleared at step S1025-2.

In the release operation-2, control proceeds to the photometric operation at step S1001, the data communication from the strobe to the camera body (flash communication) at step S1003, the AE operation at step S1005, the data communication from the camera body to the strobe based on the result of the AE operation (flash communication) at step S1007, and the switch operation display operation-2 (loop) at step S1009. Then, a series of exposure controls, namely the mirror up and the diaphragm (aperture value) control at step S1011, the exposure operation at step S1013, the film wind and the mirror down at step S1015, are executed. Then, whether the serial drive has been executed is checked (step S1017), and if the serial drive is executed, on condition that the release switch 76 is turned ON, the serial release flag is set to "1", and control is returned to the PON loop operation (steps S1019, S1021).

Regardless of the state of the drive switch 76, when the release switch is turned OFF, the serial release flag is set to "0", the auto-pict inhibition flag is set to "0" (namely, the picture automatic set is enabled), and control is returned to the PON loop operation (steps S1017: OFF, S1023, S1025-2, or steps S1017: ON, S1019: OFF, S1023, S1025-2). Since the auto-pict inhibition flag is set to "0", the picture automatic set, which has been inhibited, is enabled. Namely, when the photographing is completed, the picture automatic set can be executed.

As described above, according to the second embodiment of the present invention, there are the normal (green), portrait, scenic, close-up and the action modes (programmed exposure modes) provided for the camera, and the camera automatically selects the most suitable programmed exposure mode corresponding to the focal length, photographic distance and the state of action of object. Consequently, the photographer is not required to select the most suitable programmed exposure mode by considering the photographic conditions. In addition, when the photographer wishes to select the mode manually, like the case in which the automatically selected programmed exposure mode is not the desired mode of the photographer, the manual selection can be performed by simple operation of the UP/DOWN switch. During the manual selection, although the picture automatic set mode in itself is not changed, the picture automatic set is inhibited. Consequently, the mode selected by the manual selection is maintained until the photographing is completed, or until the predetermined amount of time has passed.

In the second embodiment as above mentioned, when one photograph is completed in the mode selected manually, it is designed that the mode is invariably returned to the picture mode (picture automatic set mode). It is also possible to provide that, the inhibition of the picture automatic set is not cleared after the photographing is completed, and is only cleared by expiration of the timer. For example, when step S1025-2 in FIG. 29 is deleted, the inhibition of the picture automatic set is not cleared after completion of photographing. Thus the inhibition of the picture automatic set is cleared, when the PON timer expires, or when the select switch 86 is turned ON.

The picture automatic set mode in the second embodiment can be modified, for example, to the structure in which the selective operation is executed between the picture manual set mode and the picture automatic set mode. In such a structure, when the picture automatic set mode is selected, the picture manual set mode can also be performed, and on the other hand, when the picture manual set mode is selected, the picture automatic set mode cannot be executed.

In the above-mentioned embodiment, the picture (icon) corresponding to the automatically selected exposure mode is displayed. Thus the photographer can easily and correctly understand the automatically selected exposure mode. Although there are five selectable programmed exposure modes in the above-mentioned embodiment, it is clear that the present invention is not limited to such programmed exposure modes.

As may be understood from the foregoing, according to the present invention, there is provided with a camera in which a plurality of photographic modes can be selected. The camera has the photographic mode automatic selecting means, which selects from the plurality of photographic modes, the desired photographic mode by manual operation, or the most suitable photographic mode based on the photographic conditions. When the photographic mode is selected by manual operation, the photographic mode automatic selection is not executed. When the photographic mode automatic selection is executed, since the photographic mode is automatically selected, the photographer is not bothered with the selection of the exposure mode. In addition, during the photographic mode automatic selection, when the photographer wishes to select any photographic mode other than the photographic mode automatically selected, the manual selection can be performed without switching between the automatic selection mode and the manual selection mode. Consequently, in the second embodiment of the present invention, the selection of the photographic mode can be performed easily by manual operation, and the photographic mode selected by the manual operation is maintained under a predetermined condition. Therefore, the manual selection of the photographic mode can be performed easily under the condition of the photographic mode automatic selection.

The above-mentioned embodiments execute the selecting operation of the suitable photographic mode among a plurality of photographic modes (programmed exposure modes), based on the information in regard to the focal length and the photographic distance, synchronized with the depressing operation of the shutter button 15.

Figure 30:
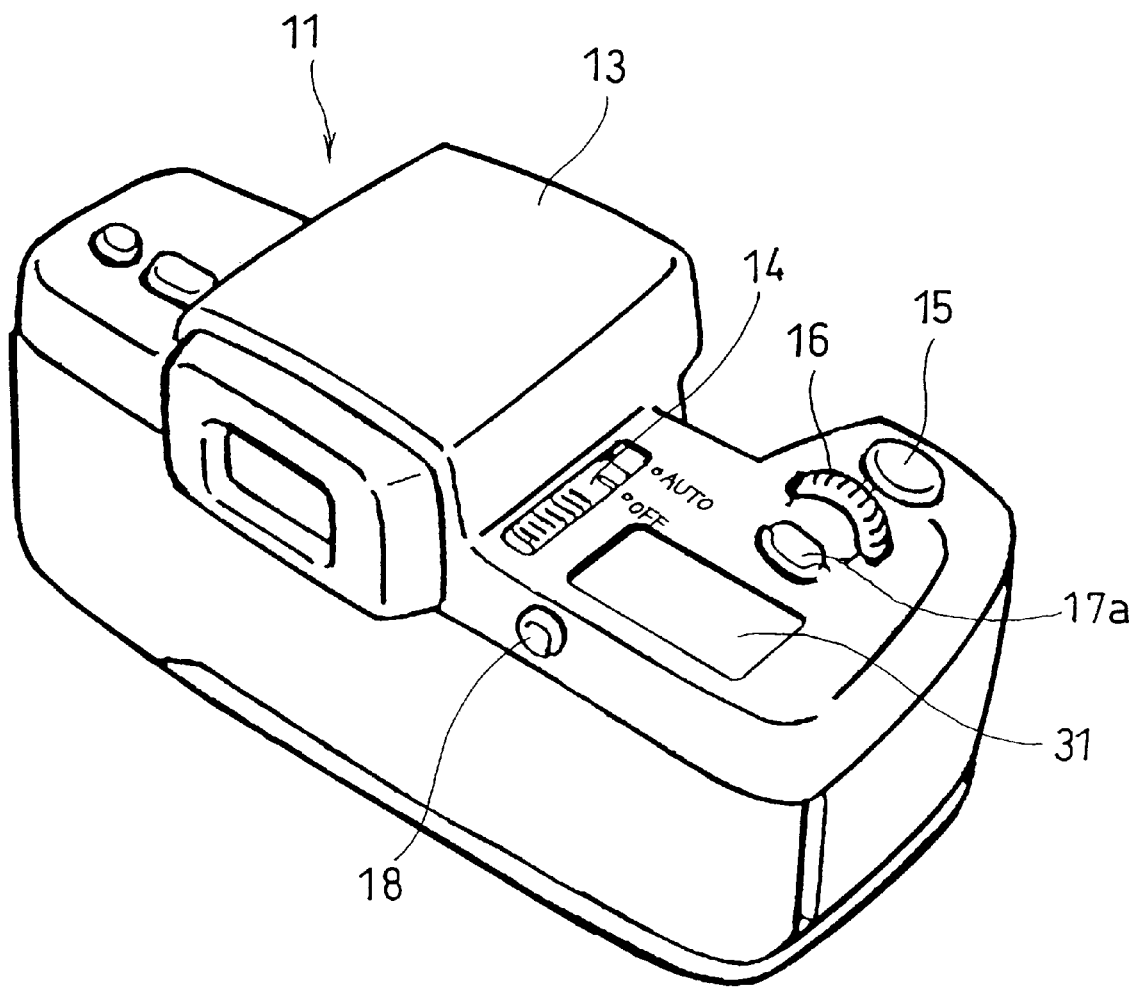
FIG. 30 is a schematic perspective view of a structure of a third embodiment, as seen from a rear of a camera body of a single-lens reflex camera to which the present invention is applied.

As the other embodiment of the present invention, there is a third embodiment of the present invention, in which the selection of the photographic mode among a plurality of photographic modes (programmed exposure modes) is executed when a pict-operation button 17a is turned ON. The pict-operation button 17a is provided separate from the shutter button 15. FIG. 30 illustrates a camera body 11 according to the third embodiment of the present invention, in which the pict-operation button 17a is provided in the rear of the UP/DOWN lever 16, so that the pict-operation button 17a can be depressed.

The third embodiment of the present invention will be described in detail with reference to FIGS. 30 through 35. The camera body 11 in the third embodiment is provided with the pict-operation button 17a, and the other structure is the same as the camera body in the embodiment shown in FIG. 1. Therefore, in the third embodiment, the common reference numerals are used for the parts or elements in the embodiment of FIG. 1 which have common functions with each other, and the descriptions thereof are omitted. Reference numeral 88 in FIG. 2 is a pict-operation switch 88 which is turned ON or OFF in synchronization with the depression of the pict-operation button 17a. It is clear that the position of the pict-operation button 17a is not limited to the position shown in FIG. 30.

The third embodiment of the present invention will now be described in detail with reference to FIGS. 31 through 35.

The main feature of the third embodiment is that the picture automatic set operation is executed by operation of the pict-operation button 17a which is provided separate from the shutter button 15.

The third embodiment of the present invention is fundamentally carried out with reference to the flow charts shown in FIGS. 5 through 18 and FIGS. 24 through 29. The flow charts of the START operation in FIG. 5, the UP/DOWN operation in FIG. 8, the RESTART operation in FIG. 11, the AE operation in FIG. 12 and the release operation in FIG. 18 can be utilized without any modification in the third embodiment. There are several steps in the flow charts which should be modified, namely, in the flow charts of the SW operation display operation in FIG. 6, the picture automatic set operation-2 in FIG. 26, the data UP operation in FIG. 9, the data DOWN operation in FIG. 10 and the AF operation in FIG. 17. Therefore, the third embodiment of the present invention will be described in regard to the flow charts proper to the third embodiment, namely the SW operation display operation-3, the picture automatic set operation-3, the data up operation 3, the data DOWN operation-3 and the AF operation-3, with reference to the flow charts shown in FIGS. 31 through 35. The other operations shown in FIGS. 5 through 18, which are different from the operations in the third embodiment, can be provided in the third embodiment at the same time. However, since such other operations do not affect the features of the third embodiment, the description thereof will be omitted.

"SW Operation Display Operation-3"

Figure 31:
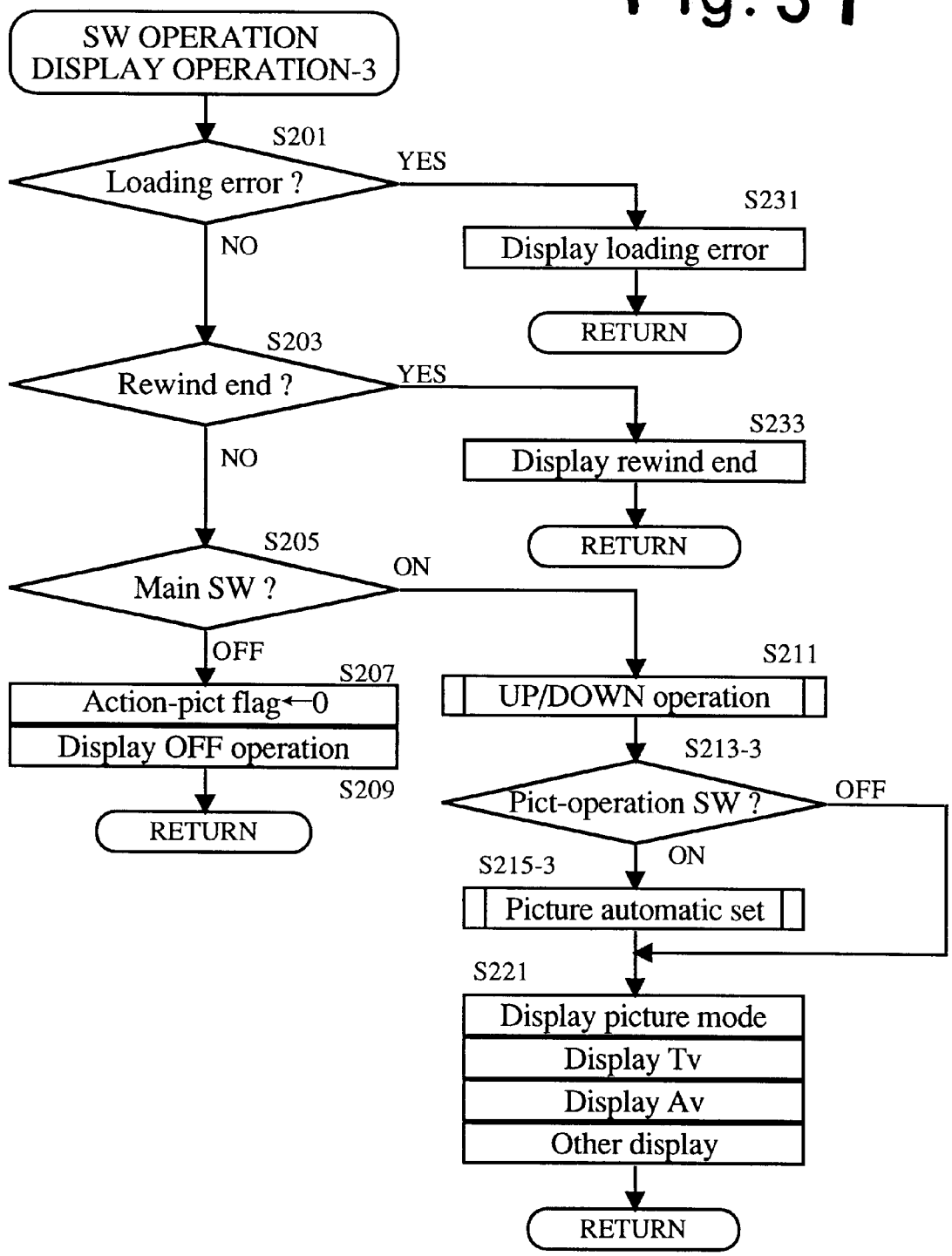
FIG. 31 is a flow chart of an SW operation display operation-3 of a single-lens reflex camera according to the third embodiment of the present invention.

The SW operation display operation-3, which is executed at step S111, is described below in detail with reference to the flow chart shown in FIG. 31. The SW operation display operation-3 checks the state of the switches of the camera, and displays any indication according to the state at that time. The operations at steps S201 through S209, S221, S231 and S233 in the SW operation display operation-3 are the same as those at steps S201 through S209, S221, S231 and S233 in the SW operation display operation. There are different operations after step S211, namely steps S213-3 and S215-3.

When neither the loading error nor the rewind end occurs, the following operations are executed.

When the main switch 70 is turned OFF, the action-pict flag is set to "0", the displays of the external LCD 36 and the inside finder LCD 41 are turned OFF, and control is returned (steps S205: main SW OFF, S207, S209). The action-pict flag identifies whether the object is in action (moving), and if the object is judged to be in action, the flag is set to "1".

When the main switch 70 is turned ON, the UP/DOWN operation is executed. In the UP/DOWN operation, when the UP switch 80 or the DOWN switch 82 is turned ON, the corresponding operation is executed (steps S205: main SW ON, 211).

Then, the state of the pict-operation switch 88 is checked (step S213-3). When the pict-operation switch 88 is turned ON, the picture automatic set is executed. Then, control proceeds to step S221 (steps S213-3: pict-operation SW ON, S215-3, S221).

When the pict-operation switch 88 is turned OFF, control skips step S215-3 and proceeds to step S221 (steps S213-2: pict-operation SW OFF). The display of the picture automatic set mode is executed at step S221. Further, the shutter speed Tv, the aperture value Av, or the other indications like the photographing number, are also displayed at step S221, and control is returned.

"Picture Automatic Set Operation-3"

Figure 32:
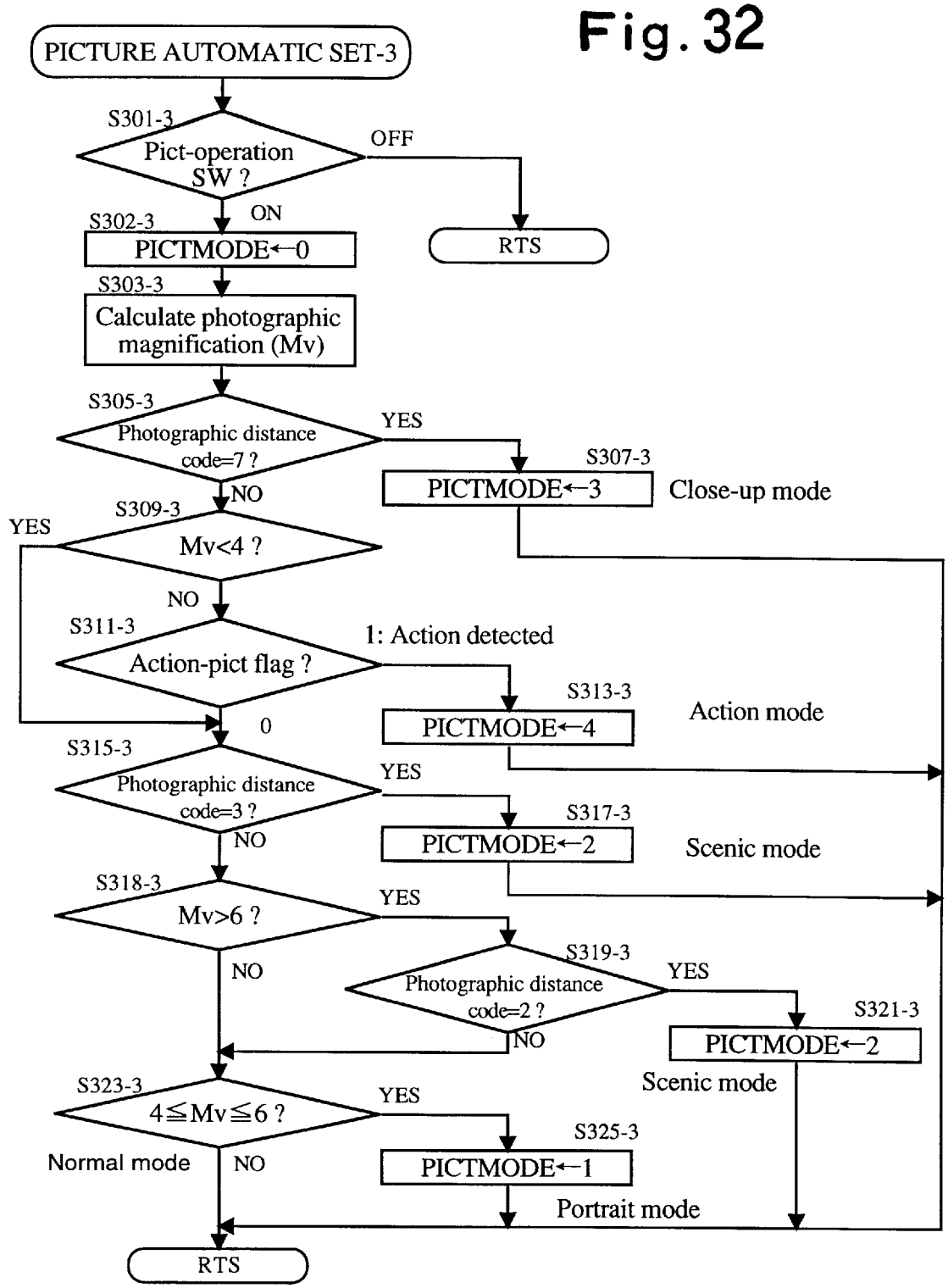
FIG. 32 is a flow chart of a picture automatic set operation-3 of a single-lens reflex camera according to the third embodiment of the present invention.

The picture automatic set operation-3 at step S219-3 is described below in detail with reference to the flow chart in FIG. 32. In the third embodiment of the present invention, the picture automatic set operation, or the picture manual set operation, can set any programmed exposure mode—the normal mode, the portrait mode, the scenic mode, the close-up mode and the action mode. In the third embodiment, when the main switch lever 14 is slid to the AUTO position, the normal mode is selected as the initial mode.

When control enters the picture automatic set operation-3, the state of the pict-operation switch 88 is first checked. When the pict-operation switch 88 is turned OFF, control is returned. When turned ON, control proceeds from step S301-3 to S302-3. The PICTMODE is set to "0" at step S302-3 in order to select the normal mode.

Then, the photographic magnification Mv is obtained at step S303-3, based on the focal length fv of the photographic lens 51 and the photographic distance Dv, in accordance with the following formula:

Mv=(Dv+2O)/2−fv.

Then, the photographic distance code, which is input from the photographic lens 51, is checked. Firstly, the photographic distance code is checked. If the photographic distance code is "7", namely the photographic distance is the shortest, the PICTMODE is set to "3" (the close-up mode is selected) and control is returned (steps S305-3: YES, S307-3).

When the photographic distance code is not "7", the state of the photographic magnification Mv is checked. If the photographic magnification Mv is not less than "4", the action-pict flag is checked. If the action-pict flag is set to "1", the object is in action, consequently, the PICTMODE is set to "4" (the action mode is selected), then control is returned (steps S309-3: NO, S311-3: action-pict flag=1, S313-3).

When the photographic magnification Mv is less than 4, or in the case of not less than 4, when the action-pict flag is set to "0", the photographic distance code is checked (steps S309-3: YES, S315-3, or steps S309-3: NO, S311-3: action-pict flag=0, S315-3). When the photographic distance code is "3" (an object in the distance), the PICTMODE is set to "2" (the scenic mode is selected), and control is returned (steps S315-3: YES, S317-3).

When the photographic distance code is not "3", the state of the photographic magnification Mv is checked (steps S315-3: NO, S318-3). If the photographic magnification Mv is more than "6", the state of the photographic distance code is checked. When the photographic distance code is "2" (infinity), the PICTMODE is set to "2" (the scenic mode is selected), and control is returned (steps S318-3: YES, S319-3: YES, S321-3).

When the photographic distance code is not "2" although the photographic magnification Mv is more than "6", or when the photographic magnification Mv is not more than "6", the photographic magnification Mv is checked (steps S318-3: YES, S319-3: NO, S323-3, or steps S318-3: YES, S323-3). If the photographic magnification Mv is within the range between "4" and "6", the PICTMODE is set to "1" (the portrait mode is selected), and control is returned (steps S323-3: YES, S325-3). If the photographic magnification Mv is not within the range between "4" and "6", control is returned (step S323-3: NO), and in such a case, the normal mode set at step S302-3 (PICTMODE=0) has been selected.

After completion of selection of the PICTMODE in the above operations, the indications corresponding to the selected PICTMODE are displayed on the external LCD 31 and the inside finder LCD 41 (see FIGS. 3 and 4). When the PICTMODE is "0", since the present mode is the normal mode, the indications of FIG. 3 (A) and FIG. 4 (A) are displayed. Similarly, when the PICTMODE is "1", since the present mode is the portrait mode, the indications of FIG. 3 (B) and FIG. 4 (B) are displayed. When the PICTMODE is "2", since the present mode is the scenic mode, the indications of FIG. 3 (C) and FIG. 4 (C) are displayed. When the PICTMODE is "3", since the present mode is the close-up mode, the indications of FIG. 3 (D) and FIG. 4 (D) are displayed. When the PICTMODE is "4", since the present mode is the action mode, the indications of FIG. 3 (E) and FIG. 4 (E) are displayed. With such indications, the photographer may easily know which programmed mode is selected.

"Data UP Operation and Data DOWN Operation-3"

Figure 33:
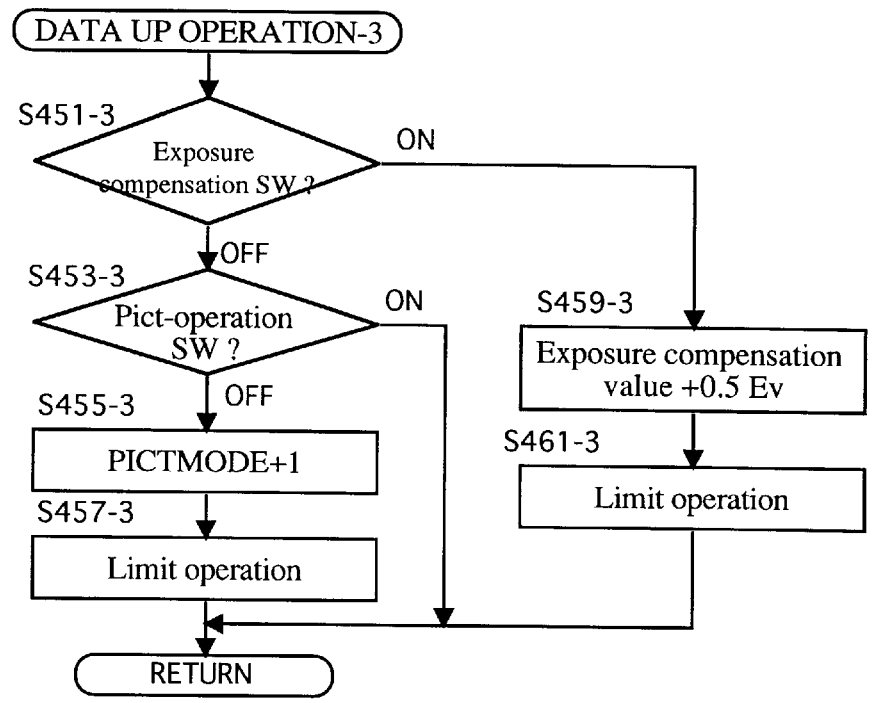
FIG. 33 is a flow chart of a data UP operation-3 of a single-lens reflex camera according to the third embodiment of the present invention.
Figure 34:
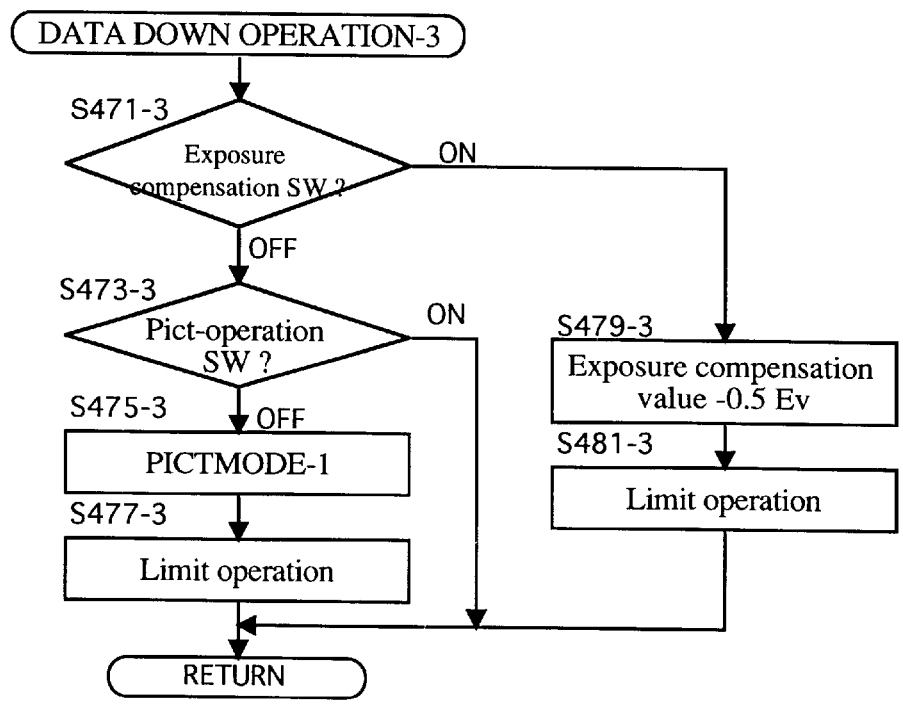
FIG. 34 is a flow chart of a data DOWN operation-3 of a single-lens reflex camera according to the third embodiment of the present invention.

The data UP operation(-3) at step S407, and the data DOWN operation(-3) at step S415, are both shown in FIG. 8, and described with reference to the flow charts in FIGS. 33 and 34. In the third embodiment of the present invention, the manual selection of the picture mode and the set of the exposure compensation value can be executed. The exposure compensation value is set through operation of the UP/DOWN lever 16 during the state in which the exposure compensation button 18 is depressed (namely, when the exposure compensation switch 78 is turned ON). The manual set of the picture mode is carried out through operation of the UP/DOWN lever 16 on condition that the pict-operation switch 88 is turned ON. When the pict-operation switch 88 is turned ON, the picture manual set operation is inhibited, thus the picture mode set by the picture automatic set operation cannot be changed.

When control enters the data UP operation-3, the state of the exposure compensation switch 78 is checked (step S451-3). If the exposure compensation switch 78 is not turned ON, the state of the pict-operation switch 88 is checked. If the pict-operation switch 88 is turned ON, since the present mode is the picture automatic selection mode, control is returned (steps S451-3: exposure compensation SW OFF, S453-3: pict-operation SW ON). If the pict-operation switch 88 is not turned ON, the picture number of the PICTMODE is incremented by 1, the limit operation in regard to the picture number of the PICTMODE is executed, and control is returned (steps S451-3: OFF, S453-3: OFF, S455-3, S457-3). Consequently, on condition that the pict-operation switch 88 is turned OFF, the picture manual set is performed.

If the exposure compensation switch 78 is turned ON, the exposure compensation value is incremented by 0.5 Ev, the limit operation in regard to the exposure compensation value is executed, and control is returned (steps S459-3, S461-3).

In the limit operation of the picture number of the PICTMODE, when the picture number of the PICTMODE becomes "4", the number more than "4" is not set. In the limit operation of the exposure compensation value, when the exposure compensation value reaches the limit value (for example, +2.0 Ev), the value more than the limit value is not set.

Similarly, when control enters the data DOWN operation-3, the state of the exposure compensation switch 78 is checked (step S471-3). If the exposure compensation switch 78 is not turned ON, the state of the pict-operation switch 88 is checked. If the pict-operation switch 88 is turned ON, since the present mode is the picture automatic selection mode, control is returned (steps S471-3: exposure compensation SW OFF, S473-3: pict-operation SW ON). If the pict-operation switch 88 is not turned ON, the picture number of the PICTMODE is decrement by 1, the limit operation in regard to the picture number of the PICTMODE is executed, and control is returned (steps S471-3: OFF, S473-3: OFF, S475-3, S477-3).

If the exposure compensation switch 78 is turned ON, the exposure compensation value is decremented by 0.5 Ev, the limit operation in regard to the exposure compensation value is executed, and control is returned (steps S479-3, S481-3).

In the limit operation of the picture number of the PICTMODE, when the picture number of the PICTMODE becomes "0", the number less than "0" is not set. In the limit operation of the exposure compensation value, when the exposure compensation value reaches the limit value (for example, −2.0 Ev), the value less than the limit value is not set.

As described above, when the pict-operation switch 88 is turned ON, namely, while the pict-operation button 17a is fully depressed, the operation of the UP/DOWN lever 16 is disabled. Therefore, the appropriate picture mode (photographic mode) is selected by the picture automatic set operation.

On the other hand, if the photographer did not obtain the desired picture mode in spite of the operation of the pict-operation button 17a, the photographer stops the operation of the pict-operation button 17a, and operates the UP/DOWN lever 16 so that the desired picture mode can be obtained.

"AF Operation-3"

Figure 35:
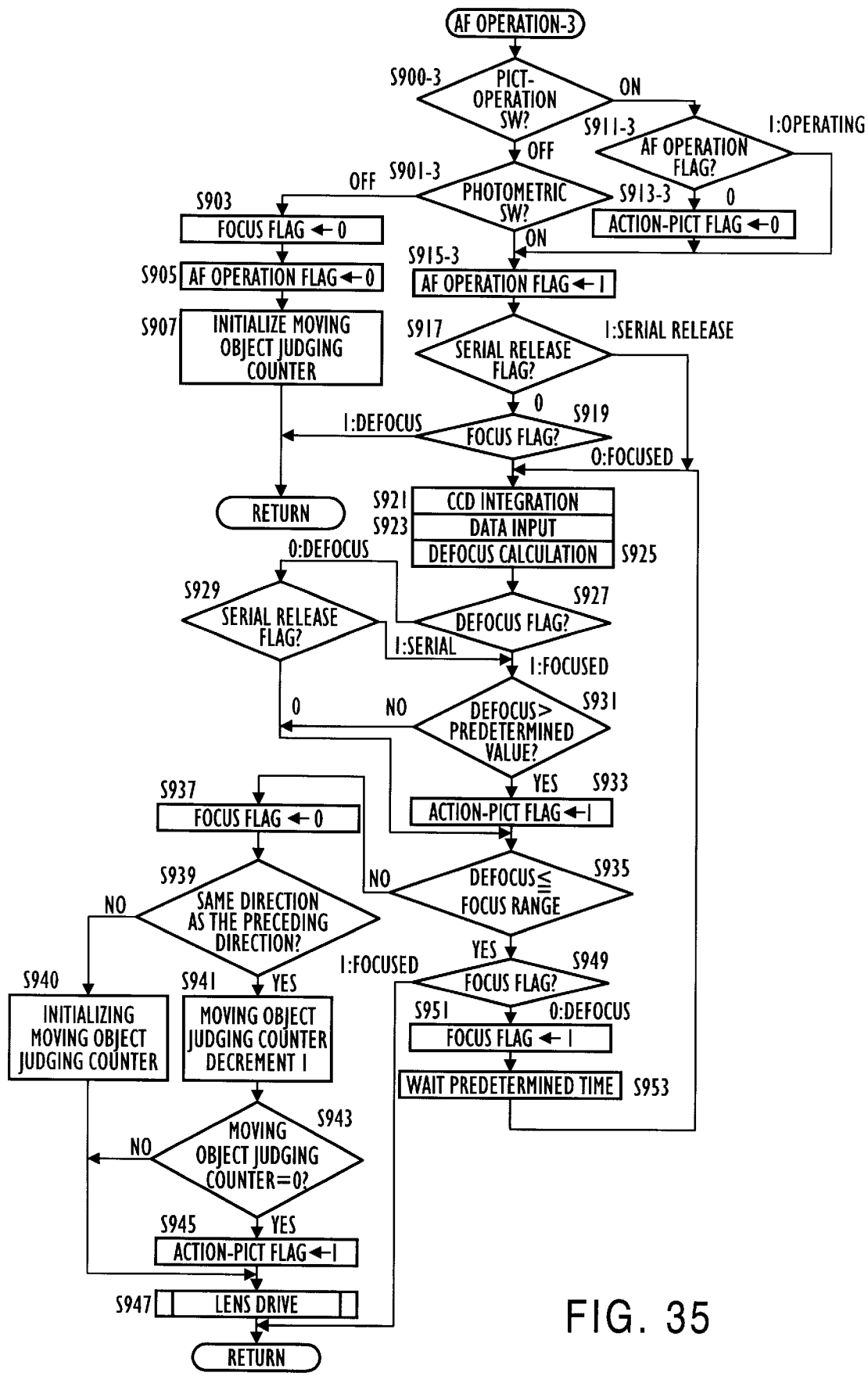
FIG. 35 is a flow chart of an AF (automatic focusing) operation-3 of a single-lens reflex camera according to the third embodiment of the present invention.

The AF operation-3 in the third embodiment of the present invention is described with reference to the flow chart shown in FIG. 35. The AF operation-3 in the third embodiment features that the AF operation is executed, not only when the photometric switch 74 is turned ON, but also when the pict-operation switch 88 is turned ON. The flow chart shown in FIG. 35 is realized by modification of steps S901, S911, S913 and S915 in FIG. 17, and also by addition of step S900-3 to FIG. 35. The other steps are the same as those of FIG. 17.

When control enters the AF operation, if both the pict-operation switch 88 and the photometric switch 74 are turned OFF, the focus flag is set to "0", the AF operation flag is set to "0", the moving object judging counter is initialized, and control is returned (steps S900-3: pict-operation SW OFF, S901-3: photometric SW OFF, S903, S905, S907). The focus flag identifies whether focused or not, and if focused, the focus flag is set to "1". The AF operation flag identifies whether the AF operation is being executed, and if the AF operation starts, the AF operation flag is set to "1". The moving object judging counter executes the action detecting operation (namely, the moving object judging counter is provided with an action detecting function) which counts the number and identifies that the object is in action (moving). When the focusing is not carried out after the AF lens has been driven a predetermined number of times, for example, three times, the object is judged to be in action.

"Either When the Pict-operation Switch 88 Is Turned ON, or When the Photometric Switch 74 Is Turned ON"

There is a case when either the pict-operation switch 88 or the photometric switch 74 is turned ON. Firstly, the state of the pict-operation switch 88 is checked (step S900-3). When the pict-operation switch is turned ON, the AF operation flag is checked. If the AF operation flag is set to "0" (the AF operation is not executed), the action-pict flag is cleared (set to "0"), and control proceeds to step S915-3. If the AF operation flag is set to "1" (the AF operation is executed), control proceeds to step S915-3 (steps S900-3: pict-operation SW ON, S911-3: AF operation SW=0, S913-3. S915-3, or steps S900-3: ON, S911-3: "1", S915-3). The action-pict flag serves as the action detecting operation (the action detecting function), and identifies whether or not the object is in action (moving). When the object is identified as being in action, the action-pict flag is set to "1".

When the pict-operation switch 88 is not turned ON, the state of the photometric switch 74 is checked. If the photometric switch 74 is turned ON, control proceeds to step S915-3 (steps S900-3: OFF, S901-3: ON, S915-3).

"When the Serial Release Is Not Performed"

There is a case in which the serial release is not performed, either when the pict-operation switch 88 is turned ON, or when the photometric switch 74 is turned ON. In such a case (photographic mode), when the release switch 76 is turned ON, the exposure is carried out for only one photograph. The serial release is a photographic mode in which a series of photographs are performed while the release switch 76 is turned ON. When a drive switch (not shown) is turned ON, control enters the serial photographic mode.

When the pict-operation switch 88 or the photometric switch 74 is turned ON, the AF operation flag is set to "1" (steps S900-3: ON, S911-3, S913-3, S915-3, or steps S900-3: OFF, S901-3: ON. S915-3). Then, the state of the serial release flag is checked, and if the serial release flag is set to "0", since the present mode is not the serial release mode, the focus check is executed (steps S917: serial release flag=0, S919). If the serial release flag is set to "1", since the present mode is the serial release mode, control skips the focus check, and proceeds to step S921 (steps S917: serial release flag=1, S921).

The operations after step S921 are the same as the operations shown in FIG. 17. Therefore the description thereof is omitted.

As described above, according to the third embodiment of the present invention, the pict-operation button 17a is provided separate from the shutter button 15. There are the normal, portrait, scenic, close-up and action modes (programmed exposure modes) provided for the camera, and when the pict-operation button 17a is turned ON, the camera automatically selects the most suitable programmed exposure mode corresponding to the focal length, photographic distance and the state of action of the object.

Consequently, the photographer is not required to select the most suitable programmed exposure mode by considering the photographic conditions. Moreover, since the pict-operation button 17a is provided separate from the shutter button 15, the careful operation of the shutter button 15, in order not to fully depress the shutter button 15, is no longer required, which leads to easier camera operation.

When the photographer wishes to perform the manual selection, like the case in which the automatically selected programmed exposure mode is not the desired mode of the photographer, the manual selection can be performed by simple operation of the UP/DOWN lever 16, which also leads to easier camera operation.

In the third embodiment as above mentioned, the pict-operation button 17a is provided adjacent to the UP/DOWN lever 16. With such an arrangement, the pict-operation button 17a can be operated by the index finger of the photographer, like the operation of the release button 15 and the UP/DOWN lever 16. It is clear that the present embodiment is not limited to such an arrangement, and the pict-operation button 17a may be provided in any position, for example parallel to the exposure compensation button 18, so that the photographer can operate the pict-operation button 17a using a finger other than the index finger. It is also possible that the pict-operation button 17a is provided on the other side of the camera body, so that the photographer can operate the pict-operation button 17a using a finger of the other hand.

The picture automatic set mode in the third embodiment can be modified, for example, to the structure in which the selectable operation is executed between the picture manual set mode and the picture automatic set mode. In such a structure, when the picture automatic set mode is selected, the picture manual set mode can also be performed, and on the other hand, when the picture manual set mode is selected, the picture automatic set mode cannot be executed.

In the above-mentioned embodiment, the picture (icon) corresponding to the automatically selected exposure mode is displayed. Thus, the photographer can easily and correctly understand the automatically selected exposure mode. Although there are five selectable programmed exposure modes in the above-mentioned embodiment, it is clear that the present invention is not limited to such programmed exposure modes.

As may be understood from the foregoing, according to the third embodiment of the present invention, the operating means is provided separate from the shutter button, and when the photographer simply operates the operating means, the camera automatically selects the predetermined photographic mode from a plurality of the photographic modes. Consequently, the photographer is not required to select the most suitable programmed exposure mode by considering the photographic conditions. Moreover, since the operating means can be operated separately from the operation of the shutter button, extra caution like when depressing the shutter button, is no longer required, which leads to easier camera operation.

What is claimed is:

1. A camera having a photographic mode automatic selecting apparatus, comprising:
    a photographic mode selecting device that selects a photographic mode from a plurality of photographic modes;
    a photographic distance detecting device that detects photographic distance data of a photographic lens, in which said photographic mode selecting device selects an appropriate photographic mode from said plurality of photographic modes based on said photographic distance data of said photographic lens;
    a focus detecting device that detects a focusing state of said photographic lens; and a lens driver that drives a focusing lens group of said photographic lens based on a result of detection of said focus detecting device, in which said photographic mode selecting device selects an action mode when focusing is not performed in spite of an operation of said focus detecting device and said lens driver a predetermined number of times, or when a focal point changes within a predetermined time after focusing.

2. A camera having a photographic mode automatic selecting apparatus according to claim 1, in which each photographic mode of said plurality of photographic modes is a programmed exposure mode which sets a shutter speed and an aperture value by respective and different algorithms.

3. A camera having a photographic mode automatic selecting apparatus according to claim 1, further comprising:
    an automatic focusing apparatus which detects a focusing state via said photographic lens and moves a focusing lens group of said photographic lens to a focus position; and
    a photographic distance detecting device that detects a photographic distance based on a position of said focusing lens group.

4. A camera having a photographic mode automatic selecting apparatus according to claim 1, further comprising a scenic mode suitable for scenic photographing, in which said photographic mode selecting means selects said scenic mode when said photographic distance is longer than a predetermined distance.

5. A camera having a photographic mode automatic selecting apparatus according to claim 1, further comprising a close-up mode suitable for close-up photographing, in which said photographic mode selecting means selects said close-up mode when said photographic distance is shorter than a predetermined distance.

6. A camera having a photographic mode automatic selecting apparatus according to claim 1, in which each of said plurality of photographic modes is a programmed exposure mode which sets a shutter speed and an aperture value by respective and different algorithms.

7. A camera having a photographic mode automatic selecting apparatus according to claim 1, further comprising a display that identifies and displays each of said plurality of photographic modes, said display further displaying a photographic mode selected by said photographic mode selecting device.

8. A camera having a photographic mode automatic selecting apparatus, comprising:
    photographic mode selecting means for selecting a photographic mode from among a plurality of photographic modes;
    focal length detecting means for detecting a focal length of a photographic lens;
    photographic distance detecting means for detecting photographic distance data of said photographic lens, in which said photographic mode selecting means selects an appropriate photographic mode from among said plurality of photographic modes based on said detected focal length and said detected photographic distance data;
    focus detecting means for detecting a focusing state of said photographic lens; and lens driving means for driving a focusing lens group of said photographic lens based on a result of detection of said focus detecting means, in which said photographic mode selecting means selects an action mode when focusing is not performed in spite of an operation of said focus detecting means and said lens driving means a predetermined number of times, or when a focal point changes within a predetermined time after focusing.

9. A camera having a photographic mode automatic selecting apparatus according to claim 8, further comprising:
an automatic focusing apparatus which detects a focusing state via said photographic lens and moves a focusing lens group of said photographic lens to a focus position; and
photographic distance detecting means for detecting a photographic distance based on a position of said focusing lens group.

10. A camera having a photographic mode automatic selecting apparatus according to claim 8, further comprising a scenic mode suitable for scenic photographing, in which said photographic mode selecting means selects said scenic mode when said photographic distance is longer than a predetermined distance.

11. A camera having a photographic mode automatic selecting apparatus according to claim 8, further comprising a close-up mode suitable for close-up photographing, in which said photographic mode selecting means selects said close-up mode when said photographic distance is shorter than a predetermined distance.

12. A camera having a photographic mode automatic selecting apparatus according to claim 8, further comprising:
a portrait mode suitable for portrait photographing; and
calculation means for calculating a photographic magnification based on said focal length and said photographic distance data, in which
said photographic mode selecting means selects said portrait mode when said photographic magnification is within a predetermined value.

13. A camera having a photographic mode automatic selecting apparatus according to claim 8, further comprising:
a scenic mode suitable for scenic photographing;
a close-up mode suitable for close-up photographing;
a portrait mode suitable for portrait photographing; and
a normal mode,
in which said photographic mode selecting means selects:
said scenic mode when said photographic distance is longer than a predetermined distance;
said close-up mode when said photographic distance is shorter than a predetermined distance;
said portrait mode when a photographic magnification based on said focal length and said photographic distance is within a predetermined value; and
said normal mode when no other photographic mode is selected.

14. A camera having a photographic mode automatic selecting apparatus according to claim 8, in which each of said plurality of photographic modes is a programmed exposure mode which sets a shutter speed and an aperture value by respective and different algorithms.

15. A camera having a photographic mode automatic selecting apparatus according to claim 9, further comprising display means for identifying and displaying each of said plurality of photographic modes, said display means further displaying a photographic mode selected by said photographic mode selecting means.

16. A camera having a photographic mode automatic selecting apparatus according to claim 8, in which said photographic lens is a zoom lens, further comprising focal length detecting means for detecting a varied focal length due to zooming.

17. A camera having a photographic mode automatic selecting apparatus, in which a plurality of photographic modes are selectable, comprising:
photographic mode automatic selecting means for automatically selecting an appropriate photographic mode from said plurality of photographic modes, based on photographic conditions;
photographic mode manual selecting means for selecting a specified photographic mode from said plurality of photographic modes corresponding to a manual operation,
a focus detecting device that detects a focusing state of a photographic lens; and
a lens driver that drives a focusing lens group of said photographic lens based on a result of a detection of said focus detecting device in which said photographic mode automatic selecting means selects an action mode when focusing is not performed in spite of an operation of said focus detecting device and said lens driver a predetermined number of times, or when a focal point changes within a predetermined time after focusing;
a photographic mode automatic selection by said photographic mode automatic selecting means being inhibited when a photographic mode is manually selected by said photographic mode manual selecting means, and
after a photographic mode is automatically selected by said photographic mode automatic selecting means, said automatic selection of said photographic mode by said photographic mode automatic selecting means is temporarily inhibited when a photographic mode is manually selected by said photographic mode manual selecting means.

18. A camera having a photographic mode automatic selecting apparatus according to claim 17, further comprising a release button, in which a photometric operation and a focusing operation are executed by depressing said release switch halfway, and a photographing operation is executed by fully depressing said release switch, in which:
said photographic mode automatic selecting means automatically selects said photographic mode when said release button is depressed halfway.

19. A camera having a photographic mode automatic selecting apparatus according to claim 17, in which, after a photographic mode is automatically selected by said photographic mode automatic selecting means, when a photographic mode is manually selected by said photographic mode manual selecting means, said photographic mode automatic selection by said photographic mode automatic selecting means is possible after completion of photographing under said manual selection of a photographic mode.

20. A camera having a photographic mode automatic selecting apparatus according to claim 17, further comprising switching means, in which after a photographic mode is automatically selected by said photographic mode automatic selecting means, when a photographic mode is manually selected by said photographic mode manual selecting means, said photographic mode automatic selection by said photographic mode automatic selecting means is possible by said switching means.

21. A camera having a photographic mode automatic selecting apparatus according to claim 17, in which, after a photographic mode is automatically selected by said photographic mode automatic selecting means, when a photographic mode is manually selected by said photographic mode manual selecting means, said photographic mode automatic selection by said photographic mode automatic selecting means is possible after passing of a predetermined amount of time.

22. A camera having a photographic mode automatic selecting apparatus according to claim 17, further comprising a timer, in which:

after said camera enters a state in which photographing can be performed, when no operation is executed during a predetermined amount of time, said camera enters a stand-by state by said timer, and after a photographic mode is automatically selected by said photographic mode automatic selecting means, when a photographic mode is manually selected by said photographic mode manual selecting means, said photographic mode automatic selection by said photographic mode automatic selecting means is possible when said camera circuit enters said stand-by state by said timer.

23. A camera having a photographic mode automatic selecting apparatus, comprising:

a shutter button which actuates a controller to execute a photographic operation;

a controller provided with a photographic mode automatic selecting function which automatically selects an appropriate photographic mode from a plurality of photographic modes, based on a photographic condition; and an operator separate from said shutter button, in which said operator can be operated separate from an operation of said shutter button; and said controller executes said automatically selected appropriate photographic mode when said operator is operated, wherein said controller is provided with a moving object detecting function which detects whether an object is moving, said photographic mode including an action mode which is suitable for photographing a moving object, said controller selecting said action mode when said controller detects, by said moving object detecting function, that an object is moving.

24. A camera having a photographic mode automatic selecting apparatus according to claim 23, wherein said controller executes a photometric calculation operation and an automatic focusing operation when one of said shutter button is depressed halfway and said operating means is operated.

25. A camera having a photographic mode automatic selecting apparatus according to claim 23, in which said controller further comprises a photographic mode manual selecting function which selects a photographic mode from said plurality of photographic modes corresponding to an operation of a manual operating device.

26. A camera having a photographic mode automatic selecting apparatus according to claim 23, further comprising:

a zoom lens; and focal length detecting means for detecting a focal length of said zoom lens, in which:

said controller means selects a photographic mode based on a photographic distance obtained by an automatic focusing operation and on a focal length obtained by said focal length detecting means.

27. A camera having a photographic mode automatic selecting apparatus according to claim 23, in which said operator is provided in a vicinity of said shutter button, so that a photographer can operate said operator by a same finger which operates said shutter button.

28. A camera having a photographic mode automatic selecting apparatus according to claim 23, in which said operator is provided away from said shutter button, so that a photographer cannot operate said operator by a same finger which operates said shutter button.

29. A camera having a photographic mode automatic selecting apparatus according to claim 25, in which said operator and said manual operating device are provided in a vicinity of said shutter button, so that a photographer can operate said operator and said manual operating device by a same finger which operates said shutter button.

* * * * *